(12) United States Patent
Gobaille-Shaw et al.

(10) Patent No.: US 12,115,498 B2
(45) Date of Patent: Oct. 15, 2024

(54) METHOD OF CAPTURING A TARGET SPECIES FROM A GAS

(71) Applicant: Mission Zero Technologies Ltd, Epping (GB)

(72) Inventors: Gael Gobaille-Shaw, Epping (GB); Shiladitya Ghosh, Epping (GB); Nicholas Chadwick, Epping (GB)

(73) Assignee: Mission Zero Technologies Ltd, Epping (GB)

( * ) Notice: Subject to any disclaimer, the term of this patent is extended or adjusted under 35 U.S.C. 154(b) by 0 days.

(21) Appl. No.: 18/369,445

(22) Filed: Sep. 18, 2023

(65) Prior Publication Data
US 2024/0009623 A1     Jan. 11, 2024

Related U.S. Application Data

(63) Continuation of application No. PCT/GB2022/050698, filed on Mar. 18, 2022.

(30) Foreign Application Priority Data

Mar. 18, 2021  (GB) ...................................... 2103806
Oct. 14, 2021  (GB) ...................................... 2114697

(51) Int. Cl.
*B01D 53/96*   (2006.01)
*B01D 53/62*   (2006.01)
*B01D 53/78*   (2006.01)

(52) U.S. Cl.
CPC ........... *B01D 53/965* (2013.01); *B01D 53/62* (2013.01); *B01D 53/78* (2013.01);
(Continued)

(58) Field of Classification Search
CPC ...... B01D 53/965; B01D 53/62; B01D 53/78; B01D 2252/20415; B01D 2252/20484;
(Continued)

(56) References Cited

U.S. PATENT DOCUMENTS 3,554,691 A   1/1971   Kuo et al.
8,535,502 B2  9/2013   Littau et al.
(Continued)

FOREIGN PATENT DOCUMENTS

EP   2163294 A1   3/2010
EP   3685904 A1   7/2020
(Continued)

OTHER PUBLICATIONS

Fisaman, Matthew D., et al., "CO2 separation using bipolar membrane electrodialysis." Energy & Environmental Science, 2011, vol. 4, pp. 1319-1328.
(Continued)

*Primary Examiner* — Anita Nassiri-Motlagh
(74) *Attorney, Agent, or Firm* — Fitch, Even, Tabin & Flannery LLP

(57) ABSTRACT

A method of capturing a target species from a gas comprises the steps of:
contacting a gas containing a target species with a first absorbent solution comprising a capture species; dissolving the target species in the first absorbent solution to form a target anion; electrochemically separating the target anion from the first absorbent solution by contacting the first absorbent solution with one or more ion-exchange membranes, and transferring the target anion through an ion-exchange membrane into a second absorbent solution; and releasing at least some of the target species from the second absorbent solution. The one or more ion-exchange membranes are not permeable to the capture species, so the capture species does not pass through the one or more ion-exchange membranes. An apparatus for capturing a target species from a gas is also provided.

27 Claims, 16 Drawing Sheets

(52) U.S. Cl.
CPC ............. *B01D 2252/20415* (2013.01); *B01D 2252/20484* (2013.01); *B01D 2252/30* (2013.01); *B01D 2252/602* (2013.01); *B01D 2257/504* (2013.01)

(58) Field of Classification Search
CPC .......... B01D 2252/30; B01D 2252/602; B01D 2257/504
USPC ....................................................... 423/228
See application file for complete search history.

(56) References Cited

U.S. PATENT DOCUMENTS

| | | | |
|---|---|---|---|
| 9,186,618 | B2 | 11/2015 | Baugh et al. |
| 2019/0187366 | A1* | 6/2019 | Enomoto ........... G02B 6/02395 |
| 2022/0097004 | A1 | 3/2022 | Makaruk et al. |

FOREIGN PATENT DOCUMENTS

| | | |
|---|---|---|
| WO | 2007/041872 A1 | 4/2007 |
| WO | 2008/042919 A2 | 4/2008 |
| WO | 2009/105566 A2 | 8/2009 |
| WO | 2013/036859 A1 | 3/2013 |

OTHER PUBLICATIONS

Sabatino, Francesco, et al., "Evaluation of a Direct Air Capture Process Combining Wet Scrubbing and Bipolar Membrane Electrodialysis." Industrial & Engineering Chemistry Research, 2020, vol. 59, pp. 7007-7020.

International Search Report and Written Opinion, International Patent Application No. PCT/GB2022/050698 Jun. 30, 2022, 12 pages.

Great Britain Search Report, Great Britain Application No. 2103806.2, dated Dec. 2, 2021, 4 pages.

Scott, Keith, Section 2.1, "Membrane Materials, Preparation and Characterisation." Handbook of Industrial Membranes, 1995, pp. 187-269.

Giorno, Lidietta, et al., "Permselectivity of Ion-Exchange Membranes," Encyclopedia of Membranes, 2016, pp. 1490-1492, 8 pages.

Bopeng Zhang, et al., "The trade-off between membrane permselectivity and conductivity: A percolation simulation of mass transport," Journal of Membrane Science, 597, 2020, 8 pages.

\* cited by examiner

METHOD OF CAPTURING A TARGET SPECIES FROM A GAS

CROSS REFERENCE TO RELATED APPLICATIONS

This application is a continuation of International Patent Application No. PCT/GB2022/050698, filed Mar. 18, 2022, which claims the benefit of Great Britain Application No. 2103806.2, filed Mar. 18, 2021, and Great Britain Application No. 2114697.2, filed on Oct. 14, 2021, all of which are incorporated herein by reference.

FIELD OF THE INVENTION

This invention relates to a method of capturing a target species from a gas, in particular a method of capturing a target species from air. Particularly preferably the target species may be $CO_2$.

BACKGROUND

The capture of polluting gas species for storage or conversion to less harmful compounds is of growing environmental and economic importance worldwide. In particular, the capture of target gas species from the air, also known as direct air capture or DAC, is a process that is highly desirable for a variety of environmental and economic reasons. Other than biological processes, direct air capture represents the only way to address polluting gas emissions of the past.

Of particular interest is direct air capture (DAC) of $CO_2$. Direct air capture of carbon species has potential for helping to fulfil industrial and national Net-Zero carbon emissions targets in the 21st century, especially in circumstances where traditional carbon capture technologies removing $CO_2$ from concentrated sources such as flue gas are unable to be deployed.

The current state of the art in direct air capture generally depends on two types of processes. In one implementation of DAC, $CO_2$ is absorbed by a highly caustic solution of hydroxide to form a precipitated carbonate. The carbonate is then heated to 800° C. until it decomposes to form $CO_2$ and to regenerate the caustic solution. The other implementation of DAC technology involves the adsorption of $CO_2$ into solid filters impregnated with amine groups. The amine groups bind $CO_2$ at ambient temperature and release it at elevated temperatures of around 100° C.

These techniques employ chemical processes that are extremely energy intensive and reliant on direct and/or indirect high-grade thermal energy, meaning that while the fundamentals of the processes do work, the economics of these technologies have so far proven too uncertain and unfavourable for extensive practical deployment. Inventions in this field that are the state-of-the-art are known to require between 1500-2500 kWh of energy per ton of $CO_2$ captured from air, compared to the fundamental thermodynamic minimum figure of 117 kWh/ton. This clearly demonstrates that much more efficient technologies must be invented to reduce energy consumption and thus reduce the economic costs of these processes.

The thermal demands of these prior art techniques also offset their environmental benefits, as the $CO_2$ emitted to produce the energy needed to power the DAC processes means that the actual net quantities of $CO_2$ capture achieved are lower than may be presumed at first glance. Certain commercialized DAC technologies require temperatures exceeding 600° C. for major sub-processes; presently they are only able to obtain heat at these temperatures through the combustion of natural gas, which is a fossil fuel with a significant $CO_2$ footprint itself. In other DAC technologies, high-grade pressurized steam is required for major sub-processes which is also sometimes sourced from fossil fuel combustion processes or locations with geo-thermal energy.

WO2013/036859A1 describes a target gas capture process in which $CO_2$ is captured in an alkaline aqueous stream and released from a second aqueous stream. Examples are provided of electrodialysis and nanofiltration processes being used to separate potassium bicarbonate from potassium ions and potassium carbonate respectively. During electrodialysis, the dissolved target species and the buffer species counterion (typically an alkali metal cation) are both passed through ion-exchange membranes to achieve charge neutrality in the second aqueous stream. A high temperature gas stripper is used to decompose the alkali-metal bicarbonates and liberate $CO_2$.

EP3162294A1 discloses bipolar membrane electrodialysis for $CO_2$ recovery. Aqueous $K_2CO_3$/$KHCO_3$ solution is used to capture $CO_2$ from a gas, and is then introduced into an electrodialysis cell in which $H_2O$ is electrolysed using a bipolar membrane. In the electrodialysis cell, the bicarbonate/carbonate anions are transferred through an anion-exchange membrane to combine with $H^+$ from the water electrolysis, and the potassium cations are transferred through a cation exchange membrane to combine with $OH^-$ from the water electrolysis, so that a stream of alkali-metal hydroxide (potassium hydroxide KOH) is discharged from the bipolar electrodialysis cell.

In some cases, prior art DAC processes are operable only in a batch or semi-batch mode as opposed to continuous operation, severely limiting the practical usefulness and the economics of these inventions. Given the already prohibitive capital cost of these technologies which currently exhibit levelized costs of $200-750/ton of $CO_2$, the downtimes incurred through batch/semi-batch operation constitute additional drawbacks and signal the need for newer technologies to be invented for DAC that overcome these constraints.

SUMMARY OF THE INVENTION

The invention is defined in the appended independent claims, to which reference should now be made. Preferred features of the invention are set out in the dependent claims.

In a first aspect, the invention provides a method of capturing a target species from a gas comprising the steps of:
  contacting a gas containing a target species with a first absorbent solution comprising a capture species;
  dissolving the target species in the first absorbent solution to form a target anion;
  electrochemically separating the target anion from the first absorbent solution by contacting the first absorbent solution with one or more ion-exchange membranes, and transferring the target anion through an ion-exchange membrane into a second absorbent solution; and
  releasing at least some of the target species from the second absorbent solution, in which the one or more ion-exchange membranes are not permeable to the capture species, so the capture species does not pass through the one or more ion-exchange membranes.

A key difference between the method of the present invention and gas capture methods of the prior art is that the one or more ion-exchange membranes are not permeable to the capture species, so the capture species does not pass through an ion-exchange membrane. In the present invention, none of the one or more ion-exchange membranes are permeable to the capture species. Thus, the capture species remains in the first absorbent solution, and is not transferred into the second absorbent solution.

As the target species is released from the second absorbent solution, the second absorbent solution may alternatively be named a release solution.

In preferred embodiments of the present invention, the second absorbent solution does not contain the capture species.

As the capture species is not transferred into the second absorbent solution, the second absorbent solution does not contain the capture species, so there is no need in the present method to separate target species bound to the capture species in the second absorbent solution. This means that the target species is in a relatively more volatile state in the second absorbent solution, and there is no need to apply heat to decompose target species-capture species compounds in order to liberate the target species from the second absorbent solution.

In the prior art, the capture species (which is typically an alkali metal cation in the prior art) is present in the release solution. In the release solution, this capture species therefore binds to the target species, so releasing the target species from the release solution requires an input of energy, typically by heating, in order to liberate the target species.

In WO2013/036859A1, for example, paragraph explains that buffer species counterions (which are typically alkali metal cations) are transferred through a cation exchange membrane into the second aqueous stream in order to achieve charge neutrality in the second aqueous stream with the dissolved target species anions that are transferred through an anion exchange membrane. Paragraph of WO2013/036859A1 states that aqueous stream 132', in which the dissolved target species is concentrated, includes counterion 112' as it flows to a gas stripper, and paragraph states that counterion 112' is a monovalent cation. The result of this is that, like the second aqueous stream contains tightly-bound alkali metal-target species complexes, which can only be decomposed to release the target species by heating the second aqueous stream to a high temperature.

In EP3162294A1, for example, the potassium cations from the incoming MX stream are transferred through a cation exchange membrane to form an outgoing MOH stream with OH$^-$ ions created by the bipolar membrane water electrolysis.

In EP3685904A1, alkali metal cations are used as the capture species, and the same alkali metal cations are present in the release solution, as shown in FIG. 3.

In the present invention, by preventing the capture species from passing out of the first absorbent solution through an ion-exchange membrane, the capture species is advantageously retained in the first absorbent solution and can be recirculated for re-use in capturing more of the target species. This means that the re-use of the capture species is much more straightforward and more environmentally friendly. Preventing the capture species from entering the second absorbent solution removes any need to discharge the second absorbent solution as the capture species accumulates, and means that the process does not require any complex and energy-inefficient steps to remove the capture species from the second absorbent solution. Another benefit of preventing the capture species from entering the second absorbent solution is that it is not necessary to force dissociation of the capture species and the target anion as part of the release step. This reduces the energy required for the release step. In prior art methods where the target species has been released from a solution containing target anions but also alkali-metal cations which acted as the capture species, the release step has required high energy input, as the reaction products must be heated to high temperatures to force decomposition into the gaseous target species. This is advantageously avoided in the present invention by electrochemically separating the target anion from the capture species prior to the release step.

During or after the dissolution step, the capture species may bind to the target anion in the first absorbent solution.

The present invention captures the target species by dissolving the target species in the first absorbent solution to form a target anion. Dissolving the target species in the first absorbent solution may form the counterions of a target acid, in other words one or more target anions and additionally one or more hydrogen cations H$^+$. At least some of these target acid counterions may remain free, measurable by a decrease in the pH of the first absorbent solution, while at least some of the target acid counterions may associate with the capture species in the first absorbent solution.

In preferred embodiments of the invention discussed further below, a source of H$^+$ cations may be provided to associate with the target anion in the second absorbent solution. The target acid and the H$^+$ cations may thus associate to form the target acid in the second absorbent solution, prior to release of the target species.

The target anion may be the anion of the conjugate acid of the target species. In the case of $CO_2$ capture, for example, the target anion is a bicarbonate anion, and the target acid is carbonic acid.

In a particularly preferred embodiment, the gas contacts the first absorbent solution, and the target species is dissolved and converted into a plurality of target anions in the first absorbent solution. The dissolution of the target species also creates a plurality of hydrogen cations in the first absorbent solution. The target anions may associate or react with the capture species, before being electrochemically dissociated from the capture species and transferred through the ion-exchange membrane into the second absorbent solution. The one or more ion-exchange membranes are not permeable to the capture species, so the capture species remains in the first absorbent solution.

In a preferred embodiment, a source of hydrogen cations is also provided to the second absorbent solution, either by passing hydrogen cations from the first absorbent solution through a cation exchange membrane into the second absorbent solution, or by providing an alternative source of hydrogen cations to the second absorbent solution. The result is that the second absorbent solution contains both a plurality of target anions and a plurality of hydrogen cations, which associate to form a target acid. The target acid may subsequently decompose and release the target species from the second absorbent solution as a gas.

A significant benefit of converting the target species into a target anion for transfer into the second absorbent solution, providing a source of H$^+$ cations to form the target acid with the target anion, and then releasing the target species from the target acid, is that the release of the target species from the target acid in the second absorbent may advantageously require very little energy input. For target species such as $CO_2$, the target acid and its ions are advantageously unstable at relatively low temperatures, so that the target acid may easily release the target species from the second absorbent solution, without requiring the energy-intensive heating steps used in the prior art.

In an alternative embodiment, the target anions in the second absorbent solution may be reacted with another species to release the target species in the form of a precipitate. The precipitated form of the target species may then be removed from the second absorbent solution, for example by filtering the precipitated material out of the second absorbent solution In a particularly preferred embodiment, for example, the target species is carbon dioxide ($CO_2$), and the dissolved $CO_2$ is converted into carbonic acid in the first absorbent solution. The carbonic acid consists of bicarbonate anions, which may associate or react with the capture species, and hydrogen cations. The bicarbonate anions are then electrochemically separated from the capture species and the first absorbent solution, so that the target bicarbonate anions migrate through the ion exchange membrane and are absorbed in the second absorbent solution. A source of hydrogen cations is also provided to the second absorbent solution, either by passing hydrogen cations from the first absorbent solution through a cation exchange membrane into the second absorbent solution, or by providing an alternative source of hydrogen cations. The result is that the second absorbent solution contains both the target bicarbonate anions and hydrogen cations, which associate to form carbonic acid. The carbonic acid subsequently decomposes and is released from the second absorbent solution as $CO_2$ gas. The most significant benefit of this technique is that the release of the captured $CO_2$ requires minimal energy due to the fact that carbonic acid and its ions are unstable at room temperature. On the other hand, an amine sorbent or carbonate calciner requires between 1500-2000 kWh per tonne of $CO_2$.

The use of liquid solutions of first and second absorbents advantageously allows easy replenishment of the sorbent in the device when it is spent, making processing significantly simpler than prior art DAC methods relying on solid absorbents.

Electrochemically separating the target anions from the capture species in the first absorbent solution is also relatively energy efficient compared to the processes for regenerating absorbent solutions in the prior art. For example, electrochemical separation by capacitive deionisation (CDI) can consume less than 300 kWh per tonne of $CO_2$ to separate the target anions from the first stream. There is also the option of recovering some of the charge from this process, leading to further gains in energy efficiency.

This method is advantageously usable to capture target gas species such as $CO_2$ from dilute gas streams such as air under ambient temperatures and pressures, and to concentrate it to a high purity, while requiring only electrical energy. These benefits make the method of the present invention more environmentally-effective, energy-efficient and lower cost than prior art techniques.

First Absorbent

The first absorbent solution may be either aqueous or non-aqueous, but is preferably an aqueous solution.

In some embodiments, the first absorbent solution may have a pH of between 7 and 11 before dissolving the target species. Particularly preferably, the first absorbent solution may have a pH of between 7 and 8.5, or between 7 and 8, or between 7 and 7.9 or 7 and 7.5, particularly preferably pH 7, before dissolving the target species. Where this is the case, this provides a particular distinction between the method of the present invention and a variety of prior art methods, in which highly alkaline absorbent solutions have been used out of a desire to improve absorption kinetics. In WO2013/036859A1, for example, alkaline buffer solutions were exclusively used, and it was demonstrated (in FIG. 6) that a more alkaline pH significantly increases $CO_2$ capture kinetics.

In other embodiments, the pH of the first absorbent solution may be greater than pH 7, or greater than pH 9, or pH 10, or pH 11, prior to absorption of the target species. The pH of the first absorbent solution may be determined by the choice of capture species in the first absorbent solution, and the concentration of the capture species in the first absorbent solution.

The pH of the first absorbent solution becomes more acidic once the target species has been dissolved and converted into the target anion, as dissolution of the target species typically involves the creation of both counterions of the target acid. For example, the first absorbent solution may have a pH of between 7 and 9.5 after dissolving the target species. Particularly preferably, the first absorbent solution may have a pH of between 6.5 and 9, or between 7.5 and 8.5, after dissolving the target species. This again differs from prior art techniques in which dissolved ionic species are carried in highly alkaline absorbent liquids. In WO2013/036859A1, for example, the aqueous solutions remain highly alkaline at all times.

In order to achieve good hydration kinetics, most prior art systems have used highly alkaline absorbents, containing large quantities of dissolved inorganic salts. Amine capture solvents, for example, typically require up to 30% wt. content, while hydroxide solutions tend to require concentrations of several mol/L. However, as the salt concentration in the absorbent solution increases, the energy required for electrochemical separation, and the energy needed to decompose the resulting salt products to release the dissolved target species, dramatically increases.

The first absorbent solution may preferably be maintained at a temperature of between 15° C. and 60° C., preferably between 18° C. and 45° C., particularly preferably between 30° C. and 40° C. Keeping the first absorbent solution in this temperature range advantageously means that it is not necessary to expend large amounts of energy to heat the solution to high temperatures.

The first absorbent solution may preferably be maintained at a pressure of less than 2 bar, preferably at atmospheric pressure.

The gas containing the target species may be brought into contact with the first absorbent solution by a variety of known methods. For example, the gas may flow through a gas absorber or gas contactor configured to bring the gas into contact with the first absorbent solution, for example by flowing a gaseous stream through the liquid first absorbent solution.

Capture Species

The first absorbent solution may comprise a capture species configured to increase the capacity of the first absorbent solution to capture the target species. The capture species may bind to, or associate with, the target anion in the first absorbent solution.

In the electrochemical separation step, the target anion is preferably electrochemically dissociated from the capture species before being transferred through the ion-exchange membrane.

In the present invention, the capture species is preferably a non-alkali-metal capture species. Alkali-metal compounds, for example alkali-metal bicarbonate/carbonate buffer solutions or alkali-metal hydroxides, are typically used as capture species in the prior art. The highly alkaline pH of these compounds has typically been considered a strength, and these compounds have been found to exhibit good ability to capture target species such as $CO_2$. The present inventors have found, however, that alkali-metal-containing capture species can increase the energy requirements of the gas capture method, as the target anions typically form strongly bound ionic reaction products with the alkali-metal cations. More energy is then required to separate the target anions during the electrochemical separation step, and in order to release the target species from a second absorbent solution containing alkali metal cations it is necessary to force decomposition of these reaction products by heating the solution to a high temperature.

The capture species is preferably an ionic capture species, particularly preferably a cationic capture species. The cationic capture species may be called a capture cation. In preferred embodiments, the capture species may be a cationic capture species that does not comprise an alkali metal cation. The capture species is preferably a cationic capture species that does not comprise an alkaline earth metal cation.

The cationic capture species may be cationic by nature, or may alternatively become protonated in the first absorbent solution.

The use of a cationic capture species may advantageously mean that the capture species is not anion-exchange-membrane-permeable, so that the anions of the target acid may easily be separated from the cationic capture species using an anion-exchange membrane. The use of non-ion-exchange-membrane-permeable capture species in the first absorbent solution advantageously decreases energy consumption of the electrochemical separation step, and means that there is no need for the second absorbent solution to be filtered or discharged as the capture species accumulates in the second absorbent solution.

In preferred embodiments, the capture species may be a cationic organic capture species. The capture species may be a cationic organic buffer species.

Particularly preferably, the capture species may be an ionic polymer. Ionic polymers may advantageously be non-membrane-permeable to cation-exchange membranes, for example cation-exchange membranes configured to allow migration of hydrogen cations.

The capture species may be a cationic polymer. Preferably the capture species may comprise a cationic polymer having a repeat unit which comprises at least one amine group or a plurality of amine groups, preferably in which the repeat unit comprises one or more branched amines.

In preferred embodiments of the present invention, the capture species is a polymeric amine. Preferably the capture species is a cationic polymeric amine.

The capture species comprises a plurality of polymer resin particles functionalised with cationic functional groups. Polymer resin particles functionalised with cationic functional groups may be known as heterogeneous salts. An example of suitable polymer resin particles functionalised with cationic functional groups is Lewatit R VP 001065, which is a commercially-available ion-exchange resin supplied by Lanxess. The supplier reports that the resin is a polymer of p-vinyl benzyl amine, cross-linked with some divinylbenzene for dimensional stability. The beads have an effective size of 0.47-0.57 mm and a BET surface area of 50 $m^2$ g−1. The pore volume and average pore size are reported to be 0.27 $cm^3$ $g^{-1}$ and 25 nm, respectively.

The capture species may comprise a slurry of anion-exchange resin particles functionalised with cationic functional groups.

The use of cationic polymer resin particles as a capture species may advantageously provide the benefit that the capture species is not membrane-permeable with respect to either anion- or cation-exchange membranes due to the large size of the polymer resin particles. The step of electrochemically separating the target anions from the capture species may therefore be advantageously straightforward and require relatively little electrical energy.

The capture species may be a choline-derived ionic liquid, preferably a cationic choline-derived ionic liquid containing the conjugate base of an organic acid such as carboxylic acid or propanoic acid.

Preferably, the capture species used in the present invention is weakly basic. Weakly basic capture species may advantageously require less electrochemical energy input to dissociate from the target anions during the electrochemical step. This may advantageously decrease the energy requirements, and therefore the carbon footprint, of the entire process.

Preferably the capture species may have a $pK_a$ of less than 10, preferably less than 8.5, particularly preferably less than 7.5. This refers to the pKa of the conjugate acid of the capture species (i.e. its protonated form).

In a particularly preferred embodiment, the capture species comprises polyethyleneimine (PEI), preferably branched PEI, particularly preferably branched PEI comprising primary, secondary and tertiary amines. Polyethyleneimine is a cationic polymer that binds to $CO_2$. PEI is water-soluble, and may advantageously uptake up to around 20% of its weight in $CO_2$. As shown in the Figures and described below, the inventors have found that absorbent solutions containing PEI may advantageously exhibit better capture rates than alkaline salt solutions such as NaOH, even at far lower concentrations. Branched PEI has been shown to have high capture capacities than linear PEI, and is therefore preferred for use in the present invention.

This may be attributable to the amine functional groups of PEI reacting more quickly with $CO_2$ than carbonate or hydroxide salts, as well as releasing $CO_2$ far more easily. This may be the case even with PEI solutions at fractions of the concentration of comparable alkaline salt solutions.

In some embodiments, the method of the present invention may contain the capture species at a far lower concentration than has been the case for capture species used in the prior art. Preferably the concentration of capture species in the first absorbent solution of the present invention is at least an order of magnitude lower than salt concentrations in the absorbent solutions of the prior art.

The first absorbent solution may comprise a capture species concentration in the first absorbent solution of less than 20000 mg/L (mg capture species per litre of first absorbent solution), or less than 10000 mg/L, preferably less than 7500 mg/L, or less than 5000 mg/L. Particularly preferably the first absorbent solution may comprise between 1000 mg/L and 5000 mg/L of additive, such as between 1000 mg/L and 5000 mg/L of a heterogeneous salt.

In preferred embodiments the capture species in the first absorbent solution may have a concentration of less than 0.5 M (moles per litre), or less than 0.3 M, or preferably less than 0.2 M. In preferred embodiments the first absorbent solution may have a capture species concentration of 0.15 M or less, for example 0.1 M or less.

In some embodiments the capture species in the first absorbent solution may have a concentration of less than 10 wt % (weight percent of capture species in the first absorbent solution), or less than 8 wt %, or preferably less than 5 wt %. In preferred embodiments the first absorbent solution may have a capture species concentration of less than 4 wt % or less than 2 wt % or less than 1 wt %, for example 0.5 wt % or less.

By contrast, amine capture solvents used in the prior art typically require up to 30 wt % concentration, while hydroxide solutions tend to be several molar concentration.

By using far lower concentrations of capture species in the first absorbent solution, the present invention may in some cases require less energy to be input to separate the target anions from the capture species, which reduces the energy consumption of the process compared to prior art processes using high concentrations of alkali-metal-salts as capture species.

The first absorbent solution preferably contains no inorganic salts. Alternatively the first absorbent solution preferably contains less than 2 wt % inorganic salt.

In preferred embodiments, the capture species may have a molecular weight (in g/mol) of greater than or equal to 200, or 250, or 300, or 400, or 500, or 550 g/mol. Smaller capture species have a greater ability to travel through membranes, so larger molecular weights are preferably used to prevent this from happening.

Particularly preferably the molecular weight of the capture species may be equal to or greater than 600, or 700, or 800, or 1000 g/mol. Such molecular weights may advantageously be too high to pass through membranes, and too high to block the pores of the membranes.

The use of a capture species with such a high molecular weight may advantageously stabilise the target anion in the first absorbent solution, and also ensure that the capture species cannot travel through the one or more ion-exchange membranes into the second absorbent solution, as the capture species molecules are too large to pass through the pores in the membrane. Thus the capture species may be excluded from the second absorbent solution due to their size.

In particularly preferred embodiments, the capture species may be a polymeric amine having a molecular weight of greater than 600 g/mol, or greater than 700 g/mol. In the first absorbent solution, the polymeric amine becomes protonated and the target anion associates with the protonated (and therefore cationic) polymeric amine. The target anion may then be electrochemically separated through the ion-exchange membrane, while the ionic charge and/or high molecular weight of the capture species means that the capture species cannot pass through the membrane and is instead retained in the first absorbent solution.

Depending on the capture species used, capture species may in some embodiments be used in higher concentrations than those discussed above. In embodiments using a polymeric amine capture species, for example, the concentration of capture species in the first absorbent solution may be less than 20 wt % (weight percent of capture species in the first absorbent solution). The concentration of capture species, preferably PA capture species, may be between 3 wt % and 20 wt %, or between 5 wt % and 15 wt %, or between 8 wt % and 12 wt %.

Target Acid

As described above, dissolution of the target species in the first absorbent solution may form the target anion and also a hydrogen cation, so that the first absorbent solution contains a target acid. The target acid is preferably the conjugate acid of the target species.

When $CO_2$ is the target species, for example, the target acid is carbonic acid, which forms from dissolved carbon dioxide according to the following equilibrium:

$$CO_2 + H_2O \rightleftharpoons H_2CO_3 \rightleftharpoons H^+ + HCO_3^-$$

The target anion in this situation is the bicarbonate anion $HCO_3^-$, which may bind to the capture species in the first absorbent solution, and then dissociate before migrating through the ion-exchange membrane in the electrochemical separation step.

When $SO_2$ is the target species, for example, the target anion is bisulfite and the target acid is sulfurous acid, which forms from dissolved sulfur dioxide according to the following equilibrium:

$$SO_2 + H_2O \rightleftharpoons H_2SO_3 \rightleftharpoons H^+ + HSO_3^-$$

When $NO_2$ is the target species, for example, the target anion is nitrate and the target acid is nitric acid, which forms from dissolved nitrogen dioxide according to the following equilibrium:

$$2NO_2 + H_2O + O_2 \rightleftharpoons 2HNO_3 \rightleftharpoons H^+ + NO_3^-$$

Other target species may dissolve in the first absorbent solution to form corresponding target anions and target acids.

Catalyst

In some embodiments of the present invention, the first absorbent solution contains a hydration catalyst for accelerating the conversion of the dissolved target species into the target anion. In order to achieve good hydration kinetics, most prior art systems have used highly alkaline absorbents. The present inventors have found, however, that by using catalytic hydration of the target species, the capture capacity of the first absorbent solution can be significantly increased. The use of a catalyst in the first absorbent solution significantly improves the effectiveness and energy efficiency of the target species capture.

The catalyst may comprise an enzyme, for example carbonic anhydrase. As used herein, carbonic anhydrase generally refers to any naturally occurring or synthetic genetic variants of carbonic anhydrase.

The concentration of catalyst in the first absorbent solution may be, for example, between 0.05 mg mL$^{-1}$ and 5 mg mL$^{-1}$ (milligrams of catalyst per millilitre of solution), preferably between 0.1 and 1 mg mL$^{-1}$, particularly preferably between 0.2 mg mL$^{-1}$ and 0.5 mg mL$^{-1}$.

The catalyst may alternatively comprise organometallic compounds of zinc (zinc cyclen) and metallic or metal-oxide particles or nanoparticles.

The catalyst may be a homogeneous or heterogeneous catalyst. For example, the catalyst may be immobilised on a substrate or surface that is in contact with the first absorbent solution. Immobilised catalyst or enzyme used in the present invention may preferably be immobilised onto particles that are dispersed throughout the first absorbent solution as a suspension. Particularly preferably catalyst may be immobilised on magnetic particles, which are advantageously easy to recover. In particularly preferred embodiments, magnetic $Fe_3O_4$ particles have been used as carrier particles on which the enzyme, for example bovine carbonic anhydrase (bCA), is immobilised.

Separation & Flow Processing

The target anions may be electrochemically separated from the first absorbent solution using a variety of different electrochemical techniques. The first absorbent solution may then be re-used, for example by recirculating the first absorbent solution to capture more of the target species.

In a preferred embodiment, the target anions may be electrochemically separated from the first absorbent solution by contacting the first absorbent solution with one or more ion-exchange membranes and applying an electrical potential.

The one or more ion-exchange membranes preferably comprises an anion-exchange membrane that is permeable to the target anion. The target anion may thus migrate through the anion-exchange membrane and into the second absorbent solution. Preferably the anion-exchange membrane is a monovalent-anion-exchange membrane. Anion-exchange membranes are advantageously not permeable to cations, so any cationic capture species cannot pass through the anion-exchange membrane into the second absorbent solution.

The one or more ion-exchange membranes may be configured to prevent passage of the capture species based on one or more of the ionic charge, the size or the molecular weight of the capture species. For example the membrane may be configured to allow or prevent passage of solution species based on hydrodynamic radius limits or molecular weight cut-off limits.

In some embodiments, the ion-exchange membrane may be a membrane configured to allow passage of the target anion, but to prevent passage of the capture species, based on their relative molecular sizes.

In a preferred embodiment, the one or more ion-exchange membranes are configured to permit passage of the target anion therethrough, and to prevent passage of capture species having a cationic charge and/or a molecular weight of greater than 200 g/mol. The one or more ion-exchange membranes may be configured to prevent passage of capture species having a molecular weight of greater than or equal to 200, or 250, or 300, or 400, or 500, or 600 g/mol. Particularly preferably the ion-exchange membranes block the passage of capture species having a molecular weight of greater than 600 g/mol.

As described above, the target species may dissolve in the first absorbent solution to form the target anion and a target counterion, preferably in which the target counterion is $H^+$.

As well as the target anion being electrochemically separated from the first absorbent solution, the target counterion is preferably electrochemically separated from the first absorbent solution and transferred through the cation-exchange membrane into the second absorbent solution.

The target anion preferably associates with the target counterion in the second absorbent solution, preferablyd to form a target acid.

The ion-exchange membranes may include at least one cation exchange membrane, such as Nafion®, and at least one anion exchange membrane, such as Sustainion®. In some embodiments, there may be a plurality of pairs of anion- and cation-exchange membranes.

In preferred embodiments, the one or more ion-exchange membranes may comprise both an anion-exchange membrane permeable to the target anion, and a cation-exchange membrane permeable to the target counterion. The anion-exchange membrane may be configured so that the target anion migrates through the anion-exchange membrane into the second absorbent solution, and the cation-exchange membrane may be configured so that the target counterion migrates through the cation-exchange membrane into the second absorbent solution. In this arrangement, under an electrical potential difference the anion of the target acid migrates through the anion exchange membrane, and the hydrogen ion migrates through the cation exchange membrane, while the capture species and the first absorbent solution does not migrate through a membrane. Both the target anion and target counterion may therefore migrate into the second absorbent solution, where they may associate to form the target acid, while the capture species is retained in the first absorbent solution.

In an alternative embodiment, hydrogen cations may be provided to the second absorbent solution from another source. The target anion may be combined with a hydrogen cation to form a target acid in the second absorbent solution. For example, in some embodiments the hydrogen cation may be produced by electrolysing $H_2O$.

The present invention preferably does not involve the use of any bipolar ion-exchange membranes (BPMs). In EP3162294A1 and EP3685904A1, bipolar membranes are used to dissociate $H_2O$ into $H^+$ and $OH^-$ in order to regenerate the required solution chemistry. In the present invention, the use of bipolar membranes is preferably avoided, as the inventors have found that bipolar membranes are more costly, exhibit reduced stability, due to high pH gradients at the membrane interface. The water dissociation reaction also requires a higher cell pair voltage of at least 0.8 V, typically >1 V. Instead, the present invention preferably transfers hydrogen cations from the first absorbent solution into the second absorbent solution where H+ reassociates with the target anion. This is more thermodynamically favourable, and as such the inventors have demonstrated that cell pair voltages of 0.5 V enable sufficient mass transfer rates.

By forming the target acid in the second absorbent solution, the target acid may decompose directly into the target species, and be released from the second absorbent solution as a gas.

In alternative embodiments, the electrochemically-separated target anions may be kept separate from $H^+$ cations and/or reacted with further components in order to release the target species from the second absorbent solution in the form of a precipitated compound. Particularly preferably the steps of the method are performed as continuous processes. In a continuously-operable embodiment, the first and second absorbent solutions are provided as continuously flowing streams of liquid.

A stream of the first absorbent solution may be circulated between a gas contactor, in which the first absorbent solution contacts the gas containing the target species, and an ion-separator which is in contact with the ion-exchange membrane(s). The ion-separator preferably comprises a separation chamber with one or more, or two or more, ion-exchange membranes connected by a solid electrolyte, such as a 50:50 mixture of anion and cation exchange beads, through which the first absorbent solution may flow.

Two or more flow electrodes are preferably in contact with the ion-exchange membrane(s). At least one of the flow electrodes preferably comprises a stream of the second absorbent solution which is circulated between the flow electrode(s) and a release vessel, in which the target species is released from the second absorbent solution.

This arrangement advantageously allows the target species to be continuously absorbed, converted to the target anion, electrochemically separated through the ion exchange membrane(s) into the second absorbent solution, and released. Following the separation step, the first absorbent solution containing the capture species can then be recirculated and brought back into contact with the gas, to absorb more of the target species and begin the cycle again.

Preferably each flow electrode comprises or consists of a stream of absorbent solution containing suspended electrically and or/ionically-conductive particles, which may range in size from 10 nm to 150 microns, preferably 20 nm to 50 nm. The conductive particles in the flow electrodes may comprise activated carbons, redox species such as riboflavin 5'-monophosphate sodium salt hydrate, metal oxides (e.g. $Fe_2O_3$, $Mn_2O_3$) or metal nanoparticles and combinations thereof. The flow electrodes may comprise carbon- or metal-based particles or nanoparticles, such as but not limited to activated carbon as well as oxides, hydroxides, and/or oxyhydroxides of platinum, silver, iron, nickel, manganese, and/or titanium, or redox species such as riboflavin 5'-monophosphate sodium salt hydrate, anthraquinone, polyoxometalates.

In some preferred embodiments, the electrochemical separation may be carried out by applying an electric potential difference of up to 1.2 V per cell (per pair of electrodes). Maintaining the voltage below 1.2 V may advantageously prevent undesired water electrolysis and reduce energy consumption.

In alternative embodiments comprising water electrolysis, for example, the operating voltage may be higher than 1.2 V per cell. For example in some embodiments the electrochemical separation may be carried out by applying an electric potential difference of up to 100 V per pair of electrodes, depending on the number of membrane pairs between the electrodes. In some embodiments the electrochemical separation may be carried out by applying an electric potential difference of up to 80 V per pair of electrodes or up to 60 V per pair of electrodes, or up to 50 V, or 40 V, or 30 V, or 20 V, or 10 V per pair of electrodes.

In a particularly preferred embodiment, the step of electrochemically separating the target acid ions from the first absorbent solution comprises capacitive deionisation (CDI), preferably flow CDI, i.e. CDI using flow electrodes.

Usually CDI operates by absorbing ions until the electrode is saturated and then discharging the ions, which limits CDI to operate in a cyclic/semi-batch operation. However with the addition of one or more ion-exchange membranes and "flow electrodes", target anions may be continuously separated from the first absorbent solution into the second absorbent solution. This may advantageously allow continuous capture of target species, electrochemical separation and release of the target species, so that the method may operate much more efficiently.

In an alternative embodiment, the step of electrochemically separating the target acid ions from the first absorbent solution comprises electrodialysis.

The electrochemical separation step may be carried out under an elevated pressure, in order to prevent release of the target species as a gas in the electrochemical separation cell. Preferably the electrochemical separation step may be carried out under a hydrostatic pressure of greater than 2 atm, preferably greater than 3 atm or 5 atm or 7 atm, or even 30 atm or higher. The evolution of gas bubbles in the electrochemical separator cell may undesirably affect the flow of ionic current in the cell, and possibly damage the ion exchange membrane(s). By creating an elevated pressure during the electrochemical separation step, the evolution of the target species as a gas may be prevented until the second absorbent solution has exited the electrochemical separator, and preferably until the second absorbent solution reaches a release vessel, at which the pressure may be reduced and the target species released as a gas.

Second Absorbent Solution

In the present invention, the second absorbent solution (release solution) has a different composition from the first absorbent solution. For example, as the capture species cannot pass into the second absorbent solution through a membrane, the second absorbent solution does not contain the capture species.

The second absorbent solution may contain hydrogen cations to balance the charge of the target anions received by the second absorbent solution. H+ may optionally be the only cations present in the second absorbent solution. Preferably the hydrogen cations present in the second absorbent solution are transferred from the first absorbent solution to the second absorbent solution via an ion-exchange membrane.

The second absorbent solution preferably has a pH which is different from the pH of the first absorbent solution. Preferably the pH of the second absorbent solution is less than 7. In prior art methods such as WO2013/036859A1, the second aqueous stream comprises the alkali-metal carbonate/bicarbonate buffer ions that act as the capture species, so the second aqueous stream is highly alkaline. The energy required to separate and release the target species from the second absorbent solution is therefore significantly greater.

The second absorbent solution may be aqueous or non-aqueous, but in preferred embodiments the second absorbent solution is non-aqueous. In a particularly preferred embodiment, the first absorbent solution is an aqueous solution, while the second absorbent solution is a non-aqueous solution.

The use of a non-aqueous second absorbent advantageously reduces or eliminates the requirement to dry the target species after it is released from the second absorbent solution. Non-aqueous second absorbent solutions may also advantageously exhibit high boiling points, low vapour pressures and also have a high capacity to dissolve target species such as $CO_2$.

The use of a second non-aqueous absorbent solvent allows target species to be released with minimal humidity, and by reducing the need for drying, reduces the energy consumption of the overall process. In addition, it could facilitate operation at higher voltages (faster separation rates) due to having an wider electrochemical window.

The second absorbent solution preferably comprises or consists of an organic carbonate solvent such as ethylene carbonate, propylene carbonate or dimethyl carbonate.

In some embodiments, the target species may be released as a concentrated form of the same target species that was captured from the gas. For example, $CO_2$ may be captured from a gas and then concentrated and released as pure $CO_2$ gas.

Alternatively, the target species may be released in a form different from that in which it was present in the gas. For example, NOx or SOx present in the gas may be captured, and then released in a reduced form such as $N_2$ or S.

The second absorbent solution may comprise one or more release catalysts for the reduction of the target anion, or for the conversion of the target anion into a target release species. The one or more release catalysts may comprise metallic catalysts or metal chalcogenides (oxides, nitrides, sulphides, phosphides) of a metal selected from the list: Pt, Pd, Fe, Mo, Mn, Cu, Zn, V, W.

The one or more release catalysts may catalyse the reduction of the target anion and/or target species to form oxygenates and/or hydrocarbons For captured $CO_2$, the release catalyst(s) may for example facilitate hydrogenation or reduction reactions leading to the formation of one or more of: alcohols, carboxylic acids, alkanes, alkenes, CO, which may then be released from the second absorbent solution.

For NOx or SOx captured from the gas, the release catalyst(s) may catalyse reduction to $N_2$ or S for release, for example. The second absorbent solution may comprise one or more of: an inorganic salt, a metal oxide, a metal oxyhydroxide, FeOOH, TiOOH, or a metal alloy such as Nickel-Iron or Platinum-Iron, for accelerating the release of the target species from the target acid.

The second absorbent solution may comprise an inorganic salt, as a small amount of salt in the second absorbent solution may advantageously reduce the electrical resistance of the ion-separator. In preferred embodiments the second absorbent solution may contain less than 5 wt % salt, or less than 2 wt % salt, or less than 1.5 wt % salt, or less than 1 wt %. For example the second absorbent solution may contain up to 10 g/L salt, or up to 15 g/L salt, or up to 20 g/L salt.

The second absorbent solution may alternatively contain no inorganic alkaline salts. The use of only a small quantity of salt, or in the most minimal case no salt at all, in the second absorbent solution advantageously facilitates significant energy reduction for separating and releasing the target species, as it is not necessary to thermally decompose salt products in order to release the target species.

In some embodiments, for example when electrodialysis is used to separate the ions from the first capture solution, the second absorbent solution may be $H_2O$, or another aqueous solution, for example an organic acid such as sulfonic acid. In one experiment, the inventors have successfully used 0.18% poly-4-styrene sulfonic acid as the second absorbent solution.

The second absorbent solution may contain aqueous or solid species for the purpose of increasing ionic conductivity. For example, organic salts such as betaine which are zwitterionic may increase the conductivity of the second absorbent solution and will be retained in the second absorbent solution due to its net-zero charge. Alternative, immobilised salts or ion-exchange resins could be placed in the second absorbent chamber of the electrochemical cell to improve ion transport.

Release of Target Species

The method comprises the step of releasing at least some of the target species from the second absorbent solution.

In preferred embodiments of the present invention the target species is released from the second absorbent solution as a gas.

After electrochemical separation, the target anion may preferably be combined with hydrogen cations in the second absorbent solution, so that the second absorbent solution contains the target acid. For example, the target acid anions may pass through an anion exchange membrane and be transferred to the second absorbent solution, while the hydrogen cations pass through a cation exchange membrane into the second absorbent solution. The hydrogen cations may pass from the first absorbent solution, through a cation-exchange membrane, into the second absorbent solution. Alternatively, hydrogen cations from another source may be present in the second absorbent solution, for example hydrogen cations created by electrolysis of water.

The target species may then be released from the second absorbent solution in order to maintain the chemical equilibrium of the target acid in the second absorbent solution. For example, the target acid may decompose directly into the target species, as a result of the target acid counterions being unstable in the second absorbent solution at a given temperature and pressure. Particularly preferably, the target species may be released as a gas from the second absorbent solution at room temperature and atmospheric pressure.

In a particularly preferred embodiment, for example, the target species is carbon dioxide ($CO_2$), and the dissolved $CO_2$ is converted into carbonic acid (bicarbonate target anion, and hydrogen cation) in the first absorbent solution. The bicarbonate target anion then associates with the capture species. The carbonic acid ions are then electrochemically separated from the first absorbent solution before being recombined in the second absorbent solution. In this case the carbonic acid ions H+ and $HCO_3$— are metastable at room temperature and will decompose back to form $CO_2$ gas as the equilibrium begins to favour $CO_2$ as the process continues and the concentration of H+ and $HCO_3$— in the second absorbent solution increases. The carbonic acid in the second absorbent solution may therefore decompose directly into carbon dioxide gas without requiring the second absorbent solution to be heated above room temperature. Therefore the absorption, separation and release processes can continuously operate without accumulating ions because the target acid counterions will reassociate to form carbonic acid and subsequently $CO_2$.

The overall process requires the least energy input when chemical equilibrium forces the release of the target species from the second absorbent solution at room temperature, as no heating or other energy input is required to force the release of the captured target species.

In the present method, the target species is preferably releasable as a gas from the second absorbent solution without heating the second absorbent solution.

By electrochemically separating the target anion from the capture species, and preferably having none of the capture species present in the second absorbent (release) solution, in the present method the target species is advantageously releasable without heating the second absorbent solution. The amount of energy input required for the release step is therefore greatly less than is required in the prior art. Preferably the target species is released from the second absorbent solution at a temperature below 50° C., or 40° C. or 30° C. In some embodiments, the target species may be released as a gas from the second absorbent solution at a temperature between 0° C. and 50° C., or between 5° C. and 40° C., or between 10° C. and 30° C., or between 12° C. and 25° C.

In preferred embodiments, the target species is released from the second absorbent solution at atmospheric pressure, or at a pressure greater than atmospheric pressure. As the target species in the present invention is not bound to a capture species during the release step, there is no need to force the target species to evolve by creating a sub-atmospheric pressure over the second absorbent solution. During the release step the partial pressure of the target species over the second absorbent solution may be equal to the partial pressure of the target species in air at atmospheric pressure.

Preferably the target species is released from the second absorbent solution spontaneously (driven by equilibrium alone) at a temperature below 40° C. or less than 30° C. Particularly preferably the target species is released from the second absorbent solution spontaneously (driven by equilibrium alone) at a temperature below 40° C. or less than 30° C. and atmospheric pressure. Where the electrochemical separation step is carried out at an elevated pressure to prevent gas evolution in the ion separator, the pressure is preferably reduced to allow release of the target species, particularly preferably reduced to atmospheric pressure.

The step of releasing at least some of the target species from the target acid in the second absorbent solution may comprise the step of heating the second absorbent solution, reducing a pressure above the second absorbent solution, or a combination thereof.

In embodiments where the second absorbent solution is heated to accelerate release of the target species from the solution, preferably the second absorbent solution is heated to a temperature of less than 70° C., or less than 60° C., or less than 50° C., particularly preferably less than 40° C. or less than 30° C. At temperatures such as these, the equilibrium of the target acid in the second absorbent solution is shifted to encourage decomposition of the target anion into the target species. However, heating the second absorbent solution to these temperatures requires significantly less energy than the high-temperature decomposition steps in the prior art.

The step of releasing at least some of the target species from the second absorbent solution may comprise photothermal heating of the second absorbent solution, wherein photonic energy is received via functional materials in the second absorbent solution that interact with photons between the infrared visible and radio frequencies of the electromagnetic spectrum.

The releasing step may alternatively or additionally comprise magnetic induction. Magnetic induction may be usable when the second absorbent solution contains metallic particles, in which an electrical current can be induced by an externally-applied magnetic field.

The use of photothermal heating or magnetic induction may advantageously allow targeted heating of particles in the second absorbent solution, so as to increase the rate of reaction of the release step. In some embodiments these methods may allow the creation of a temperature gradient in the second absorbent solution, thereby achieving an increased rate of reaction of the release step without heating the entire system.

The gaseous target species released from the second absorbent stream may advantageously be compressed and/or stored for further use.

In an alternative embodiment, after electrochemical separation of the target anions from the first absorbent solution, the target acid $H^+$ counterions may be transferred to a separate absorbent solution. For example, the target anions may pass through an anion exchange membrane and be transferred to the second absorbent solution, while the target acid hydrogen ions may pass from the first absorbent solution through a cation exchange membrane into a third absorbent solution. The target anions and/or the target acid hydrogen ions may subsequently be reacted with a mineral or salt to form a further material that is released from the absorbent solution. For example, the target anions (bicarbonate ions in the case of carbonic acid) may be transferred into the second absorbent solution and reacted with a mineral or salt to form a precipitated material (a precipitated bicarbonate material for example). The captured target species may thus be released from the second absorbent solution in a reacted form, for example by filtering the precipitated material out of the absorbent solution. The target acid $H^+$ counterions may for example be released as hydrogen gas.

Gases

The method of capturing the target species from the gas comprises the first step of contacting a gas containing a target species with a first absorbent solution. The target species is then removed from the gas and captured by dissolving the target species in the first absorbent solution.

The target species typically forms only a portion of the gas, and the ease with which the target species may be captured depends on the concentration of the target species in the gas. An advantage of the present invention is that target species may be captured even when the concentration of the target species in the gas is relatively low, which is of particular importance in order to capture pollutant target species from air, for example.

A concentration of the target species in the gas may be less than about 50 vol %, or 45 vol %, or 25 vol %, or 15 vol %, or 10 vol %, or 5 vol %, or 1 vol %, preferably less than 0.5 vol %. Pollutant gases such as $CO_2$ are typically present in air in very dilute concentrations, usually far lower than 1 vol %.

The gas containing the target species may be air, flue gas from fossil fuel combustion, industrial gas, biogas or any combination thereof. In a particularly preferred embodiment, the gas is air, so that the method according to the present invention is a method of capturing a target species from air.

The target species may be selected from the group consisting of $CO_2$, $H_2S$, $SO_2$, $NO$, $NO_2$, and $N_2O$.

Carbon Dioxide

In particularly preferred embodiments of the present invention, the target species is $CO_2$, the target anion is bicarbonate $HCO_3-$, and target acid is carbonic acid.

The invention may therefore provide a method of capturing carbon dioxide from a gas comprising the steps of:
contacting a gas containing carbon dioxide with a first absorbent solution comprising a capture species;
dissolving the carbon dioxide in the first absorbent solution to form a bicarbonate anion;
electrochemically separating the bicarbonate anion from the first absorbent solution by contacting the first absorbent solution with one or more ion-exchange membranes, and transferring the bicarbonate anion through an ion-exchange membrane into a second absorbent solution; and
releasing at least some of the carbon dioxide from the second absorbent solution, in which the one or more ion-exchange membranes are not permeable to the capture species, so the capture species does not pass through an ion-exchange membrane.

All of the features described herein in relation to all aspects of the invention are applicable to the capture of carbon dioxide from a gas, particularly preferably to the direct capture of $CO_2$ from air.

Preferably the second absorbent solution does not contain the capture species. In the case that the gas is air, the invention may provide a method of capturing carbon dioxide from air.

Dissolution of the carbon dioxide in the first absorbent solution preferably forms both $HCO_3-$ and $H^+$, and particularly preferably both $HCO_3-$ and $H^+$ are electrochemically separated from the first absorbent solution and transferred into the second absorbent solution. The counterions may thus associate in the second absorbent solution to form carbonic acid, which may advantageously decompose into carbon dioxide gas which is released without requiring additional energy input.

The invention may therefore use bicarbonate anions $HCO_3-$ and carbonic acid, equivalent to H+ and $HCO_3-$, as the primary carbon species for transfer of $CO_2$ between an incoming dilute stream of $CO_2$ in a gas, and an outgoing concentrated stream of $CO_2$ gas released from the second absorbent solution.

In the case of $CO_2$ capture, the target carbonic acid counterions (H+ and $HCO_3-$) are metastable at room temperature and will decompose back to form $CO_2$ as the equilibrium begins to favour $CO_2$ due to the increasing concentration of H+ and $HCO_3-$ in the second absorbent solution. Therefore the process can continuously operate without accumulating ions, as the ions will be naturally driven by chemical equilibrium to re-associate to form carbonic acid and subsequently $CO_2$ which is released from the second absorbent solution, preferably without heating the second absorbent solution to above room temperature.

The first absorbent solution may preferably contain a catalyst for accelerating the kinetics of $CO_2 <\, > H_2CO_3 <\, > H^+ + HCO_3^-$. This advantageously speeds up the conversion of captured $CO_2$ into bicarbonate anions and thus carbonic acid, and makes it possible to capture carbon dioxide from a gas stream where it is present in only very dilute concentrations. The catalyst may therefore advantageously make it possible to perform DAC to capture $CO_2$ directly from air, where the concentration of carbon dioxide in the air is typically far below 1 vol %, typically close to 0.04 vol %.

Particularly preferably the catalyst for converting $CO_2$ into bicarbonate anions may be carbonic anhydrase, or a $Zn^{2+}$ containing compound such as zinc cyclen.

Apparatus

In a second aspect, the invention provides an apparatus for capturing a target species from a gas, comprising:
- a gas contactor configured to contact a gas containing a target species with a first absorbent solution containing a capture species, dissolving the target species in the first absorbent solution to form target anions;
- an ion-separator comprising one or more ion-exchange membranes for electrochemically separating the target anions from the first absorbent solution and transferring at least some of the target anions to a second absorbent solution; and
- a release vessel for releasing at least some of the target species from the second absorbent solution,
- in which the one or more ion-exchange membranes are not permeable to the capture species, in use.

The gas contactor may comprise a gas sparger or a falling film reactor.

The one or more ion-exchange membranes are preferably configured to transfer the target anions from the first absorbent solution into the second absorbent solution, and to retain the capture species in the first capture solution.

The ion-separator is an electrochemical cell configured to electrochemically separate the target anions from the first absorbent solution and transfer at least some of the target anions to the second absorbent solution. The ion-separator comprises at least one pair of electrodes (an anode and a cathode), and is configured to apply an electrical potential difference between the electrodes to separate the target anions from the first absorbent solution.

In some preferred embodiments, the ion-separator is configured to apply an electric field of up to 1.2 V per pair of electrodes. Maintaining the voltage below 1.2 V advantageously prevents undesired water electrolysis and reduces energy consumption. In other embodiments in which water electrolysis forms part of the electrochemical separation, the ion-separator may be configured to apply a potential difference of greater than 1.2 V, for example up to 100 V, or up to 80 V, or up to 60 V, or up to 50 V per pair of electrodes.

In a conventional electrodialysis cell, there are two contributions to current: the redox voltage from water splitting and the membrane voltage. As the number of membrane pairs increases, membrane voltage increases. So an entire cell could operate at a voltage of up to 100 V, though most of the voltage is related to the voltage drop over the membranes rather than from electrolysis.

The ion-separator may be configured to operate under an elevated pressure, in order to suppress the formation of target species gas bubbles in the ion-separator. Preferably the ion-separator may be configured to operate under a hydrostatic pressure of greater than 2 atm, preferably greater than 3 atm or 5 atm or 7 atm, or even 30 atm or higher.

The ion-separator may be configured to transfer only the target anions into the second absorbent solution, or the ion-separator may be configured to transfer both the target anions and a plurality of hydrogen cations from the first absorbent solution into the second absorbent solution.

The ion-separator preferably comprises one or more ion-exchange membranes.

The one or more ion-exchange membrane preferably comprises, or consists of, an anion-exchange membrane configured to permit passage of the target anion therethrough.

The ion-separator may comprise two or more ion-exchange membranes. Preferably the ion-separator comprises an anion-exchange membrane and a cation-exchange membrane. The ion-separator preferably comprises one or more pairs of ion-exchange membranes, each pair comprising one cation-exchange membrane and one anion-exchange membrane. The or each anion-exchange membrane is preferably configured to permit passage of the target anion therethrough, while the or each cation-exchange membrane is preferably configured to permit passage of hydrogen cations therethrough.

All ion-exchange membranes in the ion-separator are preferably configured to prevent passage of the capture species through the membrane.

The ion-separator preferably does not comprise a bipolar ion-exchange membrane.

In a preferred embodiment, the ion-separator comprises a separation chamber with an anion-exchange membrane and a solid electrolyte, such as a 50:50 mixture of anion and cation exchange beads. The ion-separator is preferably configured to receive a stream of the first absorbent solution, and to pass the flow of first absorbent solution through the solid electrolyte. The stream of the first absorbent solution containing the target anions preferably enters the separation chamber at a first end, before the target anions are electrochemically separated from the stream as it passes through the solid electrolyte, and the stream of first absorbent solution exits the separation chamber through a second end, still containing the capture species but having lost the target anions.

In a further preferred embodiment the ion-separator may comprise a separation chamber with a pair of opposing ion-exchange membranes (one anion- and one cation-exchange membrane) connected by the solid electrolyte. The stream of first absorbent solution passes through the separation chamber, and the electrical potential difference across the ion-separator causes the target anions to dissociate from the capture species and migrate through the anion-exchange membrane, while the hydrogen cations in the first absorbent solution migrate through the cation-exchange membrane.

The ion-separator preferably comprises one or more, or two or more, flow electrodes in contact with output sides of the ion-exchange membrane(s). Each flow electrode may comprise a stream of absorbent solution flowing through a channel between an ion-exchange membrane and an electrode. The stream of absorbent solution may comprise a plurality of electrically-conductive particles, or a slurry of electrically-conductive particles. In this embodiment the electrically-conductive absorbent and the electrode form a flow electrode.

The flow electrode(s) preferably comprises a stream of second absorbent solution, so that target anions passing through an ion-exchange membrane are transferred into the stream of second absorbent solution.

The stream of absorbent solution forming the flow electrode(s) may comprise a slurry of suspended electrically-conductive particles. The conductive particles in the slurry may range from 10 nm to 150 microns in size. The conductive particle slurry may preferably comprise activated carbons, redox species such as riboflavin 5'-monophosphate sodium salt hydrate, metal oxides (e.g. $Fe_2O_3$, $Mn_2O_3$) or metal nanoparticles and combinations thereof. The flow electrodes may comprise carbon- or metal-based particles or nanoparticles, such as but not limited to activated carbon as well as oxides, hydroxides, and/or oxyhydroxides of platinum, silver, iron, nickel, and titanium.

The apparatus preferably comprises an anion-exchange membrane and a first flow electrode in contact with an output side of the anion-exchange membrane. The first flow electrode preferably comprises a stream of second absorbent solution. In use, as the first absorbent solution passes through the ion-separator, the target anions pass through the anion-exchange membrane into the stream of second absorbent solution.

In some preferred embodiments, the apparatus comprises a cation-exchange membrane and a second flow electrode in contact with an output side of the cation-exchange membrane. The second flow electrode may comprise a stream of the second absorbent solution, or alternatively a stream of a third absorbent solution different from the second absorbent solution. Where a third absorbent solution is used, the third absorbent solution may preferably be selected from the same materials as the second absorbent solution, but kept separate from the second absorbent solution. In use, as the first absorbent solution passes through the ion-separator, hydrogen cations migrate from the first absorbent solution through the cation-exchange membrane into the stream of absorbent in the second flow electrode.

In a first preferred embodiment, the apparatus is configured to combine the streams of second absorbent solution from both flow electrodes. This advantageously recombines the target anions with the hydrogen cations so that the second absorbent solution contains the target acid. The target species can then be released as a gas following decomposition of the target acid in the release vessel.

In an alternative embodiment, the apparatus may be configured not to combine the streams of absorbent solution from the two flow electrodes. The target acid anions and/or the target acid hydrogen ions may subsequently be used separately, or separately reacted with a mineral or salt to form a further material that is released from the second absorbent solution.

In some embodiments, the apparatus may comprise a first flow electrode consisting of a stream of second absorbent solution in contact with the anion-exchange membrane, and a second flow electrode consisting of a stream of a third absorbent solution in contact with the cation-exchange membrane. In use, the target anions pass through the anion exchange membrane and are transferred to the second absorbent solution, while hydrogen ions pass through the cation exchange membrane and are transferred to the third absorbent solution. The target anions and/or the hydrogen ions may subsequently be reacted with a mineral or salt to form a further material that is released from the second and/or third absorbent solutions. For example, the target anions (bicarbonate ions in the case of carbonic acid) may be transferred into the second absorbent solution and reacted with a mineral or salt to form a precipitated material (a precipitated bicarbonate material for example). The captured target species may thus be released from the second absorbent solution in a reacted form, for example by filtering the precipitated material out of the absorbent solution.

In some preferred embodiments, the apparatus may be configured to provide a plurality of hydrogen cations to the second absorbent solution for association with the target anions. The apparatus may be configured to electrolyse water, and to introduce the resulting hydrogen cations into the second absorbent solution.

The apparatus preferably comprises means for transferring first absorbent solution from the gas contactor to the ion-separator, and means for recirculating first absorbent solution from the ion-separator to the gas contactor.

The apparatus preferably comprises means for transferring second absorbent solution from the ion-separator to the release vessel, and means for recirculating second absorbent solution from the release vessel to the ion-separator.

In a first particularly preferred embodiment, the ion-separator is a capacitive deionisation (CDI) ion-separator, or a CDI cell.

In an alternative embodiment, the ion-separator is an electrodialysis ion-separator, or an electrodialysis cell.

The apparatus is preferably configured to operate continuously.

The gas contactor may be configured to continuously contact a gas containing a target species with a stream of first absorbent solution, and an ion-separator may be configured to continuously electrochemically separate the target anions from the first absorbent solution, and to transfer at least some of the target anions to a stream of the second absorbent solution. The release vessel may be configured to continuously release at least some of the target species from the second absorbent solution.

In a first particularly preferred embodiment, the ion-separator is a flow electrode capacitive deionisation (FCDI) ion-separator, or a continuous-flow electrodialysis ion-separator.

The release vessel may comprise a heater, and/or a magnetic induction assembly, for applying heat and/or magnetic induction to the second absorbent solution.

Features described above in relation to the first aspect of the invention are also applicable to the apparatus of the second aspect, and vice versa.

DETAILED DESCRIPTION

Specific embodiments of the invention will now be described by way of example, with reference to the accompanying drawings, in which:

FIG. 1 illustrates a preferred embodiment of the present invention which employs flow electrode capacitive deionisation to electrochemically separate ions as part of a gas capture process.

Figure 1:
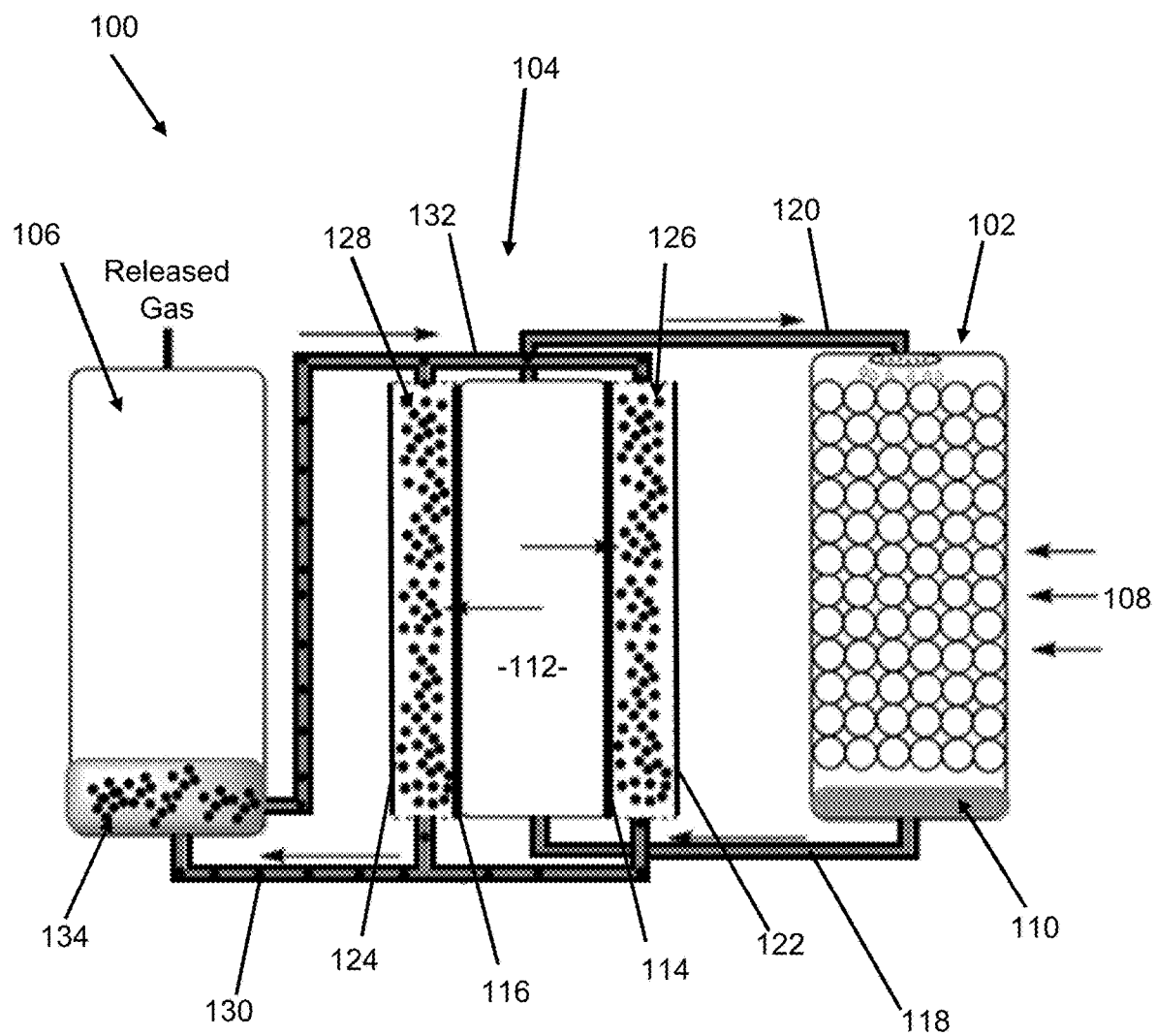
FIG. 1 is a schematic diagram of a flow electrode capacitive deionisation apparatus operating according to a preferred embodiment of the present invention.

The flow-CDI apparatus 100 illustrated in FIG. 1 is made up of a gas contactor 102, an ion-separator 104, and a release vessel 106.

The gas contactor 102 is arranged to receive a flow of gas 108 which contains a target species to be captured, and to bring the gas into contact with a stream of a first absorbent solution 110.

A variety of gas-liquid contactor designs are known in the art, such as falling-film columns, packed columns, bubble columns or spray towers, any of which would be suitable for use with the present invention.

The ion-separator 104 contains a separation chamber 112 that is filled with a porous solid electrolyte, an anion-exchange membrane 114 along one side of the separation chamber 112, and a cation-exchange membrane 116 along the opposite side of the separation chamber 112. An inlet pipe 118 connects an outlet of the gas contactor 102 to an inlet of the separation chamber, and an outlet pipe 120 connects an outlet of the separation chamber to an inlet of the gas contactor, so that a stream of first absorbent solution 110 can be pumped from the gas contactor, through the separation chamber, and then recirculated to the gas contactor.

A positive electrode 122 is connected to the ion-separator 104 on the side of the anion-exchange membrane, and a negative electrode 124 is connected to the ion-separator 104 on the side of the cation-exchange membrane.

The ion-separator comprises a first flow electrode channel 126 between the anion-exchange membrane and the positive electrode 122, and a second flow electrode channel 128 between the cation-exchange membrane and the negative electrode 124.

One end of a flow electrode outlet pipe 130 is connected to outlets of both the first flow electrode channel 126 and the second flow electrode channel 128, and the other end of the flow electrode outlet pipe 130 is connected to an inlet of the release vessel 106. A flow electrode inlet pipe 132 is connected between an outlet of the release vessel 106 and inlets of both the first flow electrode channel 126 and the second flow electrode channel 128.

Flow electrodes are formed by pumping a second absorbent solution 134 containing a suspension of electrically-conductive particles through both flow electrode channels 126, 128 and into the release vessel, and recirculating the second absorbent solution 134 from the release vessel 106 to the flow electrode channels 126, 128.

In use, a flow of gas 108 which contains a target species to be captured is introduced into the gas contactor 102, at the same time that a first absorbent solution 110 containing a capture species is introduced into the gas contactor. As the gas 108 comes into contact with the first absorbent solution 110, mass transfer of the target species into the absorbent solution takes place, so that the first absorbent solution 110 absorbs some of the target species from the gas.

The target species is dissolved in the first absorbent solution 110, optionally assisted by the presence of a hydration catalyst in the first absorbent solution, and forms a target anion and a hydrogen cation. The target anion and the hydrogen cation together form a target acid, but in the first absorbent solution 110 the target anion may bind to, or associate with, the capture species.

The first absorbent solution 110 is continuously pumped from the outlet of the gas contactor 102, through the inlet pipe 118, to the inlet of the separation chamber 112 of the ion-separator 104, from where the liquid first absorbent solution 110 flows through the porous solid electrolyte.

During operation, a potential difference is applied between the positive electrode 122 and the negative electrode 124. This potential difference across the ion-separator means that as the first absorbent solution 110 flows through the separation chamber, the negatively-charged target anions are dissociated from the capture species and attracted towards the positive electrode, while the positively-charged hydrogen cations are attracted towards the negative electrode. The target anions therefore migrate through the anion-exchange membrane 114, and the hydrogen cations flow through the cation-exchange membrane 116, so that the target acid ions are separated from the first absorbent solution. Neither the anion-exchange membrane 114 nor the cation-exchange membrane 116 is permeable to the capture species, so the capture species remains in the first absorbent solution 110.

By the time that the first absorbent solution 110 reaches the outlet of the separation chamber 112, at least some of the target acid ions (target anions and hydrogen cations) have been separated from the stream of first absorbent solution 110, and the first absorbent solution is recirculated through the outlet pipe 120 to the inlet of the gas contactor 102.

During operation, a stream of the second absorbent solution 134 containing a slurry of conductive particles is pumped through the first flow electrode channel 126 and the second flow electrode channel 128, so that target anions and hydrogen cations passing through the ion-exchange membranes are transferred into the stream of second absorbent solution 134. The target anions and hydrogen cations are recombined in the flow electrode outlet pipe 130, as they flow to the release vessel 106, and reassociate with one another so that the stream of second absorbent solution 134 contains the target acid when it reaches the release vessel 106.

Once in the release vessel 106, at least some of the target species is released from the second absorbent solution as a gas. This is preferably driven solely by equilibrium, and the target species gas preferably evolves from the second absorbent solution at room temperatures and pressures, without requiring additional heating or the use of a gas stripper.

The released gas of the target species can then be removed from the release vessel 106 and compressed, stored or reacted as desired.

In order to provide continuous flow electrodes, a stream of the second absorbent solution 134 is pumped back to the inlets of the inlets of both the first flow electrode channel 126 and the second flow electrode channel 128 through a flow electrode outlet pipe 130.

Using this system, the target species can be continuously absorbed from the flow of gas 108, transferred from the first absorbent solution to the second absorbent solution, and eventually released in the release vessel 106.

A particularly preferred embodiment of the invention that can be performed using this set-up is the capture of carbon dioxide ($CO_2$) from air.

In this embodiment, air is used as the flow of gas 108, and the first absorbent solution 110 is an aqueous solution containing a $CO_2$ hydration catalyst.

A particularly preferred option for the first absorbent solution and capture species in this embodiment is an aqueous solution polymer resin particles functionalised with cationic functional groups, for example Lewatit R VP OC1065, containing a hydration catalyst of carbonic anhydrase.

As air is introduced to the gas contactor 102 and brought into contact with the solution of cationic polymer particles and carbonic anhydrase, $CO_2$ from the air is absorbed by the solution and hydrated, in order to form carbonic acid (bicarbonate anions and hydrogen cations) according to the following equilibrium:

The bicarbonate anions bind to the weakly basic cationic polymer particles, while the free hydrogen cations reduce the pH of the first absorbent solution.

When the stream of first absorbent solution 110 reaches the ion-separator 104, the hydrogen cation is separated from the first absorbent solution through the cation-exchange membrane (for example Nafion®), and the bicarbonate acid anion ($HCO_3^-$) dissociates from the cationic polymer particles and migrates through the anion-exchange membrane (for example Sustainion®). Neither ion-exchange membrane is permeable to the cationic polymer resin particles, so the capture species remains in the first absorbent solution. Both target anions and hydrogen cations are then transferred into the stream of second absorbent solution 134 flowing through the flow electrode channels, and recombined to form carbonic acid. In this embodiment, the second absorbent solution does not contain any of the capture species, nor any other cationic species to which the bicarbonate anions can bind.

A preferred second absorbent solution 134 for use in this embodiment is a non-aqueous solution of dimethyl carbonate containing a suspension of activated carbon nanoparticles to act as the flow electrode.

A particular benefit of this embodiment is that carbonic acid and its ions (H+ and $HCO_3^-$) are naturally metastable at room temperature. In order to prevent the formation of gas bubbles in the ion-separator, the ion-separator is pressurised to a pressure at which gas bubbles cannot form. As the stream of second absorbent solution 134 containing carbonic acid arrives at the release vessel 106, the pressure is decreased. As the ions are electrochemically separated and introduced into the second absorbent solution, equilibrium begins to favour $CO_2$ due to the increasing concentration of H+ and $HCO_3$— in the second absorbent solution. The carbonic acid ions thus become naturally inclined to dehydrate to form gaseous $CO_2$, which is then released from the second absorbent solution in the release vessel.

This release step may be carried out entirely at room temperature and pressure. Energy-intensive heating to the high temperatures used by the prior art, for example 90-100° C. for gas strippers, is not required, making the process much more environmentally-friendly. The use of a non-aqueous second absorbent solution also advantageously means that the released carbon dioxide gas does not have a high humidity and does not require the energy-intensive subsequent drying step that is part of some prior art methods.

Using this method, dilute $CO_2$ gas in air (in quantities far below 1 vol %) may be captured out of the air and concentrated as pure $CO_2$ gas.

The same apparatus and the same technique may alternatively be used to capture other target species from air, or from another gas source. For example the target species may be $H_2S$, $SO_2$, NO, $NO_2$, and $N_2O$. In order to capture different target species, different hydration catalysts may be used, and the target species would form the conjugate acids of the target species. For certain target species, the second absorbent solution may be heated to encourage release of the target species, or the target species may be concentrated to a predetermined molarity in the second absorbent solution and then discharged.

Figure 2A:
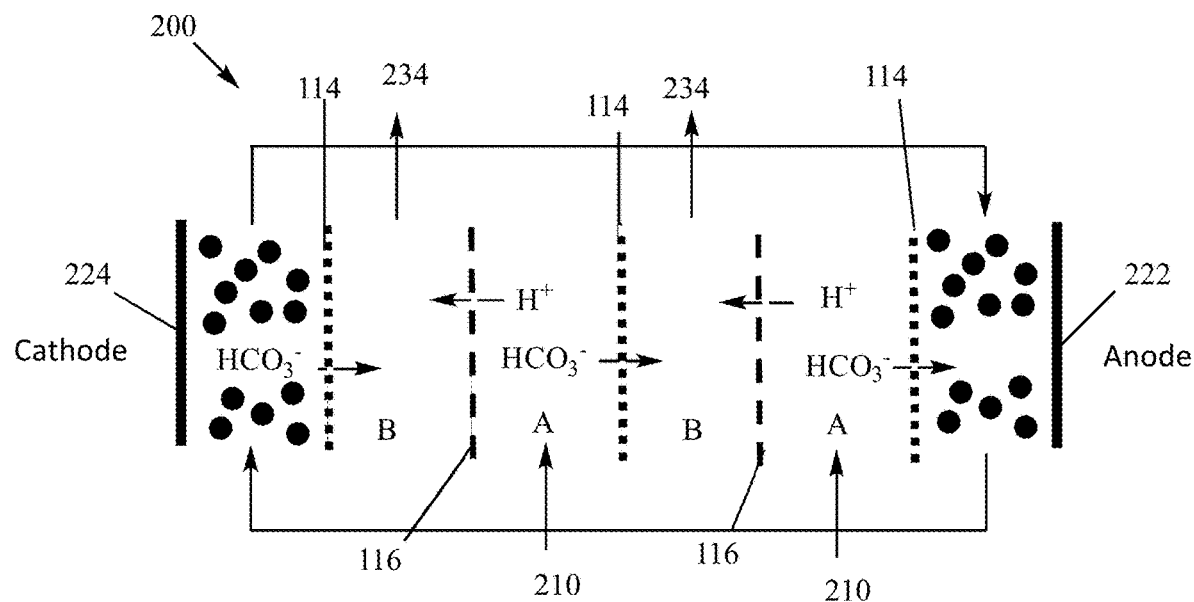
FIG. 2A is a schematic illustration of a hybrid flow-CDI-electrodialysis apparatus usable in a preferred embodiment of the present invention.
Figure 2B:
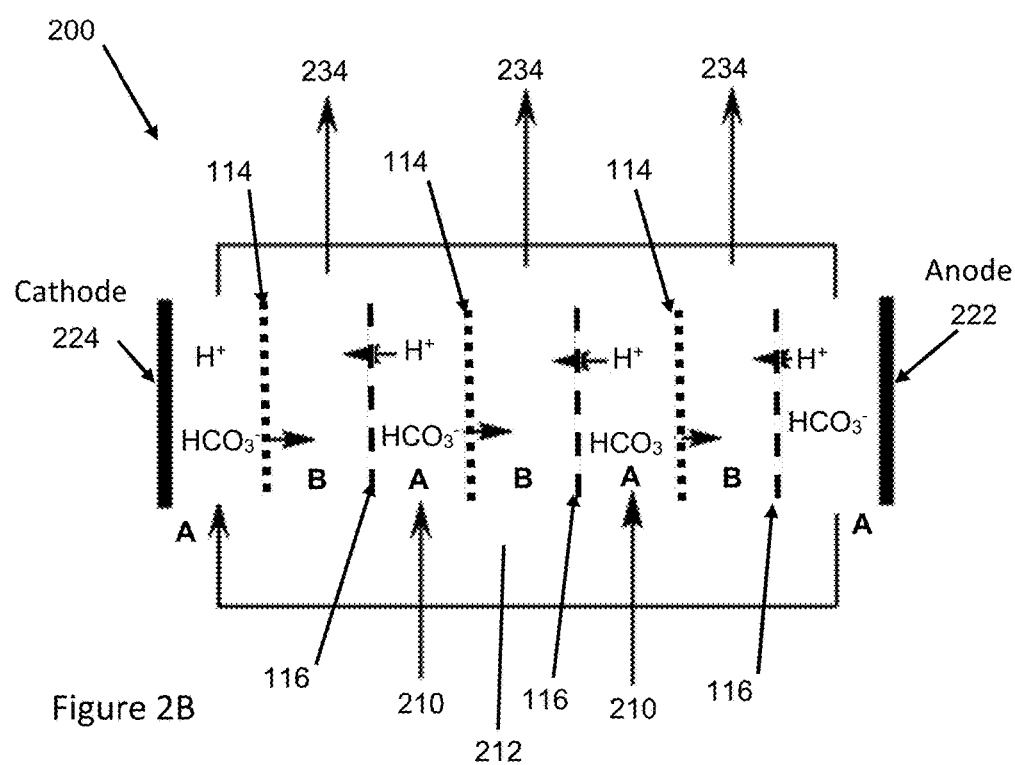
FIG. 2B is a schematic illustration of an alternative electrodialysis apparatus usable in a preferred embodiment of the present invention.

FIGS. 2A and 2B illustrate two preferred embodiments of the present invention which employ an electrodialysis stack 200 as an alternative ion-separator to electrochemically separate ions as part of a gas capture process.

In FIG. 2A, the apparatus is a hybrid of flow-CDI and electrodialysis which uses flow electrodes, while in FIG. 2B, the electrodialysis apparatus 200 does not use flow electrodes.

The electrodialysis stack 200 may be used with the gas contactor 102 and the release vessel 106 described above.

The electrodialysis stack 200 contains a separation chamber 212 that is filled with a porous solid electrolyte, between a positive electrode (anode) 222 and a negative electrode (cathode) 224. Three pairs of anion-exchange membranes 114 and cation-exchange membranes 116 are arranged in parallel between the electrodes, dividing the separation chamber 212 into seven adjacent compartments between the two electrodes. The two outermost compartments are formed by an electrode and an ion-exchange membrane, while the five intervening channels A, B are formed by pairs of opposing ion-exchange membranes.

First absorbent solution 210 is pumped through channels A, while second absorbent solution 234 is pumped through channels B.

During operation, a potential difference is applied between the anode 222 and the cathode 224, and liquid first absorbent solution 210 containing target anions and hydrogen cations is pumped into one end of four of the adjacent channels A.

For the purposes of illustration, FIG. 2 shows the counterions of carbonic acid (bicarbonate anions and hydrogen cations) being separated by the electrodialysis stack 200, but the same apparatus may be used with alternative target anions and target acids.

As the first absorbent solution 210 containing a capture species, target anions and hydrogen cations flows through the channels A, the electrical field between the electrodes attracts the target anions ($HCO_3$— in the illustrated case of carbonic acid) towards the positive electrode 222, and the acid cations ($H^+$) towards the negative electrode 224. Thus anions are dissociated from the capture species and migrate out of the channel A and into an adjacent channel B by passing through the anion-exchange membrane 114 contacting the channel A, while cations migrate in the other direction out of the channel A and into an adjacent channel B by passing through the cation-exchange membrane 116. Neither ion-exchange membrane is permeable to the capture species, so the capture species remains in the first absorbent solution.

The target anions and hydrogen cations are concentrated in the channels B, as once anions migrate into a channel B they are prevented from migrating further towards the anode as they cannot pass through the cation-exchange membrane 116 forming one side of the channel B. Likewise, cations migrating in the other direction are trapped in the channel B by the anion-exchange membrane 114. The target anions and hydrogen cations therefore associate to form a target acid that is the conjugate acid of the target species.

As described above, the electrodialysis stack 200 is maintained under an elevated pressure at which gas bubbles of the target species cannot form, as bubble formation inside the cell may damage one or more membranes and harm performance.

Using this arrangement, the target acid counterions can be concentrated in streams of the second absorbent solution 234 in channels B, which are then circulated to the release vessel, so that the target species can be released from the second absorbent solution 234.

The flow electrodes in FIG. 2A are made up of a separate third solution containing a suspension of conductive particles, which is recirculated between the electrodes and kept separate from the first and second absorbent solutions. They ensure ions can continuously migrate into each compartment by picking up target anions (bicarbonate) at the anode and dropping it off at the cathode.

Figure 3:
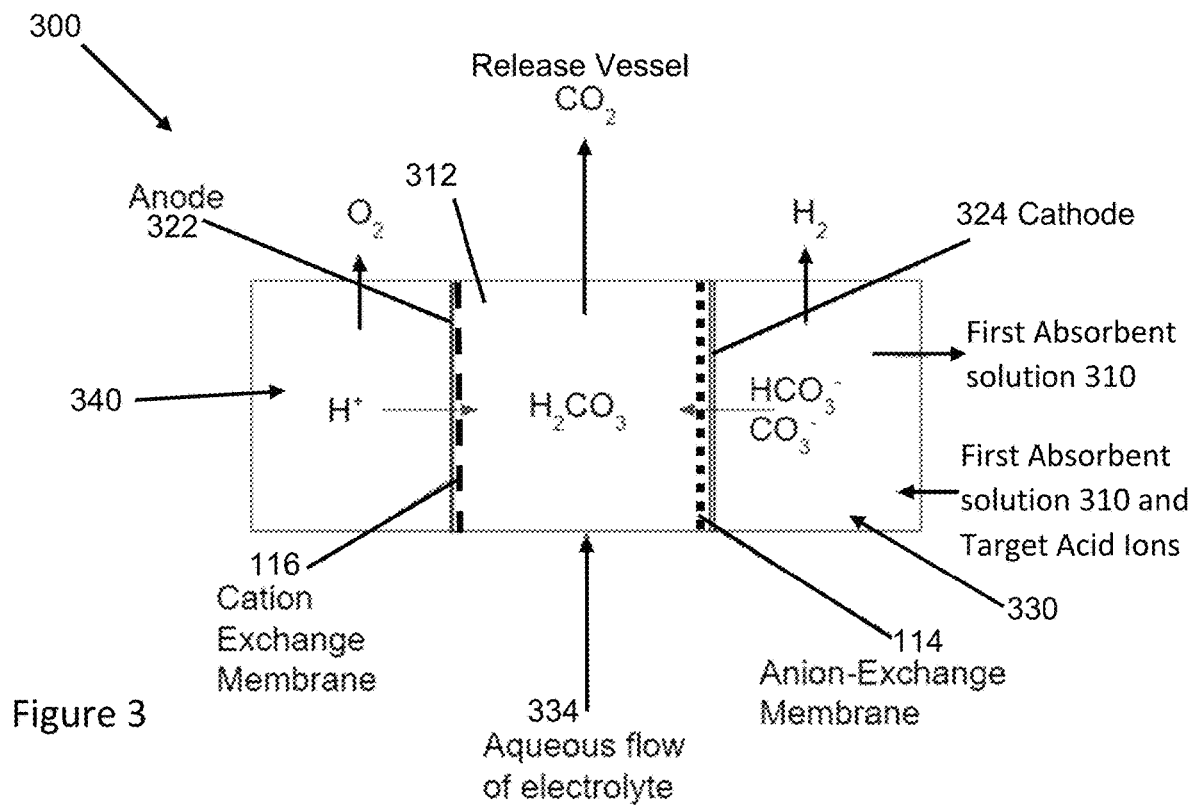
FIG. 3 is a schematic illustration of an electrolyzer-electrodialysis apparatus usable in a preferred embodiment of the present invention.

FIG. 3 is a schematic illustration of an electrolyzer-electrodialysis apparatus 300 usable in a preferred embodiment of the present invention. Figure is described in relation to bicarbonate ions and carbonic acid for illustration.

The electrodialysis apparatus 300 contains a second absorbent chamber 312 that is filled with a porous solid electrolyte, between a positive electrode (anode) 322 and a negative electrode (cathode) 324. A pair of ion-exchange membranes—an anion-exchange membrane 114 and a cation-exchange membrane 116—are arranged in parallel between the electrodes, dividing the apparatus 300 into three compartments: a cathodic compartment 330 on an inlet side of the anion-exchange membrane 114, an anodic compartment 340 on an inlet side of the cation-exchange membrane 116, and the second absorbent chamber 312 between the two membranes.

During operation, a potential difference is applied between the anode 322 and the cathode 324. Liquid first absorbent solution 310 containing a capture species, bicarbonate anions and hydrogen cations is pumped from a capture vessel (not shown) into the cathodic compartment 330 and circulated around the cathodic chamber. A second absorbent solution 334, which in this example is an aqueous flow of electrolyte, for example sodium sulfate or sodium chloride, is pumped through the second absorbent chamber 312. $H_2O$ is pumped into the anodic compartment 340.

As the cathode is in an alkaline environment, but also contains hydrogen ions formed by dissolution of the target species in the first absorbent solution, two reactions take place. At the negatively charged cathode, a reduction reaction takes place, with electrons ($e^-$) from the cathode combining with hydrogen cations to form hydrogen gas. The reduction reaction taking place at the cathode is: $2H_2O$ (l)$+2e^- \rightarrow 2OH^-$ (aq)$+H_2$ (g) ($OH^-$ is mostly neutralised by $HCO_3^-$ to form carbonate), while the reaction $2H^+ + 2e^- \rightarrow H_2$ also occurs to evolve hydrogen gas.

At the positively charged anode, an oxidation reaction occurs, generating oxygen gas and giving electrons to the anode to complete the circuit. The reaction taking place at the anode is: $2H_2O$ (l)$\rightarrow O_2$ (g)$+4e^- + 4H^+$ (aq).

As the first absorbent solution 310 containing the target anions ($HCO_3^-$— bicarbonate anions in the illustrated case of carbonic acid) flows into the cathodic compartment 330, the electrical field between the electrodes attracts the target anions through the anion-exchange membrane 114, and the hydrogen cations ($H^+$) in the first absorbent solution are released as hydrogen gas. Thus target anions migrate out of the cathodic compartment 330 and into the second absorbent chamber 312 by passing through the anion-exchange membrane 114. At the same time, hydrogen cations ($H^+$) formed by electrolysis at the anode are attracted through the cation exchange membrane 116, and migrate into the second absorbent chamber 312.

Using this arrangement, the target anions ($HCO_3^-$) are combined with hydrogen cations to form the target acid (carbonic acid in the illustrated example) and concentrated in the streams of the second absorbent solution 334 through the second absorbent chamber 312. The second absorbent chamber 312 is maintained at a sufficiently high pressure that the target acid does not decompose to form gas bubbles inside the apparatus 300.

The stream of second absorbent solution is then circulated to the release vessel (not shown). Once in the stream of second absorbent solution 334, the pressure is reduced and the carbonic acid counterions decompose to form gaseous $CO_2$, which is released from the second absorbent solution 334 and collected in the release vessel.

While prior art documents such as EP2163294 have employed electrodialysis for CO2 capture, in EP2163294 water dissociation is carried out by bipolar membranes (BPMs), which exhibits limited stability, having to perform highly reductive and highly oxidative reactions simultaneously.

The cell configuration in FIG. 3 also eliminates the use of bipolar membranes which are approximately ten times more expensive than anion-exchange membranes.

The cell configuration illustrated in FIG. 3 may preferably be scaled up by adding a plurality of pairs of ion-exchange membranes to increase the quantity of $CO_2$ released per molecule of hydrogen and oxygen. The greater the number of pairs of ion-exchange membranes, the more $CO_2$ will be released per molecule of $H_2/O_2$ generated.

The nature of the cell design shown in FIG. 3 means that hydrogen may be produced with efficiencies competitive with current PEM electrolysers, for example 50-60 kWh/kg (of $H_2$) efficiency.

Figure 4:
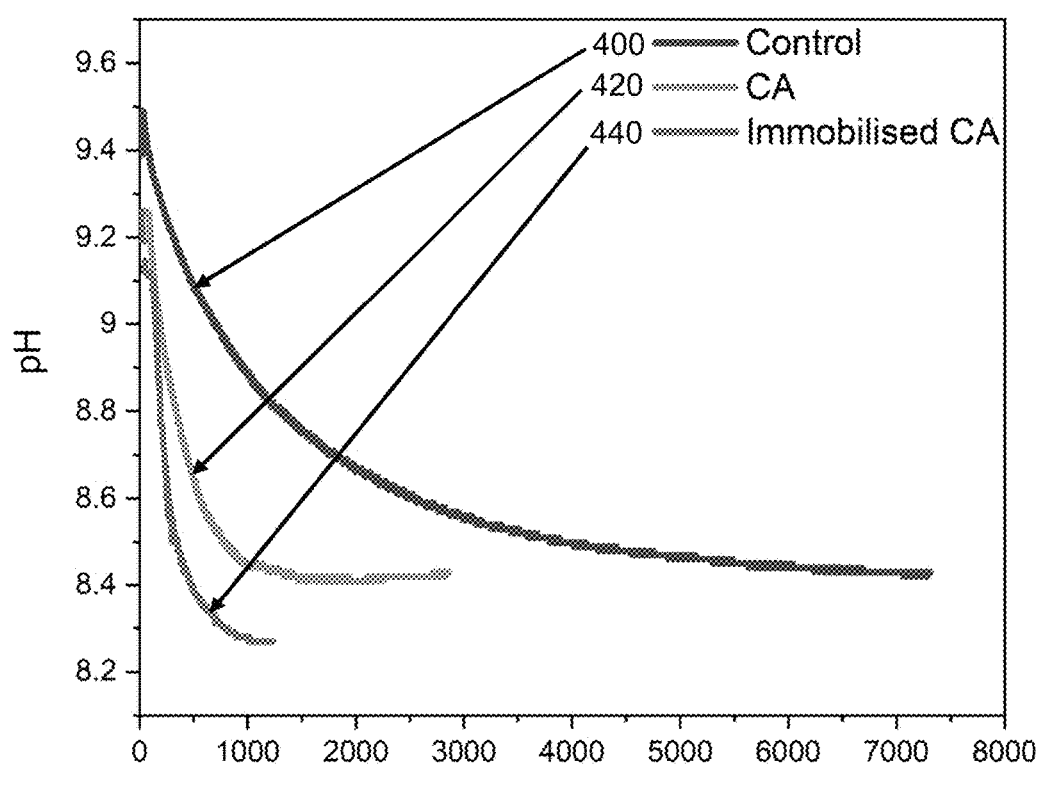
FIG. 4 is a graph of pH change vs time, on sparging air at 1 L per minute through a solution according to a preferred embodiment of the present invention.
Figure 5:
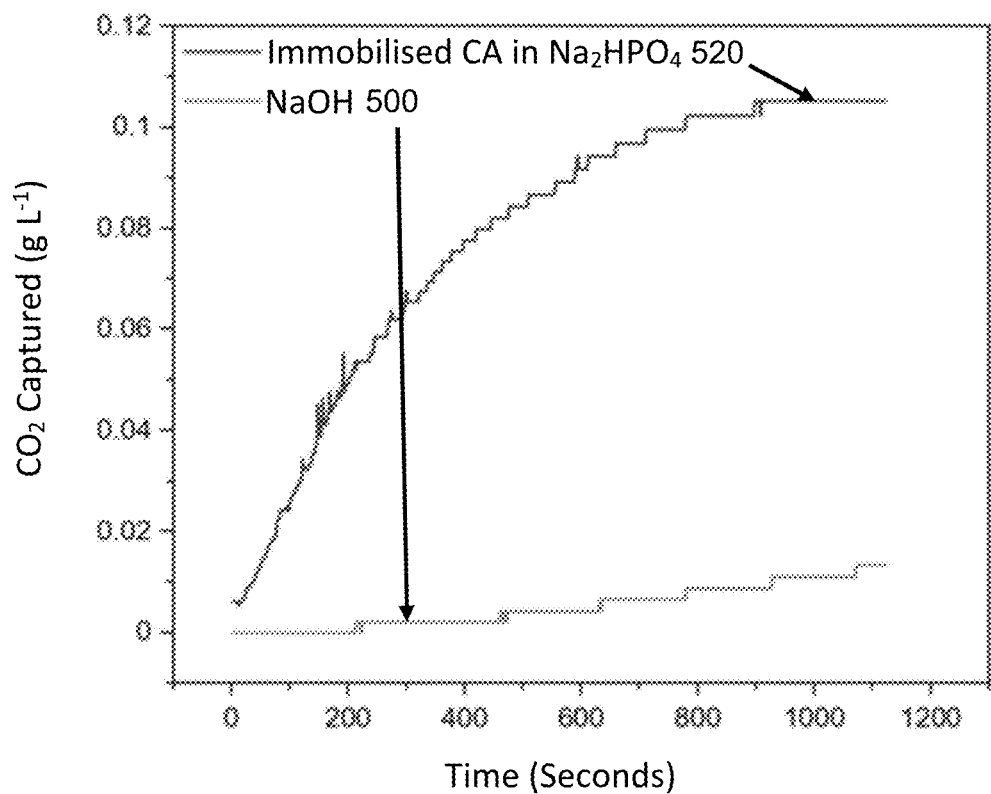
FIG. 5 is a graph of captured $CO_2$ vs time, on sparging air at 1 L per minute through a solution according to a preferred embodiment of the present invention.
Figure 6:
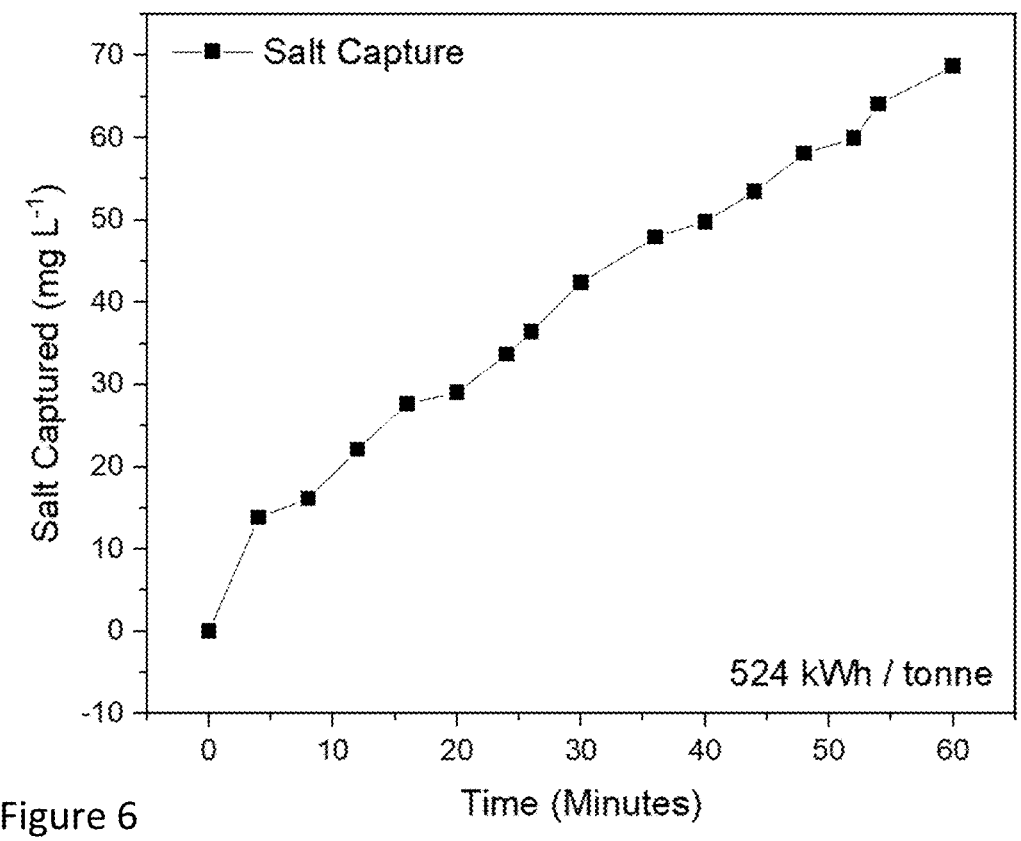
FIG. 6 is a graph of salt captured vs time in a flow-CDI cell, according to a preferred embodiment of the present invention.

FIGS. 4 to 6 illustrate experimental data obtained by the inventors in relation to the direct air capture of carbon dioxide using the method of the present invention.

FIG. 4 illustrates the measured pH change over time of three potential first absorbent solutions, on sparging air through each solution at a rate of 1 L per minute. This experiment demonstrates the effectiveness of:

Line 400: $Na_2HPO_4$ (0.1M, 100 mL).
Line 420: $Na_2HPO_4$ (0.1 M, 100 mL)+0.2 mg mL$^{-1}$ of bovine carbonic anhydrase.
Line 440: $Na_2HPO_4$, (0.1 M, 100 mL)+0.2 mg mL$^{-1}$ equivalent immobilised bovine carbonic anhydrase on $Fe_3O_4$ particles.

Immobilised enzymes used in the present invention may preferably be immobilised onto particles that are dispersed throughout the first absorbent solution as a suspension. In particularly preferred embodiments, magnetic $Fe_3O_4$ particles have been used as carrier particles on which the enzyme, for example bCA is immobilised.

While $Na_2HPO_4$ is not a preferred capture species for the present invention, in this case $Na_2HPO_4$ was used as a control to demonstrate the relative efficacy of CA and immobilised CA on carbon dioxide capture.

As shown by FIG. 4, the pH of all three solutions decreased significantly, from around pH 9.1-9.5, to around pH 8.3 to 8.5, as air was sparged through the solutions. This results from the absorption of $CO_2$ from the air, and the conversion of the dissolved $CO_2$ into carbonic acid (bicarbonate anions and hydrogen cations). The acidic pH (<7) of the carbonic acid formed during this process naturally lowers the overall pH of the first absorbent solution, so that all three solutions eventually had a pH of 8.5 or less at equilibrium.

The comparative gradients of the three lines on FIG. 4 shows that the presence of carbonic anhydrase in the solution significantly increased the speed at which the solutions absorbed $CO_2$ and converted it to the ions of carbonic acid, with the solutions 420, 440 containing carbonic anhydrase reaching equilibrium far more quickly than the control sample 400 without any hydration catalyst.

FIG. 4 also shows that immobilised carbonic anhydrase in sample 440 was more effective than sample 420 in which the carbonic anhydrase was not immobilised. Sample 440 absorbed $CO_2$ and converted it to carbonic acid more quickly, and also reached equilibrium at a lower pH of around 8.3, suggesting that the immobilised catalyst caused the sample 440 to absorb more $CO_2$ than the other samples 400, 420.

This experiment therefore demonstrates the improvement in $CO_2$ capture and conversion to carbonic acid that is provided by carbonic anhydrase hydration catalyst, particularly when it is immobilised.

FIG. 5 illustrates the amount of $CO_2$ captured modelled using the measured pH change in two solutions following sparging air at a rate of 1 L min$^{-1}$ in 100 mL of solution.
Line 500: NaOH (0.1 M, 100 mL)
Line 520: $Na_2HPO_4$, (0.1 M, 100 mL)+0.2 mg mL$^{-1}$ equivalent immobilised bovine carbonic anhydrase.

As shown by FIG. 5, the sample 520 containing immobilised carbonic anhydrase in $Na_2HPO_4$ absorbs vastly more $CO_2$ than the NaOH sample 500 in the same amount of time. This demonstrates that the use of a hydration catalyst such as carbonic anhydrase provides significantly superior results than even highly alkaline absorbent solutions such as NaOH, which have been considered beneficial in the prior art.

In the illustrated experiments, $Na_2HPO_4$ was used as a carrier solution for the purposes of testing because it has a pH close to the optimum pH for bovine carbonic anhydrase to perform $CO_2$ hydration.

Despite the good rate for $CO_2$ capture demonstrated in FIG. 5, $Na_2HPO_4$ is not preferred as a first absorbent solution for the present invention as the capture capacity of $Na_2HPO_4$ is lower than desired for the present invention. The present invention also preferably avoids or at least reduces the use of membrane permeable alkali-metal salts such as $NaHPO_4$ in the first absorbent solution.

In all experiments described herein, $CO_2$ capture was measured using near-infrared sensors. In this case, near-infrared sensors were used to measure the background $CO_2$ of the incoming air to the capture vessel, and to record the concentration of $CO_2$ in the outlet from the capture vessel, so that the quantity of $CO_2$ captured and removed from the air by the first absorbent solution could be quantified.

FIG. 6 illustrates the effectiveness of salt separation carried out by a flow-CDI cell with $CO_2$ equivalent energy consumption of 524 kWh per tonne. In comparison to the >1500 kWh of thermal energy required for other $CO_2$ capture processes, this is extremely energy efficient.

In the experiment behind FIG. 6, a salt inlet stream which contained ~400 mg/L carbonate/bicarbonate buffer was introduced to a flow CDI cell at a rate of 15 mL min$^{-1}$, and flow electrode streams were pumped through the flow electrodes at a rate of 20 mL min$^{-1}$. The current density applied to the flow-CDI cell was 1 mA cm$^{-1}$ at a voltage of 1.2 V. This arrangement achieved a capture rate of 0.25 mg min$^{-1}$ cm$^{-2}$. The footprint of the flow-CDI cell was smaller than the air contactor which required 100 mL of volume, and so the flow-CDI is not rate limiting the process.

The rate of salt capture demonstrated by FIG. 6 shows that flow-CDI is an extremely effective and viable method for electrochemically separating the target acid ions from the first absorbent solution. While an amine sorbent or carbonate calciner requires between 1500-2000 kWh per tonne of $CO_2$, this process was found to have an equivalent energy consumption of only 534 kWh per tonne of $CO_2$.

Figure 7:
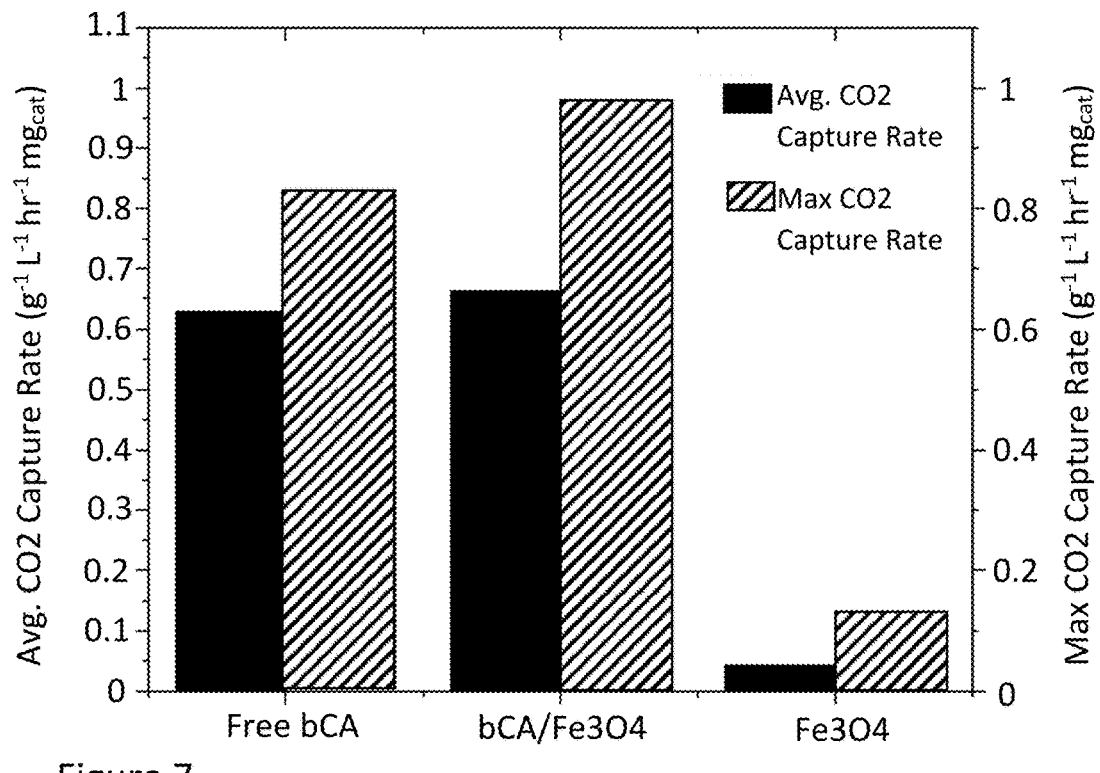
FIG. 7 is a graph comparing $CO_2$ capture rate for free bovine carbonic anhydrase (free bCA), bCA immobilised on $Fe_3O_4$, and $Fe_3O_4$.

FIG. 7 is a graph comparing average and maximum $CO_2$ capture rates for three different catalysts in exemplary first absorbent solutions:
free bovine carbonic anhydrase (free bCA), (0.2 mg/mL);
bCA immobilised on $Fe_3O_4$, (0.2 mg/mL bCA immobilised on 2.5 mg/mL $Fe_3O_4$); and
$Fe_3O_4$ (2.5 mg/mL).

All three absorbent solutions were made up of the catalyst in 100 mL of 0.1M $Na_2HPO_4$. Air was flowed through the absorbent solutions at a rate of 1 L per min.

Figure 8:
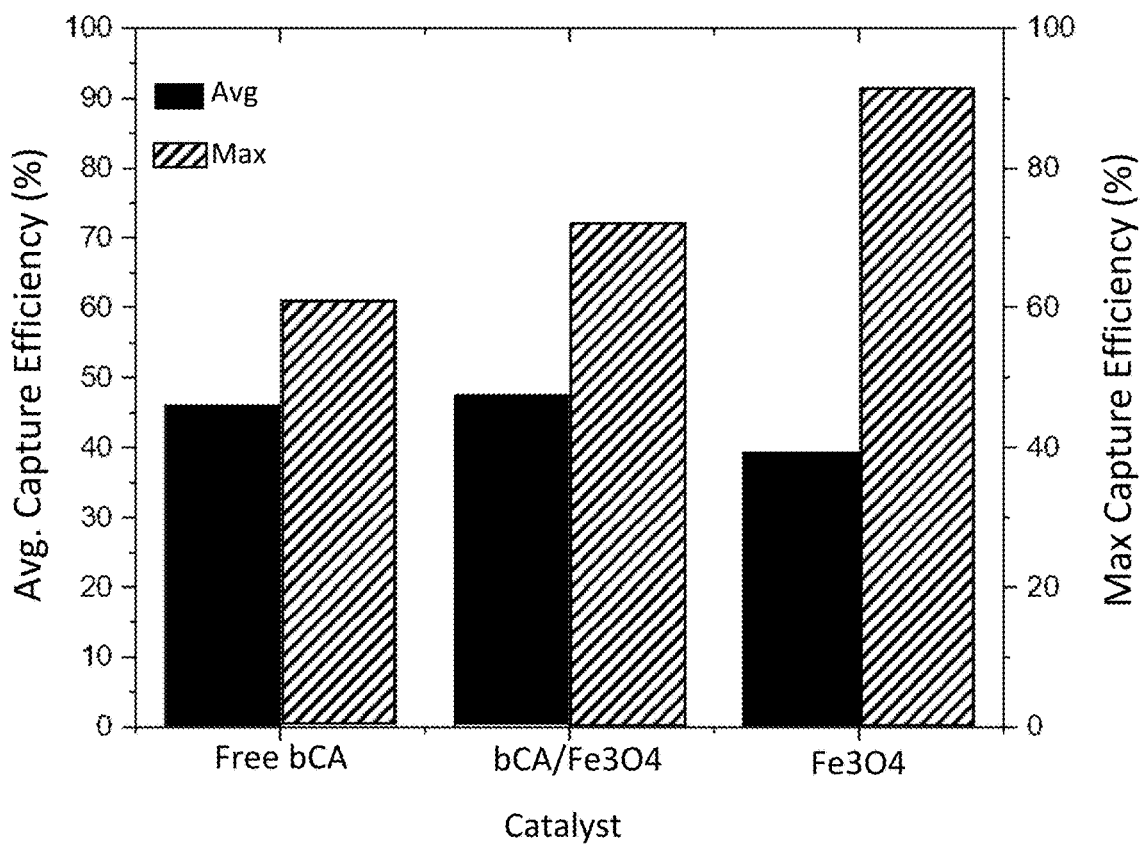
FIG. 8 is a graph comparing average capture efficiency and max capture efficiency for free bovine carbonic anhydrase (free bCA), bCA immobilised on $Fe_3O_4$, and $Fe_3O_4$.

FIG. 8 compares the average capture efficiency and maximum capture efficiency for the same three catalyst-containing absorbent solutions.

These results showed that the average $CO_2$ capture rates of both free bCA and bCA immobilised on $Fe_3O_4$ are significantly higher than that of $Fe_3O_4$ alone. The average capture efficiencies of the three catalysts ranged from around 38% for $Fe_3O_4$ to around 47% for immobilised bCA on $Fe_3O_4$, while the max capture efficiency was highest for $Fe_3O_4$.

Figure 9:
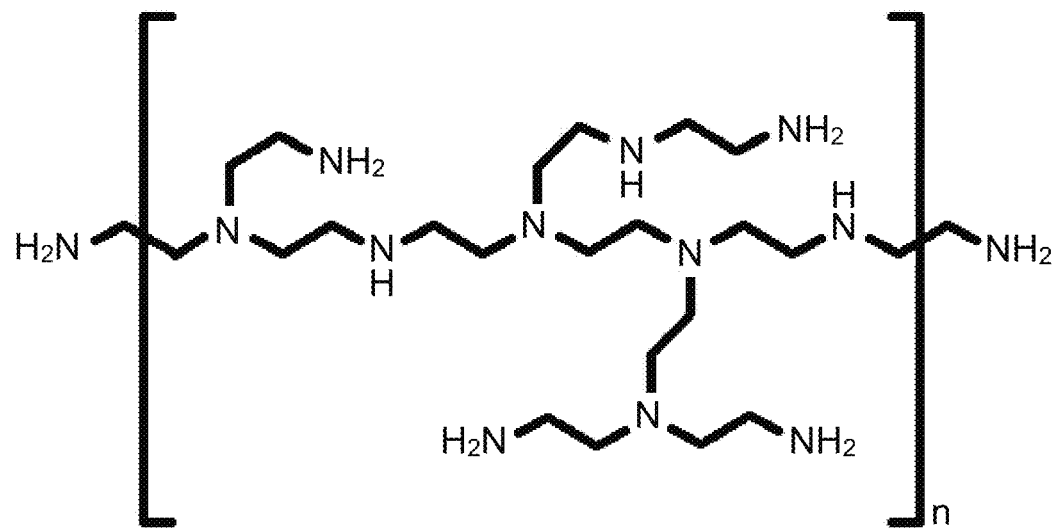
FIG. 9 illustrates the chemical structure of an exemplary branched Polyethyleneimine (PEI) polymer chain.

FIG. 9 illustrates the chemical structure of an exemplary Polyethyleneimine (PEI) chain, which is a cationic polymer containing branched amines. PEI is a preferred capture species, such that solutions of PEI are preferred first absorbent solutions usable in the present invention. PEI is water soluble and highly stable.

Figure 10:
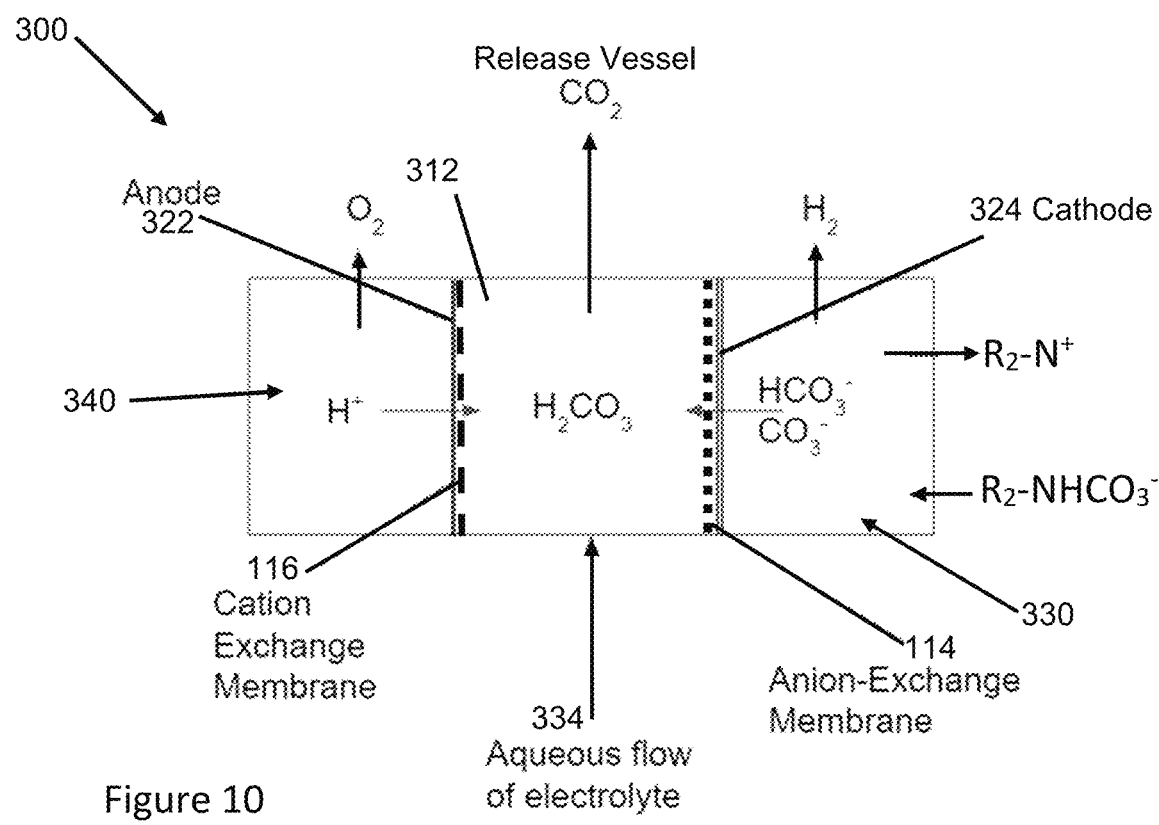
FIG. 10 is a schematic illustration of an electrolyzer-electrodialysis apparatus usable in a preferred embodiment of the present invention, in which polyethyleneimine (PEI) is used as the first absorbent solution.

FIG. 10 is a schematic illustration of the electrolyzer-electrodialysis apparatus 300 of FIG. 3, in which polyethyleneimine (PEI) is used in the first absorbent solution for $CO_2$ capture.

In this arrangement, the capture reactions taking place in the capture vessel (not shown) are:

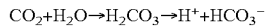

Polyethyleneimine (PEI) in the aqueous first absorbent solution reacts with the bicarbonate anions, it contains a 1:2:1 ratio of primary, secondary and tertiary amines. Primary and secondary amines react by the following mechanism:

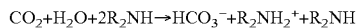

While tertiary amines react by the following mechanism:

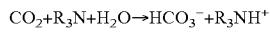

The first absorbent solution containing the dissolved bicarbonate anions captured as $R_2$—$NH^+[HCO_3]^-$ is then circulated from the capture vessel to the cathodic compartment 330, from which the bicarbonate anions $HCO_3^-$ are electrochemically separated and migrate through the anion-exchange membrane 114, while the carbonic acid cations in the first absorbent solution are released as hydrogen gas. The capture species PEI cations $R_2$—NH that remain are not membrane-permeable, and are recirculated from the cathodic compartment 330 back to the capture vessel to absorb more $CO_2$.

As described above in relation to FIG. 3, the bicarbonate anions are recombined with hydrogen cations in the second absorbent chamber 312, forming carbonic acid in the second absorbent solution 334 before decomposing as $CO_2$ gas that can be captured in the release vessel.

Figure 11:
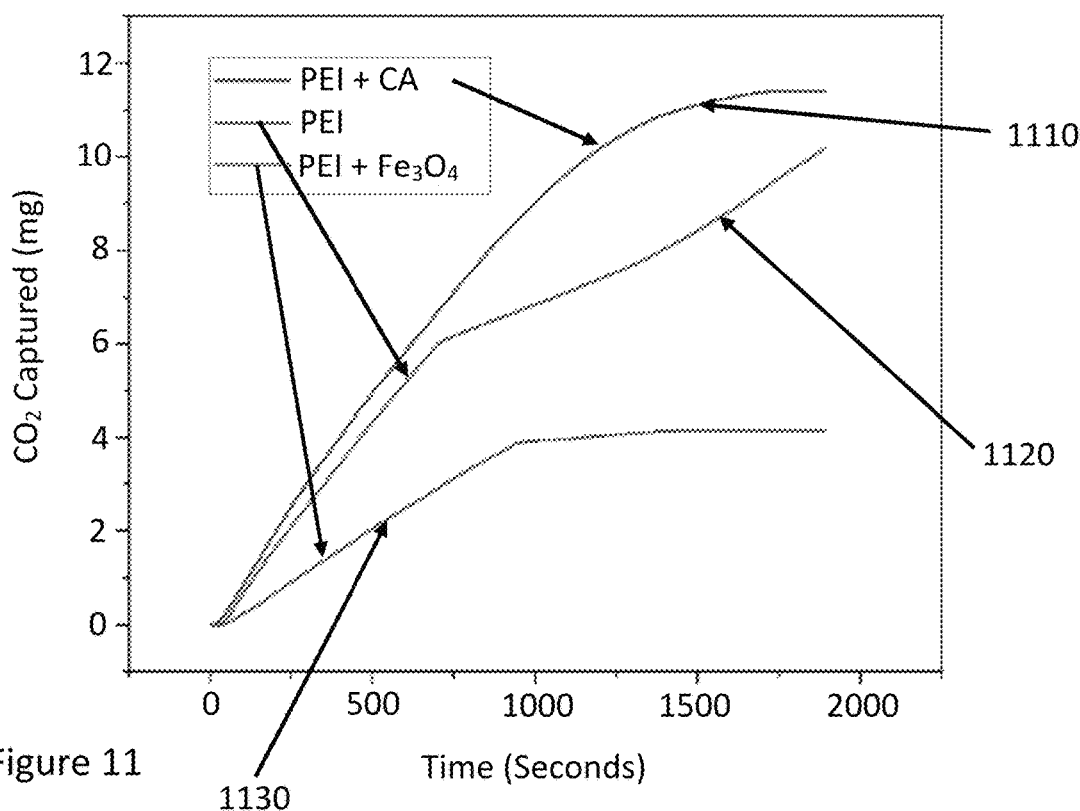
FIG. 11 is a graph of $CO_2$ captured with an $H_2O$/PEI solution.

FIG. 11 is a graph showing the mass of $CO_2$ captured with an $H_2O$/PEI first absorbent solution. Three alternative aqueous absorbent solutions with a PEI concentration of 1.2 mg $mL^{-1}$ (0.12 wt %) were compared:

PEI plus carbonic anhydrase (CA) 1110;
PEI 1120; and
PEI plus $Fe_3O_4$ 1130.

As shown in FIG. 11, the aqueous solution of PEI plus carbonic anhydrase (CA) 1110 captured more $CO_2$ than PEI alone 1120, and performed almost three times as well as PEI plus $Fe_3O_4$ 1130. PEI plus carbonic anhydrase (CA) therefore appears to be a promising combination of capture species and catalyst for the first absorbent solution in the present invention.

Figure 12:
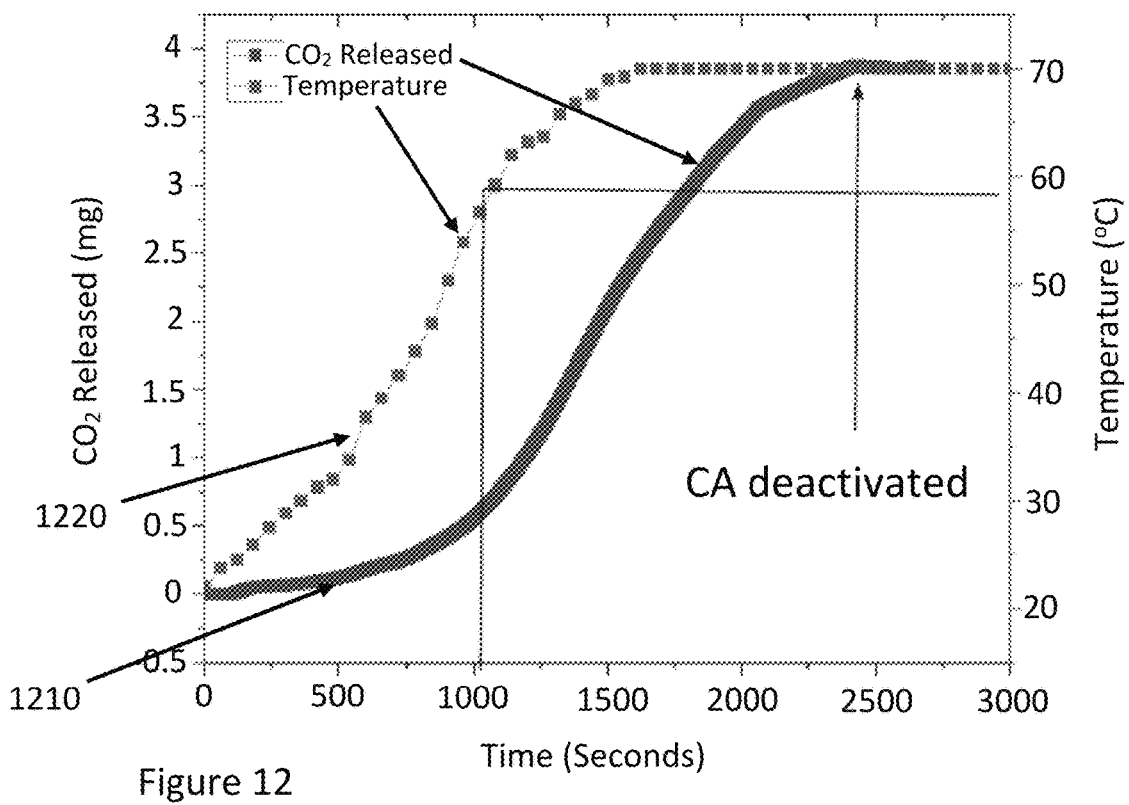
FIG. 12 is a graph of $CO_2$ released from an $H_2O$/PEI solution.

FIG. 12 is a graph showing the mass of $CO_2$ released 1210 from an $H_2O$/PEI solution with a PEI concentration of 1.2 mg $mL^{-1}$ (0.12 wt %) as the temperature 1220 of the solution is increased. While thermal desorption of $CO_2$ from PEI absorbent is not a necessary step in the present invention, the experimental results of FIG. 12 demonstrate the thermal reversibility of the PEI-$CO_2$ absorption process. The results of FIG. 12 show that $CO_2$ is gradually desorbed from PEI solution as the temperature of the solution increases, in particular at temperatures greater than 50° C. or 60° C. In the present invention the first absorbent solution is therefore preferably maintained at temperatures below 50° C., preferably below 40° C. or 30° C.

Figure 13:
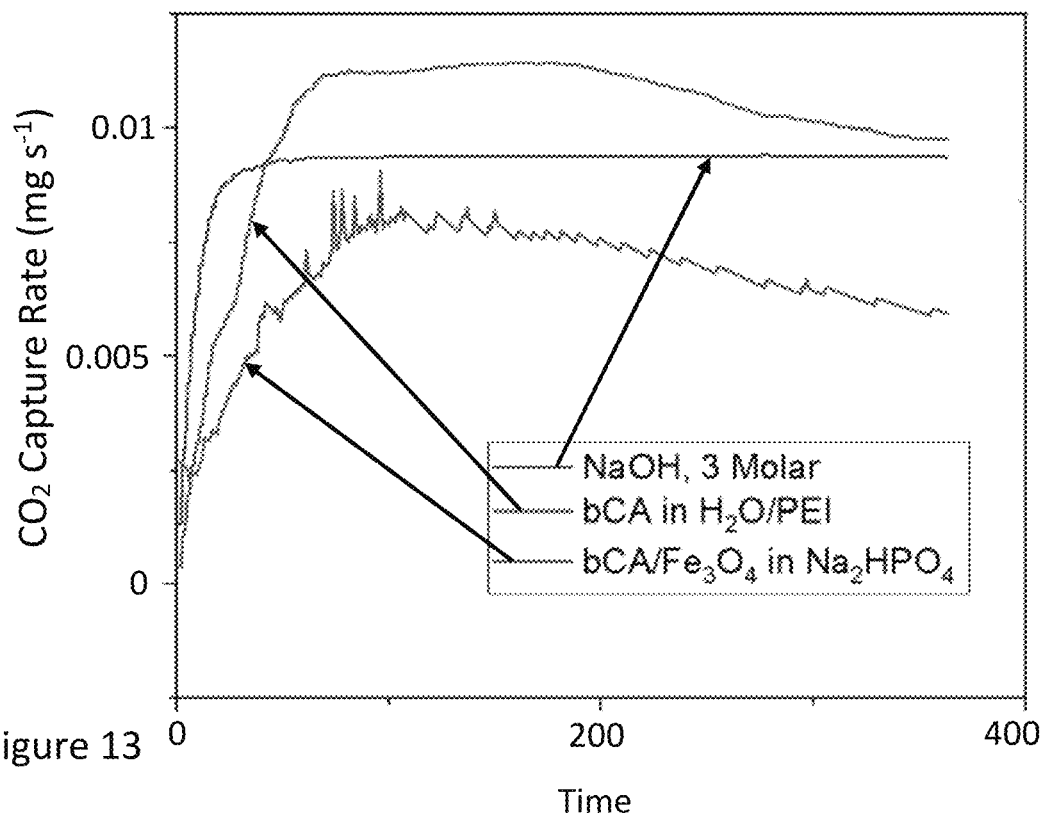
FIG. 13 is a graph comparing $CO_2$ capture rates of NaOH, bCA in $H_2O$/PEI, and bCA immobilised on $Fe_3O_4$ in in $Na_2HPO_4$.

FIG. 13 is a graph comparing $CO_2$ capture rates of three different first absorbent solutions: NaOH (3 Molar), bCA in $H_2O$/PEI, and bCA immobilised on $Fe_3O_4$ in $Na_2HPO_4$. The $CO_2$ capture in FIG. 13 was measured under fixed conditions using 50 mL of first absorbent solution and an air flow rate of 1 L $min^{-1}$ of air flowing through the absorbent solution.

The results of FIG. 13 showed that the capture rate of NaOH was initially the highest, but quickly reached steady state at a capture rate of around 0.008 mg $s^{-1}$. The capture rate of bCA immobilised on $Fe_3O_4$ in $Na_2HPO_4$ was the lowest of the three absorbents, peaking at around 0.008 mg $s^{-1}$ before dropping towards 0.006 mg $s^{-1}$ as time went on. The first absorbent solution of bCA in $H_2O$/PEI demonstrated the highest $CO_2$ capture rate, reaching around 0.012 mg $s^{-1}$ before dropping towards 0.0095 mg $s^{-1}$.

The concentration of NaOH tested was 120 g/L, which is the concentration that is used in the current state of the art of hydroxide based $CO_2$ capture. The concentration of PEI in the bCA in $H_2O$/PEI sample was however only 1300 mg/L. FIG. 13 therefore shows that the bCA in $H_2O$/PEI sample performed best, even though the PEI concentration was 92 times lower the NaOH concentration.

Figure 14:
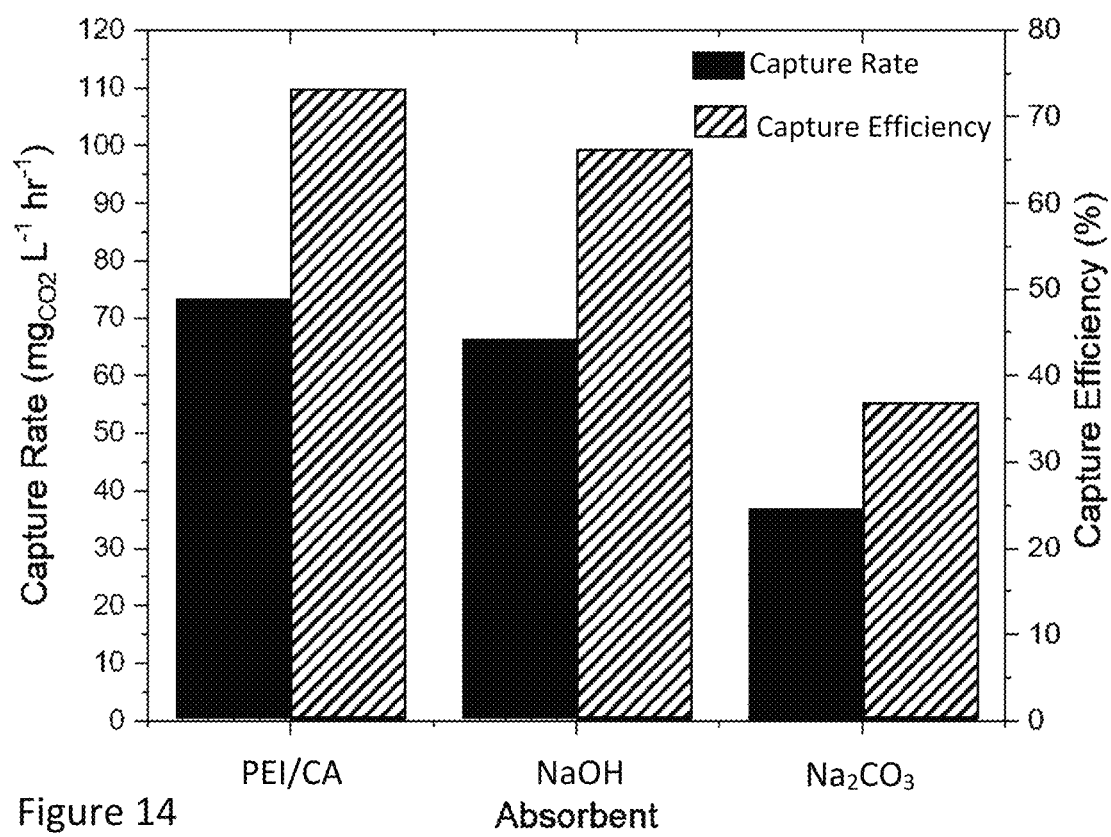
FIG. 14 is a graph comparing the capture rate and capture efficiency of aqueous absorbents PEI/CA, NaOH and $Na_2CO_3$.

FIG. 14 is a graph comparing the capture rate and capture efficiency of three different aqueous absorbents: PEI plus carbonic anhydrase (PEI/CA), NaOH and $Na_2CO_3$.

All three aqueous absorbent solutions tested had a liquid volume of 50 mL and an air flow rate of 1 L $min^{-1}$ through the solution. The PEI/CA solution contained 0.13 wt % PEI and 0.02 wt % CA. The NaOH solution contained 12 wt % NaOH. The $Na_2CO_3$ solution contained 29 wt % $Na_2CO_3$.

If these results are normalised by the quantity of absorbent in the solutions, the PEI/CA mixture achieves a capture rate per mg of absorbent that is around 92 times higher than the NaOH and $Na_2CO_3$ absorbents. This, combined with the advantage that the PEI/CA absorbent solution does not contain membrane-permeable ions that can reduce the efficiency of the electrochemical separation step, makes a first absorbent solution containing PEI and CA a promising candidate for use in the present invention.

Figure 15:
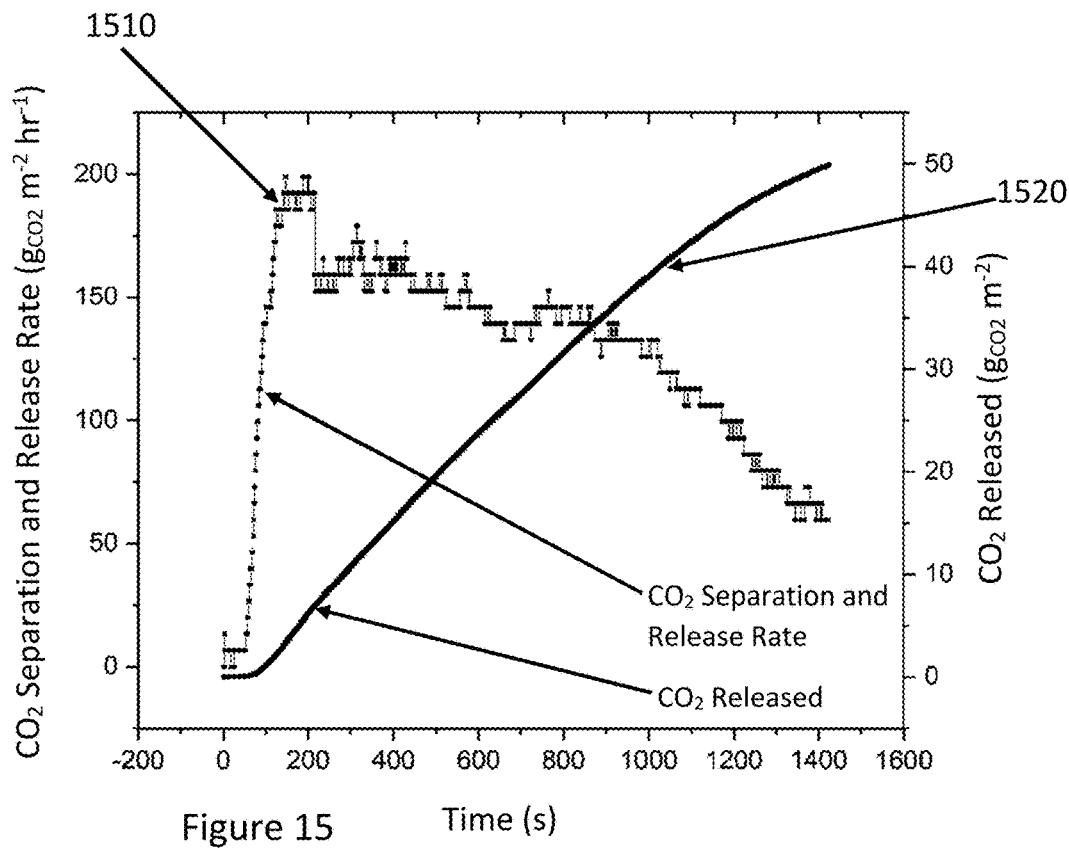
FIG. 15 is a graph of $CO_2$ released, and of the $CO_2$ separation and release rate, for continuous capture of $CO_2$ using PEI absorbent solution using the apparatus illustrated in FIG. 10.

An experiment was carried out to demonstrate the continuous capture of $CO_2$ using PEI absorbent solution using the apparatus illustrated in FIG. 10. FIG. 15 illustrates the $CO_2$ separation and release rate 1510, and the quantity of $CO_2$ released 1520 during this experiment.

In the experiment of FIG. 15, 25 mL of first absorbent solution containing 3.16% PEI was saturated with $CO_2$ from the air using a diaphragm pump at an airflow of 4 L $min^{-1}$. The absorbent solution was then circulated around the cathodic chamber of the electrodialysis cell 300 at a rate of 1 mL $min^{-1}$. Concurrently, a second solution containing 0.5 M NaCl was pumped between the anion and cation exchange membranes at a rate of 10 mL $min^{-1}$. A power supply was used to apply a voltage across the cell, and the current was gradually raised to a current density of 200 mA cm$^{-2}$ at a voltage of 4 V. At this current density, a steady stream of bubbles were observed to be exiting the cell along with the second solution, demonstrating that separation and release of CO$_2$ from the first absorbent solution were occurring concurrently (though in a full scale version of this apparatus the cell 300 would be pressurised to prevent bubble evolution inside the cell). The second solution and the evolved CO$_2$ bubbles were pumped to a release chamber through which a continuous stream of air was pumped to entrain the released CO$_2$. The quantity of evolved CO$_2$ was measured using a high speed near-IR sensor (SprintIR®-W 100% CO2 Sensor|CO2Meter.com). Air was continuously pumped from the release chamber at a rate of 300 mL min and analysed in the CO$_2$ meter.

Figure 16:
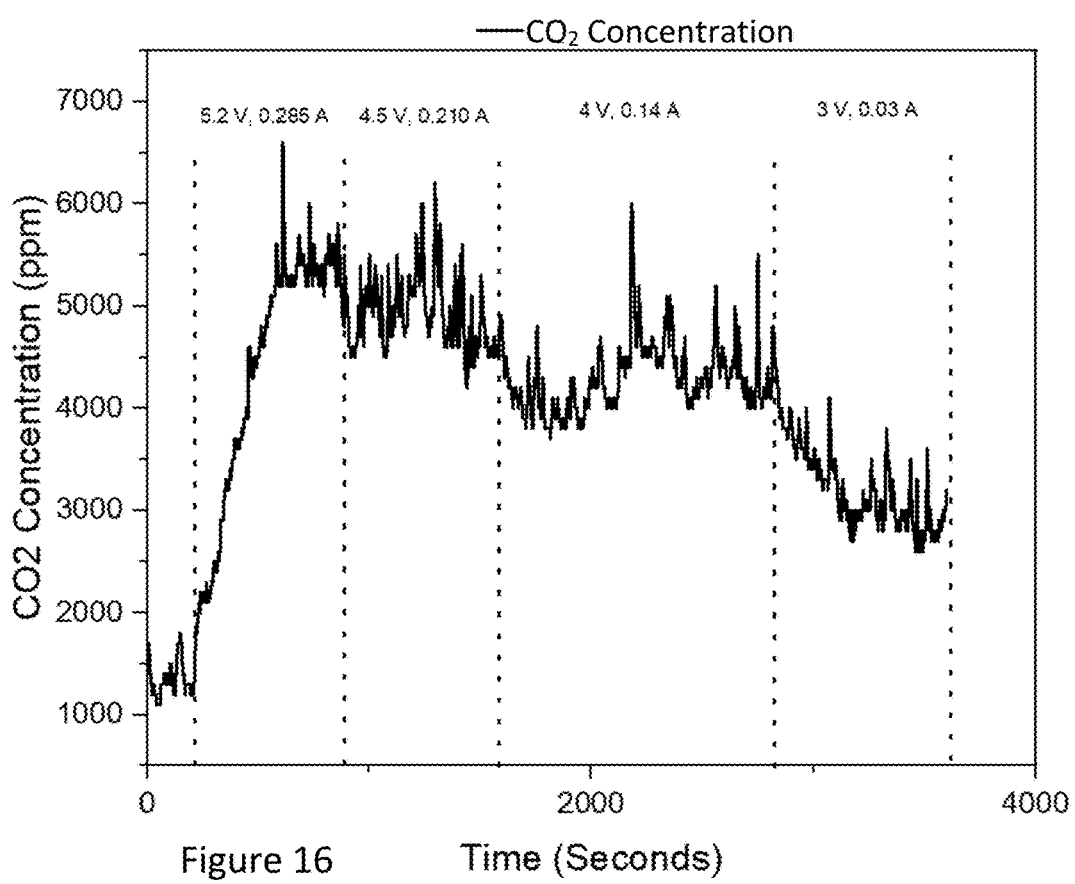
FIG. 16 is a graph illustrating the $CO_2$ separation and release rate for continuous capture of $CO_2$ using PEI absorbent solution using the apparatus illustrated in FIG. 10.

FIGS. 15 and 16 show that the CO$_2$ separation and release rate 1510 climbed rapidly and peaked at a rate of around 200 grams of CO$_2$ m$^{-2}$ hr$^{-1}$, before falling gradually. This fall in separation and release rate was thought to be caused by the fact that the electrodialytic cell was separating and releasing CO$_2$ more quickly than was being absorbed by the first absorbent solution. This experiment confirms that the apparatus of FIG. 10 achieved CO$_2$ separation rates in the same range as typical electrodialysis rates, and is not rate-limiting the capture step.

The total amount of CO$_2$ released 1520 was observed to be climbing continuously, reaching 50 grams of CO$_2$ m$^{-2}$ after around 1400 seconds.

The quantity CO$_2$ released and the CO$_2$ release rates are normalised by the interfacial surface area of the ion exchange membrane.

The cell tested in this experiment and shown in FIG. 10 contained only one pair of membranes (while electrodialysis stacks typically contain up to 500 pairs) and so the energy efficiency is not representative of what a full electrodialysis cell with a typical number of membrane pairs could achieve. However, the energy efficiency is in line with what would be expected for a 2 membrane cell.

Excluding the faradaic contribution of the electrodialysis cell, which becomes negligible in a full system, the energy calculated to perform this process is 4800 kWh tonne. This is expected to be significantly reduced with higher CO$_2$ concentration in solution, optimising the voltage/current and the use of flow electrodes and by increasing the number of cell pairs.

These results show that the aqueous first absorbent solution of PEI and CA can successfully capture CO$_2$ and convert it to carbonic acid ions, and that the HCO$_3^-$ anion of carbonic acid can be transported across an anion-exchange membrane into a second absorbent solution, and subsequently decomposed back to carbonic acid and released as pure gaseous CO$_2$.

Figure 17:
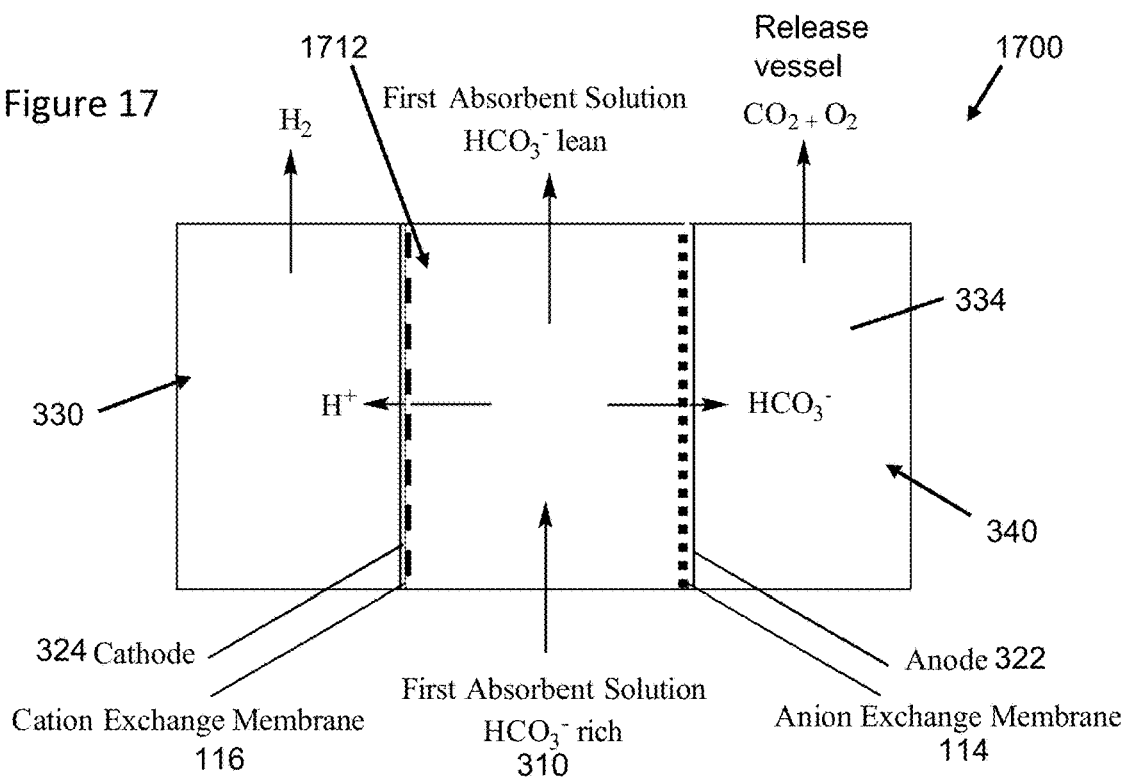
FIG. 17 is a schematic illustration of an alternative electrodialysis apparatus usable in a preferred embodiment of the present invention.

FIG. 17 shows an alternative electrodialysis apparatus 1700 usable in a preferred embodiment of the present invention. The apparatus 1700 of FIG. 17 is similar to the apparatus of FIGS. 3 and 10, with the differences that the configuration of the electrolyser is configured so that the first absorbent solution enters the central chamber of the cell, and the polarity of the electrodes is reversed.

The electrodialysis apparatus 1700 contains a first absorbent chamber 1712 that is filled with a porous solid electrolyte, between a positive electrode (anode) 322 and a negative electrode (cathode) 324. A pair of ion-exchange membranes—an anion-exchange membrane 114 and a cation-exchange membrane 116—are arranged in parallel between the electrodes, dividing the apparatus 1700 into three compartments: a cathodic compartment 330 on one side of the cation-exchange membrane 116, an anodic compartment 340 on one side of the anion-exchange membrane 114, and the first absorbent chamber 1712 between the two membranes.

During operation, a potential difference is applied between the anode 322 and the cathode 324. Liquid first absorbent solution 310 containing a capture species, target anions (bicarbonate anions in the case of the illustrated example) and hydrogen cations is pumped from a capture vessel (not shown) into the first absorbent chamber 1712. A second absorbent solution 334, which may be an aqueous or non-aqueous flow of electrolyte, for example sodium sulfate or sodium chloride, is pumped through the anodic compartment 340.

As the cathode is in an alkaline environment, but also contains hydrogen ions formed by dissolution of the target species in the first absorbent solution, two reactions take place. At the negatively charged cathode, a reduction reaction takes place, with electrons (e$^-$) from the cathode combining with hydrogen cations to form hydrogen gas. The reduction reaction taking place at the cathode is: 2H$_2$O (l)+2e$^-$→2OH$^-$ (aq)+H$_2$ (g) (OH$^-$ is mostly neutralised by HCO$_3$ to form carbonate), while the reaction 2H$^+$+2e$^-$→H$_2$ also occurs to evolve hydrogen gas from the cathodic compartment 330.

At the positively charged anode, an oxidation reaction occurs, generating oxygen gas and giving electrons to the anode to complete the circuit. The reaction taking place at the anode is: 2H$_2$O (l)→O$_2$ (g)+4e$^-$+4H$^+$ (aq).

As in the embodiments described above, the first absorbent solution contains a capture species such as PEI, and the anion- and cation-exchange membranes are impermeable to the capture species, so that the capture species is kept in the first absorbent solution 310.

As the first absorbent solution 310 containing the target anions (HCO$_3$— bicarbonate anions in the illustrated case of carbonic acid) flows into the first absorbent chamber 1712, the electrical field between the electrodes attracts the target anions through the anion-exchange membrane 114 and into the second absorbent solution 334 in the anodic compartment 340. At the same time, hydrogen cations (H$^+$) formed by electrolysis at the anode are created in the anodic compartment 340, where they can associate with the target anions to form the target acid in the second absorbent solution. The anodic compartment 340 is maintained at a sufficiently high pressure that the target acid does not decompose to form gas bubbles inside the apparatus 300. The target acid is concentrated in the stream of the second absorbent solution 334, which is circulated to a release vessel (not shown) where a gas of the target species (CO$_2$ gas in the illustrated example) is evolved and captured.

In this embodiment, some oxygen gas is present in the CO$_2$ stream. This can be removed by either burning the H$_2$+O$_2$+CO$_2$ stream, or by passing the gasses through a fuel cell to recover the energy.

The hydrogen cations (H$^+$) in the first absorbent solution migrate through the cation-exchange membrane 116 into the cathodic compartment 330, from which they are released as hydrogen gas. Thus target anions migrate out of the cathodic compartment 330 and into the second absorbent chamber 312 by passing through the anion-exchange membrane 114. At the same time, hydrogen cations (H$^+$) formed by electrolysis at the anode are attracted through the cation exchange membrane 116, and migrate into the second absorbent chamber 312.

Having lost the target bicarbonate anions and the hydrogen cations during the electrochemical separation process, the first absorbent solution 310 is recirculated to the capture vessel (not shown) still containing the capture species.

Figure 18:
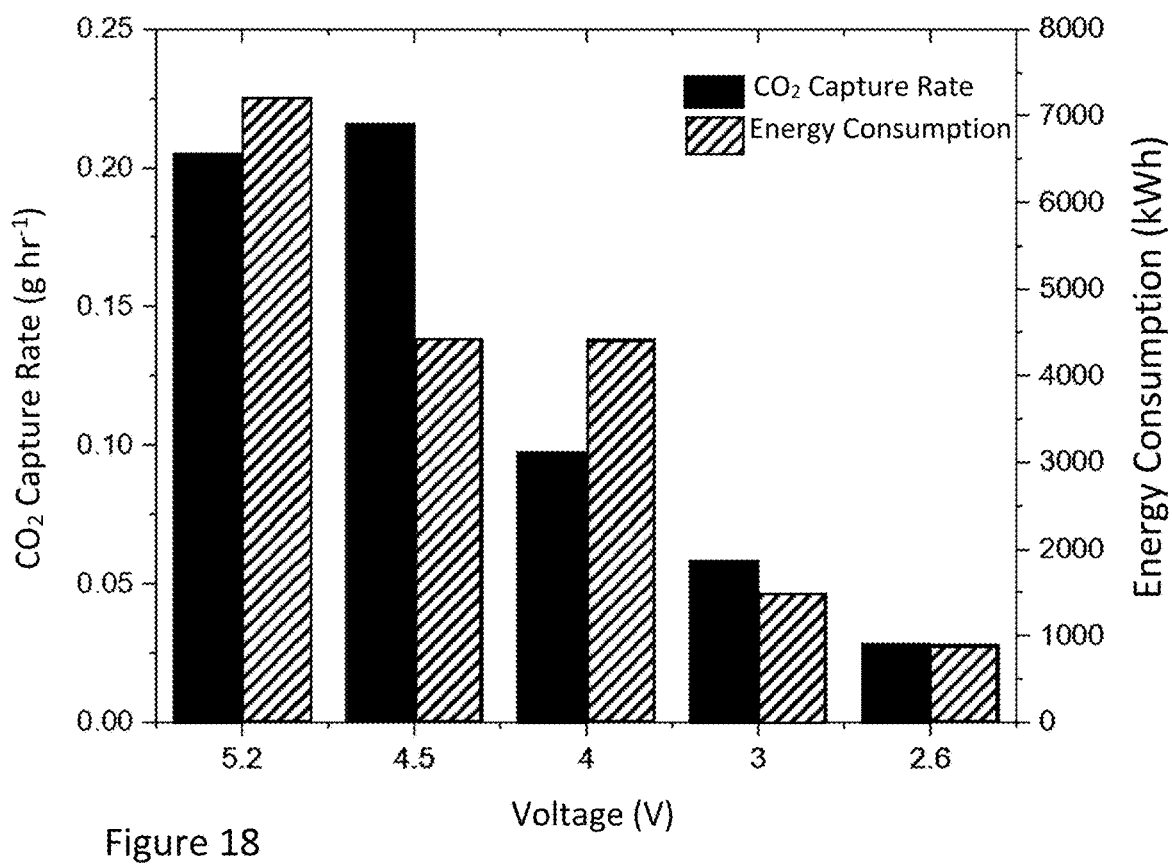
FIG. 18 is a graph of the $CO_2$ capture rate, and the energy consumption measured using the apparatus of FIG. 17.

FIG. 18 illustrates $CO_2$ capture results obtained using the apparatus of FIG. 17 for $CO_2$ capture, using the same components and parameters described above in relation to FIGS. 15 and 16. As shown in FIG. 18, the energy efficiency of the process and the rate of $CO_2$ capture strongly depends on the voltage at which the apparatus is operated. At roughly 30 mg per hr, the energy consumption is 900 kWh per tonne of $CO_2$ captured. However, because electrolysis is occurring in the electrochemical cell, the process has produced 500 kWh of $H_2$ in the same time period. Overall, therefore, $CO_2$ has been captured and released for ~400 kWh per tonne.

FIG. 19

Figure 19:
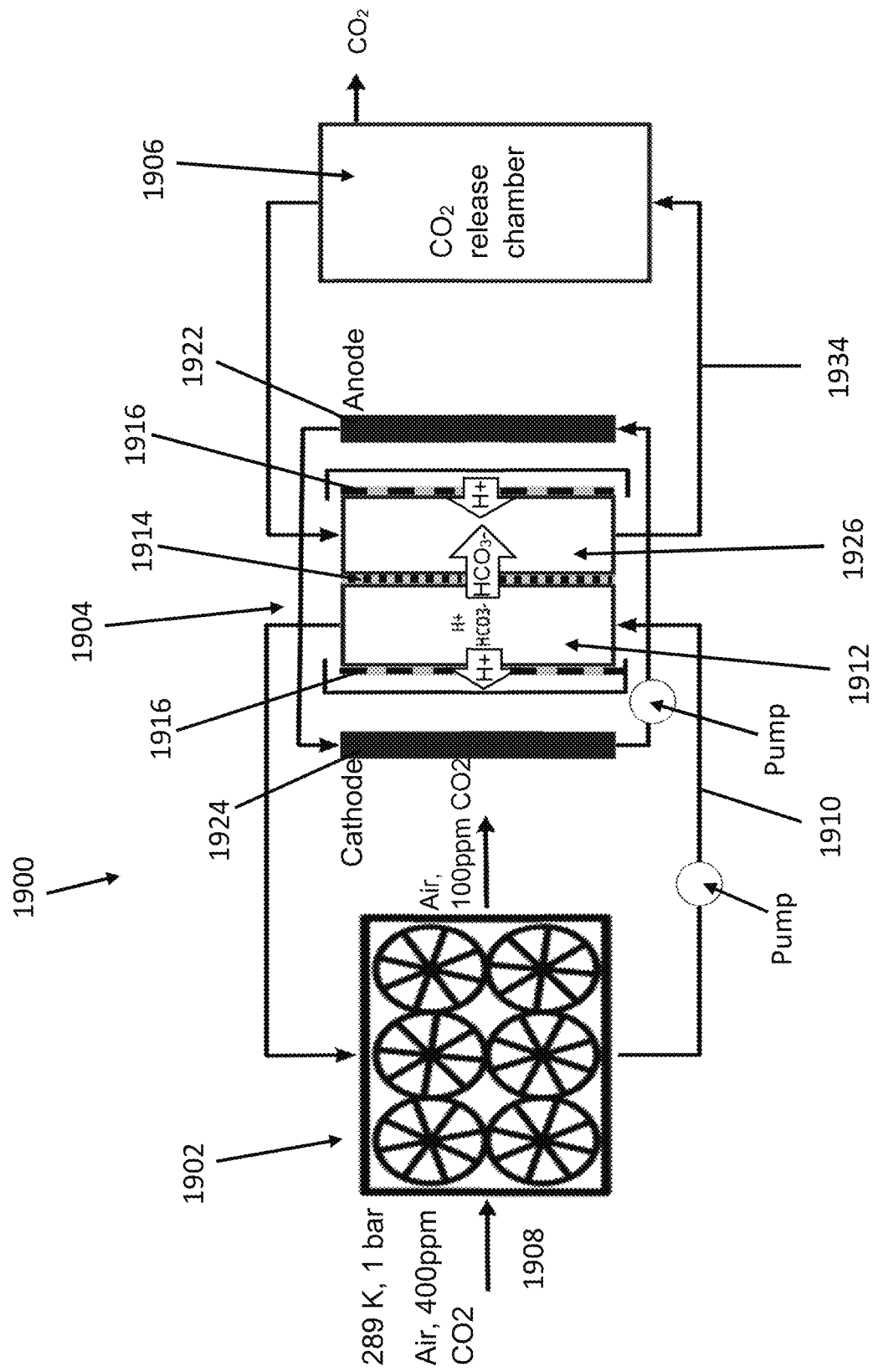
FIG. 19 is a schematic illustration of an apparatus according to a preferred embodiment of the present invention.

FIG. 19 is a schematic illustration of an apparatus according to a preferred embodiment of the present invention, which employs electrodialysis to electrochemically separate ions as part of a gas capture process. The operation of the apparatus is substantially similar to that of the flow-CDI apparatus described above in relation to FIG. 1, with the difference that the ion-separator employs electrodialysis rather than flow-CDI.

The electrodialysis apparatus 1900 illustrated in FIG. 19 is made up of a gas contactor 1902, an ion-separator 1904, and a release vessel 1906.

The gas contactor 1902 is arranged to receive a flow of gas 1908 which contains a target species to be captured, and to bring the gas into contact with a stream of a first absorbent solution 1910. A variety of gas-liquid contactor designs are known in the art, such as falling-film reactors, packed columns, bubble columns or spray towers, any of which would be suitable for use with the present invention.

The ion-separator 1904 contains a separation chamber 1912, an anion-exchange membrane 1914 along one side of the separation chamber 1912, and a cation-exchange membrane 1916 along the opposite side of the separation chamber 1912. An inlet pipe and an outlet pipe connect the gas contactor 1902 to the separation chamber, so that a stream of first absorbent solution 1910 can be pumped from the gas contactor, through the separation chamber, and then recirculated to the gas contactor.

A positive electrode 1922 (anode) is connected to the ion-separator 1904 on the side of the anion-exchange membrane, and a negative electrode 1924 (cathode) is connected to the ion-separator 1904 on the side of the cation-exchange membrane.

The ion-separator comprises a second absorbent channel 1926 between the anion-exchange membrane and the positive electrode 1922. The second absorbent channel is connected in a loop with the release vessel 1906, and a second absorbent solution 1934 is circulated between the release vessel 1906 and the second absorbent channel 1926.

For electrodialysis, the second absorbent solution may be $H_2O$, or another aqueous solution, for example an organic acid such as sulfonic acid. In one experiment, the inventors have successfully used 0.18% poly-4-styrene sulfonic acid as the second absorbent solution.

In use, a flow of gas 1908 which contains a target species to be captured is introduced into the gas contactor 1902, at the same time that a first absorbent solution 1910 containing a capture species is introduced into the gas contactor. As the gas 1908 comes into contact with the first absorbent solution 1910, mass transfer of the target species into the absorbent solution takes place, so that the first absorbent solution 1910 absorbs some of the target species from the gas.

The target species is dissolved in the first absorbent solution 1910, optionally assisted by the presence of a hydration catalyst in the first absorbent solution, and forms a target anion and a hydrogen cation. The target anion and the hydrogen cation associate with and are stabilised by the capture species in the first absorbent solution.

The first absorbent solution 1910 is continuously pumped from the outlet of the gas contactor 1902 to the inlet of the separation chamber 1912 of the ion-separator 1904, from where the liquid first absorbent solution 1910 flows through the separation chamber.

During operation, a potential difference is applied between the positive electrode 1922 and the negative electrode 1924. This potential difference across the ion-separator means that as the first absorbent solution 1910 flows through the separation chamber, the negatively-charged target anions (bicarbonate anions $HCO_3^-$ in the illustrated embodiment) are dissociated from the capture species and attracted towards the positive electrode, while the positively-charged hydrogen cations are attracted towards the negative electrode. The target anions therefore migrate through the anion-exchange membrane 1914, and the hydrogen cations flow through the cation-exchange membrane 1916, so that the target anions are separated from the first absorbent solution. Due to the large hydrodynamic radius and high molecular weight of the capture species, neither the anion-exchange membrane 1914 nor the cation-exchange membrane 1916 is permeable to the capture species, so the capture species remains in the first absorbent solution 1910.

By the time that the first absorbent solution 1910 reaches the outlet of the separation chamber 1912, at least some of the target acid ions (target anions and hydrogen cations) have been separated from the stream of first absorbent solution 1910, and the first absorbent solution is recirculated to the inlet of the gas contactor 1902.

During operation, a stream of the second absorbent solution 1934 containing a slurry of conductive particles is pumped through the second absorbent channel 1926, so that target anions and hydrogen cations passing through the ion-exchange membranes are transferred into the stream of second absorbent solution 1934. The target anions and hydrogen cations are recombined in the second absorbent channel 1926, as they flow to the release vessel 1906, and reassociate with one another so that the stream of second absorbent solution 1934 contains the target acid when it reaches the release vessel 1906.

The stream of second absorbent solution 1934 is maintained under pressure in the second absorbent channel 1926, which prevents bubble formation within the ion-separator, and is then depressurised in the release vessel 1906 where the target gas ($CO_2$ in the illustrated embodiment) spontaneously evolves from the solution.

The stream of the second absorbent solution 1934 is then recirculated back to the second absorbent channel 1926 in a continuous process.

Using this system, the target species can be continuously absorbed from the flow of gas 1908, transferred from the first absorbent solution to the second absorbent solution, and eventually released in the release vessel 1906.

Similarly to the embodiments described above, a particularly preferred embodiment of the invention that can be performed using this set-up is the direct capture of carbon dioxide ($CO_2$) from air.

In this direct air capture (DAC) embodiment, air is used as the flow of gas 1908, and the first absorbent solution 1910 is an aqueous solution containing a $CO_2$ hydration catalyst. As illustrated in FIG. 19, air 1908 flows into the gas contactor with a temperature of 298 K and a pressure of 1 bar with a $CO_2$ concentration of 400 ppm. After passing through the gas contactor and having some of its $CO_2$ content absorbed by the first absorbent solution, the air has a $CO_2$ concentration of only 100 ppm.

A particularly preferred option for the capture species in this embodiment is an aqueous solution of polyethyleneimine (PEI) having a molecular weight of greater than 800. The high molecular weights and hydrodynamic radii of the PEI means that these components are excluded from passage through the ion-exchange membranes, and therefore remain in the first absorbent solution to be recirculated.

FIG. 20

While many of the experiments described above were obtained using a gas sparger as a gas contactor, a "falling film" reactor was assembled as an alternative gas contactor for use with the present invention. A "falling film" reactor may advantageously allow for a more accurate determination of the $CO_2$ capture rate of different capture species as a function of surface area, gas: liquid ratio and residence time.

Figure 20:
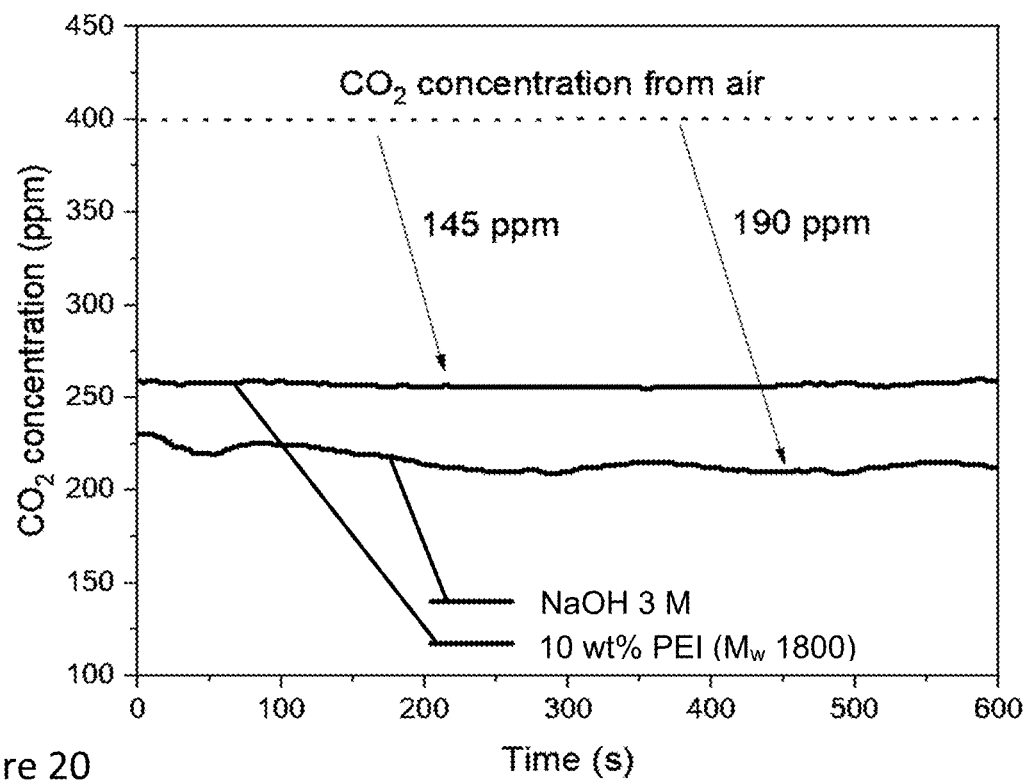
FIG. 20 is a graph of the $CO_2$ exit concentration from a falling film reactor usable in a preferred embodiment of the present invention.

FIG. 20 is a graph of the $CO_2$ exit concentration from a falling film reactor usable in a preferred embodiment of the present invention. The $CO_2$ exit concentration from the falling film reactor at demonstrated a capture rate of 0.83 g $CO_2$ $hr^{-1}$ $m^{-2}$ for 3 molar NaOH, compared to a capture rate of 0.6 g $CO_2$ $hr^{-1}$ $m^{-2}$ with a first absorbent solution which is a 10 wt % aqueous solution of PEI ($M_w$ 1800).

The direct comparison of NaOH and polymeric amine (PA) capture species can be seen in FIG. 20, which shows a 10 wt % solution of PEI ($M_w$ 1800) and achieves a capture rate within 78% of the capture rate achieved by 3M NaOH. Temperature sensitivity experiments were also conducted with 10 wt % PEI ($M_w$ 1800) and can be seen in Table 1 below. The data shows that while solution temperature does impact the rate of $CO_2$ capture, only a 17% drop in rate is observed from reducing the temperature from 20° C. to 5° C.

TABLE 1

Effect of temperature on the $CO_2$ capture rate with 10 wt % PEI ($M_w$ 1800) with a gas:liquid ratio 10.6, air residence time 1.2 s, fluid residence time 4.3 s.

| Temperature, ° C. | Δppm | $mg_{CO2}$ $hr^{-1}$ $m^{-2}$ film surface area |
|---|---|---|
| 30 | −163 | 678.32 |
| 20 | −144 | 599.25 |
| 10 | −123 | 511.86 |
| 5 | −120 | 499.38 |

Figure 21:
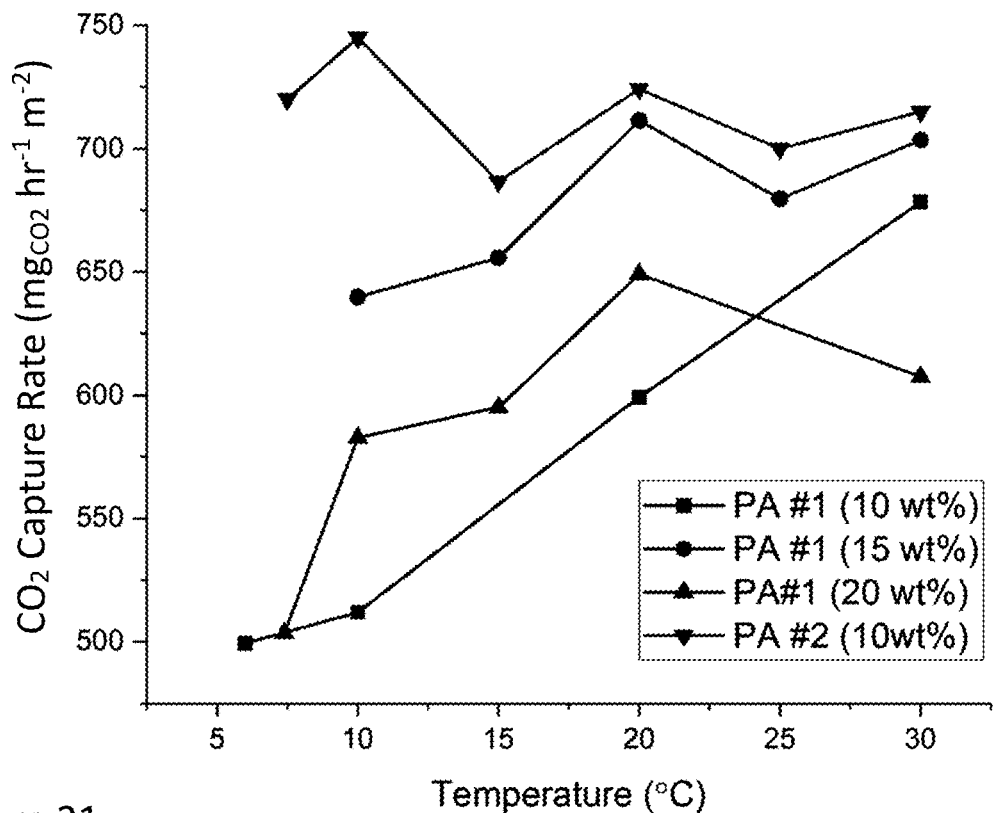
FIG. 21 is a graph of the $CO_2$ exit concentration from the falling film reactor used in Figure across a range of temperatures and for two different capture species.

In further experiments, the effect of concentration and the nature of polymeric amines (PA) having different molecular weights was investigated in $CO_2$ capture experiments, as shown in FIG. 21.

FIG. 21 is a graph of the $CO_2$ exit concentration from the falling film reactor used in Figure across a range of temperatures and for two different capture species. PA #1 is PEI ($M_w$ 1800), which is the capture species used in FIG. 20, while PA #2 is PEI ($M_w$ 800), which is a related variant polymeric amine with a lower molecular weight.

The results indicate that by increasing the concentration of PA #1 (PEI, $M_w$ 1800) from 10 wt % to 15 wt %, the performance could be improved across a wide temperature range, while increasing to 20 wt % was less optimal, particularly at higher temperatures. Another polymeric amine labelled PA #2 (PEI, $M_w$ 800) was tested as an alternative variant with a different molecular weight. PA #2 (PEI $M_w$ 800) was highly effective across the temperature range, outperforming all other solvent combinations. The $CO_2$ capture rate performance of PA #2 (PEI $M_w$ 800) at 10 wt % was significantly higher than PA #1 (PEI $M_w$ 1800) at concentrations of 10 wt %, 15 wt % or 20 wt %.

Figure 22:
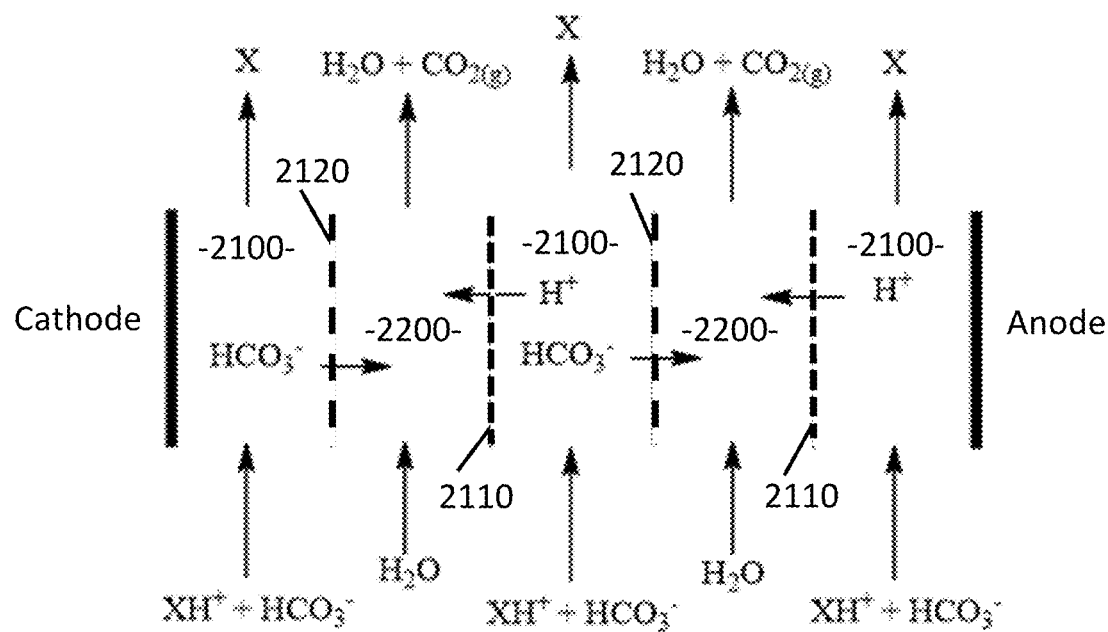
FIG. 22 is a is a schematic illustration of an electrodialysis apparatus usable in a preferred embodiment of the present invention.

FIG. 22 is a is a schematic illustration of an electrodialysis cell apparatus usable for direct air capture of $CO_2$ in a preferred embodiment of the present invention, in which X is a capture species that cannot permeate either anion- or cation-exchange membranes. The operation of the electrodialysis cell is based on that described above in relation to FIG. 2B.

In the preferred embodiment of FIG. 22, $CO_2$ captured by the first absorbent solution containing polymeric amine (PA) is regenerated through electrodialysis. The first absorbent solution, which is customarily referred to as the "diluate" in electrodialysis terminology, contains a PA capture species "X" and stabilised $H^+$ and $HCO_3^-$ ions, and is flowed through the electrodialysis cell via the diluate chambers 2100. Each chamber is separated by cation exchange membranes 2110 and anion exchange membranes 2120 which selectively allow ions of the complementary charge to migrate. The large size of the PA capture species molecules prevents them from migrating through any ion-exchange membrane, so the PA capture species remains in the diluate chambers 2100. A voltage is applied across the electrodialysis cell, which causes anions to migrate towards the anode and cations to migrate towards the cathode. This process causes ions from the first absorbent "capture" solution to concentrate in the second absorbent "release" solution, customarily referred to as the "concentrate", in the concentrate chambers 2200. Alone, these ions are unstable in solution and decompose into $CO_2$, whose solubility is also low in $H_2O$ and transfers to the gas phase.

As the large size of the capture species excludes them from passage through the ion-exchange membranes into the second absorbent "release" solution, this process may be termed size-exclusion electrodialysis (SEED).

Figure 23:
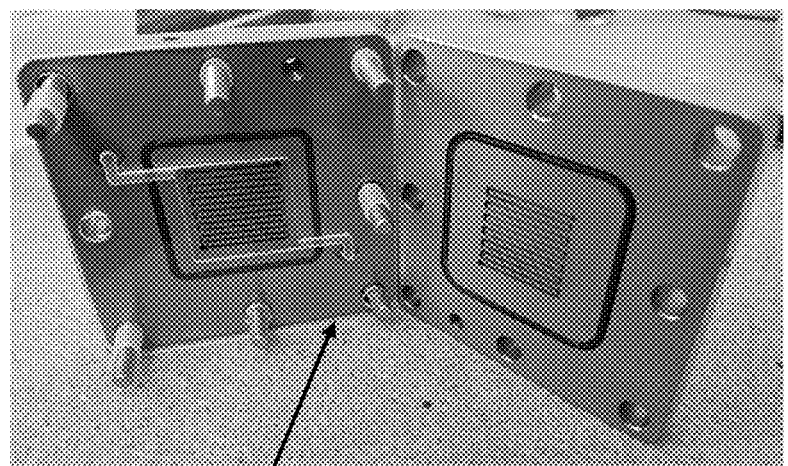
FIG. 23 is a photograph of an electrodialysis cell usable in an embodiment of the present invention.

This size-exclusion electrodialysis (SEED) process was carried out with a small scale, three-chambered electrochemical cell 2300 purchased from Dioxide Materials and shown in FIG. 23. This cell features two titanium current collectors with serpentine, 1 mm wide channels and a 2 mm separator that acts as the internal chamber where the first absorbent solution flows between the ion-exchange membranes. In this configuration, there is a single pair of cation and anion exchange membranes. The $HCO_3$ target anion is transported to the anode and decomposed to $CO_2$ by the acidic environment of the anodic chamber caused by water oxidation, while the $H^+$ from PA-$H^+$ is transported to the cathode and reduced at the electrode to form hydrogen.

Figure 24:
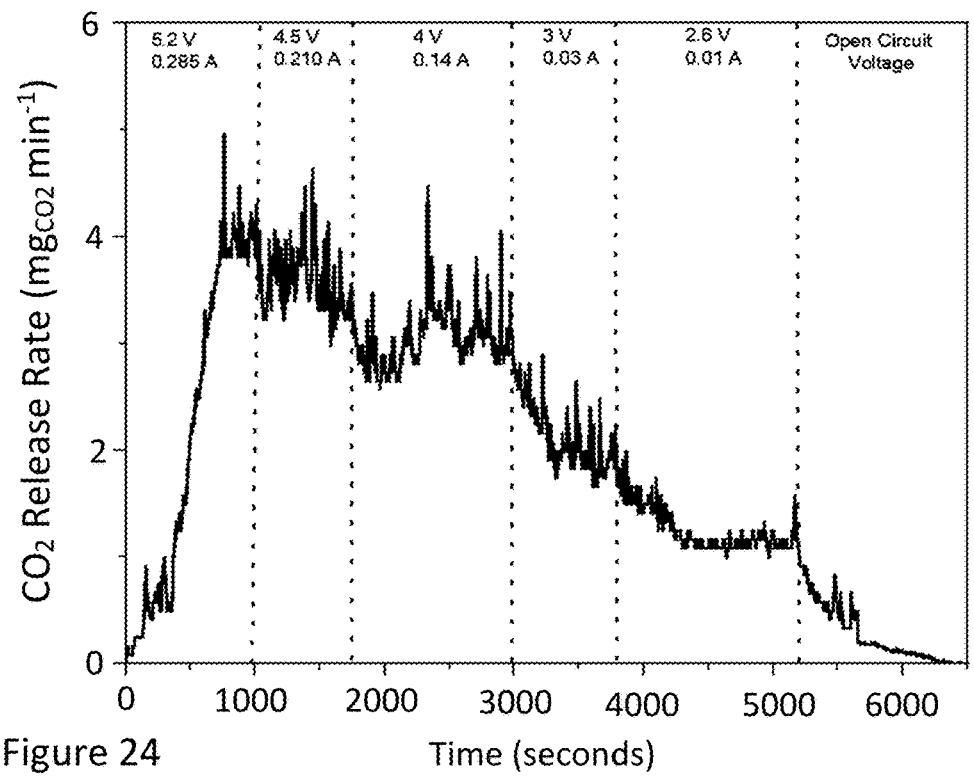
FIG. 24 is a graph showing $CO_2$ release rate as a function of voltage/current measured using the apparatus of FIG. 23.

Experiments were conducted with a 3.6 wt % polymeric amine capture species (Polyethyleneimine, 1800 molecular weight) aqueous solution pre-saturated with air and continuously bubbled throughout the experiment to maximise the concentration of $HCO_3^-$ and $H^+$ in solution. The second absorbent solution was pure $H_2O$. A range of voltages were applied from 5.2 V to 2.6 V. At higher voltages, the stability of the membranes and electrodes would have been significantly compromised, as well as a significant concentration deficit of $CO_2$ would have occurred in the first absorbent capture solution. At voltages less than 2.6 V, the $CO_2$, output became challenging to measure. $CO_2$ measurements were taken continuously using high-speed near-infrared sensors, the results of which can be seen in FIG. 24.

Figure 25:
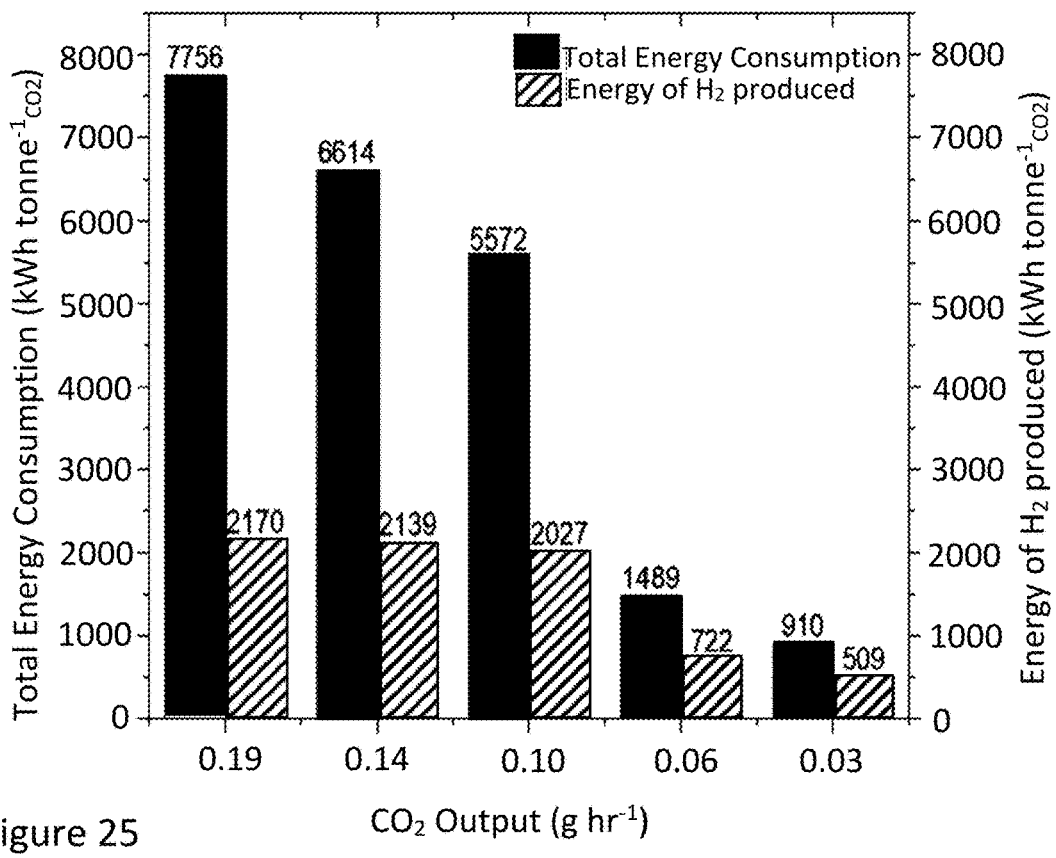
FIG. 25 is a graph showing the total energy consumption and energy of $H_2$ produced in the same experiment as FIG. 24.

Calculating the power input and dividing by the amount of $CO_2$ captured per hour yielded the specific energy consumption of the cell in kWh/$tCO_2$, as shown in FIG. 25. It should be noted that a large proportion of the total energy consumption in the single membrane-pair cell is related to the production of hydrogen and oxygen at the electrodes. This parasitic loss is greatly diminished in systems that contain>10 pairs of membrane channels and losses are negligible by 40 pairs. After the experiment, a sample of the concentrate solution was dried to detect any residue that may have resulted from PA capture species migrating through the membrane; no sign of this was observed. Overall, these results prove that bicarbonate target anions can be separated from the polymeric-amine-containing first absorbent solution without any noticeable transfer of PA into the second absorbent release solution. It also demonstrated an energy consumption as low as 400 kWh/tCO$_2$ (omitting hydrogen/oxygen production) is possible in such a system without any optimisation. Corresponding voltages, current densities, and surface area normalised capture rates are tabulated in Table 2.

TABLE 2

Voltage and current densities of the 5 cm$^2$ cell of FIG. 23, with corresponding CO$_2$ production rates.

| Voltage, V | Current, A cm$^{-2}$ | $g_{CO2}$ hr$^{-1}$ cm$^{-2}_{membrane\ area}$ |
|---|---|---|
| 5.2 | 0.057 | 0.038 |
| 4.5 | 0.0418 | 0.028 |
| 4 | 0.0216 | 0.020 |
| 3 | 0.0072 | 0.0088 |
| 2.6 | 0.002 | 0.0057 |

Figure 26:
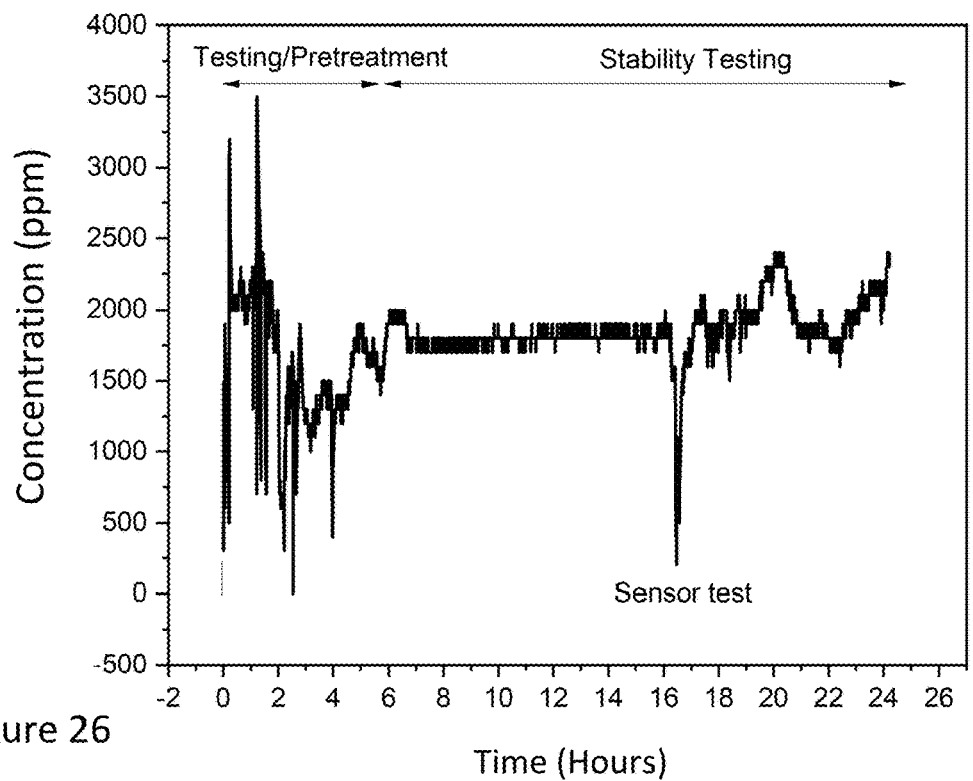
FIG. 26 is a graph showing $CO_2$ stability data obtained using an electrodialysis cell.

FIG. 26 is a graph showing CO$_2$ stability data obtained using the falling film reactor and the electrodialysis cell of FIG. 23, which contains a single cell pair of 37 cm 2 interfacial membrane area. Voltage 4 V; current 7 mA; flow rate 15 mL/min. The first absorbent solution was an aqueous solution of PEI, with a PEI concentration of 10 wt %. The ion-exchange membranes used in the experiment were Fumatech FKS-PET-130 (cation exchange) and Fumatech FAS-PET-130 (anion exchange).

As shown in FIG. 26, the CO$_2$ concentration in the release vessel stabilised after a period of testing and pretreatment, and remained stable at around 1750 ppm for around 10 hours until a sensor test was carried out.

Forty-Membrane-Pair Electrodialysis

As mentioned above, typical electrodialysis modules contain a larger number of membrane pairs to increase the energy efficiency of separation by reducing the proportion of energy that relates to water splitting reactions, and so a lab-scale electrodialysis cell was purchased from Fumatech, which contained 40 membrane pairs. The ED-40 cell from Fumatech contains standard Fumasep FAS and FKS ion-exchange membranes used in electrodialysis applications and are separated by 450 μm spacers.

The electrodialysis cell was operated under conditions of constant current, at a current density of ~0.5 mA cm$^{-2}$ of electrode area requiring an applied voltage of 21.5 V. Assuming the voltage necessary to drive the faradaic process was 1.5 V would indicate a cell pair voltage of ~0.5 V. With these conditions, the electrodialysis cell produced up to 0.7 g of CO$_2$ per hour, resulting in specific energy consumption of 510 kWh/tCO$_2$ with an associated current efficiency of 69%.

Figure 27:
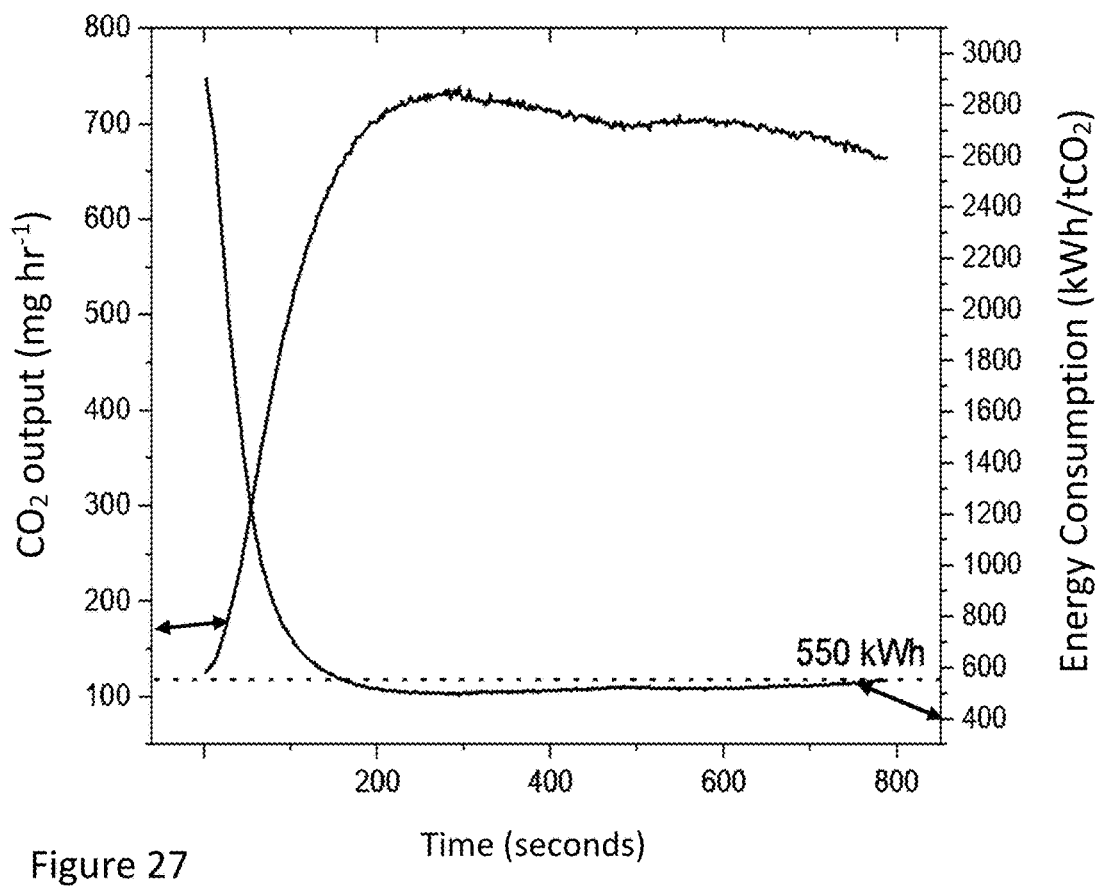
FIG. 27 is a graph of $CO_2$ output rates in mg/hr (black) vs energy consumption for $CO_2$ separation and release in kWh/$tCO_2$ (red) for a 40-membrane-pair electrodialysis cell.

FIG. 27 is a graph of CO$_2$ output rates in mg/hr (black) vs energy consumption for CO$_2$ separation and release in kWh/tCO$_2$ (red). Membrane surface area, 0.145 m$^2$. Electrode area, 0.0036 m$^2$. Voltage=21.5 V, Current=0.0017 A, current efficiency=69%. Spacer thickness, 450 micron.

Figure 28:
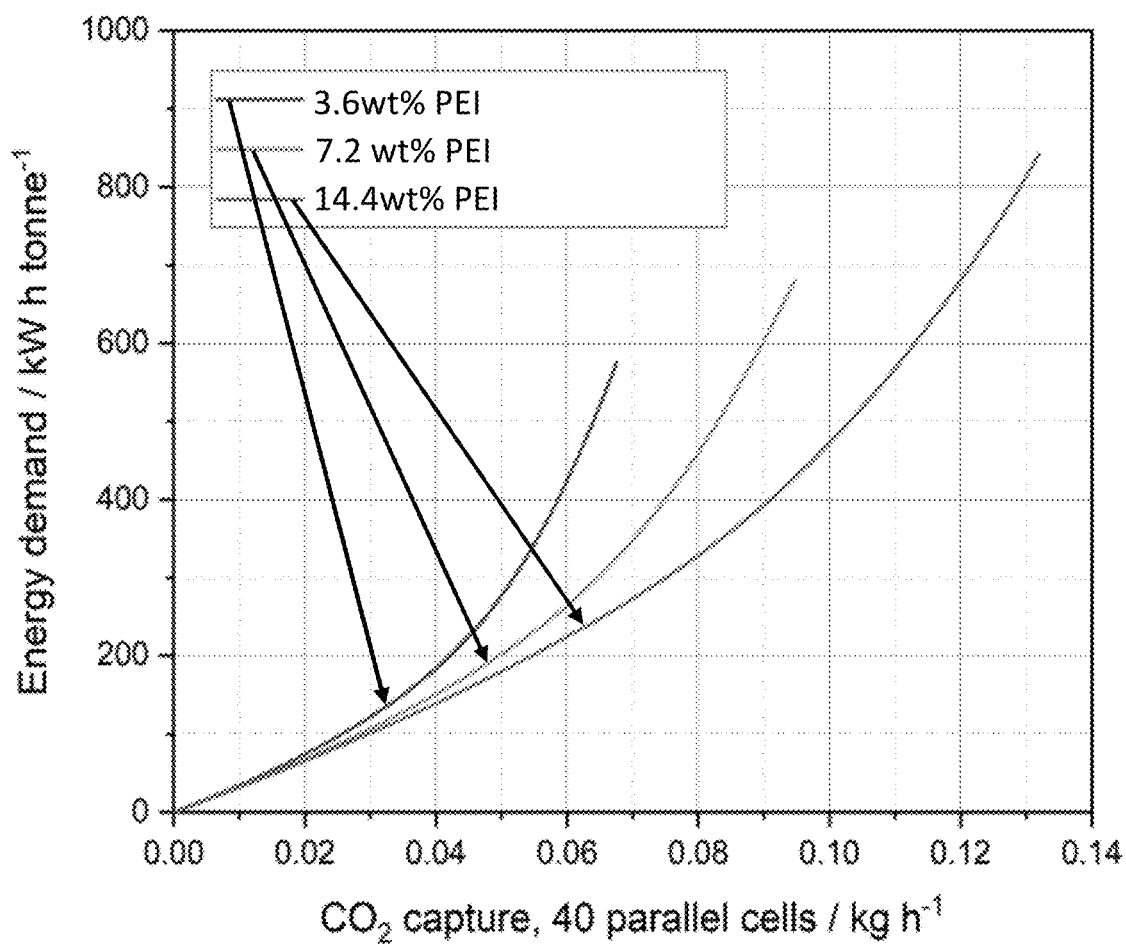
FIG. 28 is a graph of the modelled electrical energy demand of electrodialysis using the same 40-membrane-pair electrodialysis cell as FIG. 27 with different concentrations of capture species in the first absorbent solution.

FIG. 28 is a modelled graph of the electrical energy demand of electrodialysis using the same 40-membrane-pair electrodialysis cell as FIG. 26 with different concentrations of PEI capture species in the first absorbent solution.

Electrical energy demand of electrodialysis, 40 cell pairs, PA loading variation (3.6 wt % PA; 7.2 wt % PA; 14.4 wt % PA). Spacer thickness 100 microns. Diluate flow rate 2 L/hr/cell, saturated with 400 ppm CO$_2$ at 1 atm.

Using an electrochemical computational model, the effect of capture loading on the productivity of the cell and the required energy demand can be predicted, as shown in FIG. 28. The modelling predicts a significant improvement in the CO$_2$ capture rate for a given energy demand at higher solvent loadings due to increased conductivity and concentration of dissolved HCO$_3$ and H$^+$. Furthermore, the model considered the effect of thinner membrane spacers revealing a non-linear relationship, suggesting an improvement of between 10-100× could be achieved vs the current experimental data.

Preferred Aspects

Preferred aspects of the present invention are defined in the following numbered clauses:

1. A method of capturing a target species from a gas comprising the steps of:
   contacting a gas containing a target species with a first absorbent solution comprising a capture species;
   dissolving the target species in the first absorbent solution to form a target anion;
   electrochemically separating the target anion from the first absorbent solution by contacting the first absorbent solution with one or more ion-exchange membranes, and transferring the target anion through an ion-exchange membrane into a second absorbent solution; and
   releasing at least some of the target species from the second absorbent solution,
   in which the one or more ion-exchange membranes are not permeable to the capture species, so the capture species does not pass through the one or more ion-exchange membranes.
2. A method according to clause 1, in which the capture species binds to the target anion in the first absorbent solution, and in which the target anion is electrochemically dissociated from the capture species before being transferred through the ion-exchange membrane.
3. A method according to clause 1 or 2, in which the capture species is a non-alkali-metal capture species.
4. A method according to clause 1, 2 or 3, in which the capture species is an ionic capture species, preferably a cationic capture species.
5. A method according to any preceding clause, in which the capture species is an ionic polymer.
6. A method according to any preceding clause, in which the capture species is a cationic capture species that does not comprise an alkali metal cation.
7. A method according to any preceding clause, in which the capture species is a cationic organic capture species.
8. A method according to any preceding clause, in which the capture species is a choline-derived ionic liquid, preferably a cationic choline-derived ionic liquid containing the conjugate base of an organic acid such as carboxylic acid or propanoic acid.
9. A method according to any preceding clause, in which the capture species is a cationic polymer, preferably a cationic polymer having a repeat unit which comprises a plurality of amine groups.

10. A method according to clause 9, in which the capture species comprises a plurality of polymer resin particles functionalised with cationic functional groups.
11. A method according to clause 9, in which the capture species comprises a slurry of anion-exchange resin particles functionalised with cationic functional groups.
12. A method according to any preceding clause, in which the capture species is weakly basic, preferably in which the capture species has a $pK_a$ of less than 10, preferably less than 8.5, particularly preferably less than 7.5.
13. A method according to any preceding clause, in which the capture species is a polymeric amine, preferably a cationic polymeric amine.
14. A method according to any preceding clause in which the capture species comprises polyethyleneimine (PEI).
15. A method according to any preceding clause, in which the capture species has a molecular weight of greater than or equal to 200, or 400, or 500, or 600, or 700, or 800 g/mol.
16. A method according to any preceding clause, in which the one or more ion-exchange membranes are configured to permit passage of the target anion therethrough, and to prevent passage of capture species having a cationic charge and/or a molecular weight of greater than 200, or 250, or 300, or 400, or 500, or 600 g/mol.
17. A method according to any preceding clause, in which the first absorbent solution contains no inorganic salts, or contains less than 2 wt % inorganic salt.
18. A method according to any preceding clause, in which the first absorbent solution contains a hydration catalyst for accelerating the conversion of the dissolved target species into the target anion.
19. A method according to clause 18, in which the catalyst comprises an enzyme, for example carbonic anhydrase, organometallic compounds of zinc (zinc cyclen), and/or metallic or metal-oxide particles or nanoparticles.
20. A method according to any preceding clause, in which the first absorbent solution is maintained at a temperature of between 15° C. and 60° C., preferably between 18° C. and 40° C., particularly preferably between 30° C. and 40° C., and/or at a pressure of less than 2 bar, preferably at atmospheric pressure.
21. A method according to any preceding clause, in which at least one of the ion-exchange membranes is an anion-exchange membrane permeable to the target anion, preferably in which the anion-exchange membrane is a monovalent-anion-exchange membrane.
22. A method according to any preceding clause, in which the target species is dissolved in the first absorbent solution to form a target anion and a target counterion, preferably in which the target counterion is $H^+$.
23. A method according to clause 22, in which the one or more ion-exchange membranes comprise an anion-exchange membrane permeable to the target anion, and a cation-exchange membrane permeable to the target counterion.
24. A method according to clause 23, in which the target counterion is electrochemically separated from the first absorbent solution and transferred through the cation-exchange membrane into the second absorbent solution.
25. A method according to any of clauses 22 to 24, in which the target anion associates with the target counterion in the second absorbent solution, preferably to form a target acid.
26. A method according to any of clauses 22 to 24, in which the target anion is combined with a hydrogen cation to form a target acid in the second absorbent solution, the hydrogen cation being produced by electrolysing $H_2O$.
27. A method according to clause 25 or 26, in which the target acid is the conjugate acid of the target species.
28. A method according to any preceding clause, in which the second absorbent solution has a different composition from the first absorbent solution.
29. A method according to any preceding clause, in which the second absorbent solution has a pH which is different from the pH of the first absorbent solution, preferably in which the pH of the second absorbent solution is less than 7.
30. A method according to any preceding clause, in which the first absorbent solution is an aqueous solution and the second absorbent solution is a non-aqueous solution.
31. A method according to any preceding clause, in which the second absorbent solution does not contain the capture species.
32. A method according to any preceding clause, in which the second absorbent solution is non-aqueous, preferably in which the second absorbent solution comprises or consists of an organic carbonate solvent such as ethylene carbonate, propylene carbonate or dimethyl carbonate.
33. A method according to any preceding clause, in which the second absorbent solution comprises one or more catalysts for the in-situ reduction of the target anion, comprising of metallic catalysts or metal chalcogenides (oxides, nitrides, sulphides, phospides) of a metal selected from the list: Pt, Pd, Fe, Mo, Mn, Cu, Zn, V, W.
34. A method according to clause 29, in which the second absorbent solution contains less than 5 wt % of an inorganic salt, preferably less than 2 wt % of an inorganic salt.
35. A method according to any preceding clause, comprising one or more flow electrodes in contact with the one or more ion-exchange membranes, preferably in which a first flow electrode comprises a stream of second absorbent solution in contact with an output side of the ion-exchange membrane through which the target anion is transferred.
36. A method according to clause 35, in which each flow electrode comprises a stream of absorbent solution comprising a suspension of electrically or ionically-conductive particles selected from the group of: carbon- or metal-based particles or nanoparticles such as activated carbon; oxides, hydroxides, and/or oxyhydroxides of platinum, silver, iron, nickel, manganese, and/or titanium; or redox species such as riboflavin 5'-monophosphate sodium salt hydrate, anthraquinone, polyoxometalates.
37. A method according to any preceding clause, in which the step of electrochemically separating the target anion from the first absorbent solution comprises capacitive deionisation (CDI), preferably flow-CDI, or electrodialysis.
38. A method according to any preceding clause, in which the target species is released from the second absorbent solution as a gas, in order to maintain the chemical equilibrium of the target acid in the second absorbent solution, preferably at room temperature and atmospheric pressure.

39. A method according to clause 38, in which the step of releasing at least some of the target species from the target acid in the second absorbent solution comprises the step of heating the second absorbent solution via means such as photothermal, magnetic induction, resistive or dielectric, and/or reducing the pressure above the second absorbent solution.
40. A method according to any of clauses 1 to 39, in which at least some of the target anions in the second absorbent solution are reacted with a mineral or salt to form a precipitated material that is released from the second absorbent solution.
41. A method according to any preceding clause, in which a concentration of the target species in the gas is less than 50 vol %, or 45 vol %, or 25 vol %, or 15 vol %, or 10 vol %, or 5 vol %, or 1 vol %, preferably less than 0.5 vol %.
42. A method according to any preceding clause, in which the gas containing the target species is air, flue gas from fossil fuel combustion, industrial gas, or any combination thereof.
43. A method according to any preceding clause, in which the target species is selected from the group consisting of $CO_2$, $H_2S$, $SO_2$, $NO$, $NO_2$, and $N_2O$.
44. A method according to any preceding clause, in which the target species is $CO_2$, the target anion is bicarbonate, and the target acid is carbonic acid.
45. A method according to clause 40, in which the first absorbent solution contains a catalyst for converting $CO_2$ into bicarbonate, preferably in which the catalyst is carbonic anhydrase or a Zn 2+ containing compound such as zinc cyclen.
46. An apparatus for capturing a target species from a gas, comprising:
    a gas contactor configured to contact a gas containing a target species with a first absorbent solution containing a capture species, dissolving the target species in the first absorbent solution to form target anions;
    an ion-separator comprising one or more ion-exchange membranes for electrochemically separating the target anions from the first absorbent solution and transferring at least some of the target anions to a second absorbent solution; and
    a release vessel for releasing at least some of the target species from the second absorbent solution,
    in which the one or more ion-exchange membranes are not permeable to the capture species, in use.
47. An apparatus according to clause 46, in which the one or more ion-exchange membranes are configured to transfer the target anions from the first absorbent solution into the second absorbent solution, and to retain the capture species in the first capture solution.
48. An apparatus according to clause 46 or 47, in which the ion-separator is configured to operate under a hydrostatic pressure of greater than 2 atm, preferably greater than 3 atm or 5 atm or 7 atm, or even 30 atm or higher.
49. An apparatus according to clause 46, 47 or 48, in which the ion-separator is configured to transfer only the target anions into the second absorbent solution.
50. An apparatus according to clause 46, 47 or 48, in which the ion-separator is configured to transfer both the target anions and a plurality of hydrogen cations from the first absorbent solution into the second absorbent solution.
51. An apparatus according to any of clauses 46 to 50, in which the one or more ion-exchange membrane comprises, or consists of, an anion-exchange membrane configured to permit passage of the target anion therethrough.
52. An apparatus according to any of clauses 46 to 50, in which the ion-separator comprises two or more ion-exchange membranes, preferably an anion-exchange membrane and a cation-exchange membrane.
53. An apparatus according to any of clauses 46 to 52, in which the ion-separator comprises a chamber with an anion-exchange membrane, in which the ion-separator is configured to receive a stream of the first absorbent solution, and to electrochemically separate the target anions through the anion-exchange membrane into the second absorbent solution.
54. An apparatus according to any of clauses 46 to 53, in which the ion-separator comprises a separation chamber with a pair of opposing ion-exchange membranes, one of which is permeable to the target anion, and the other of which is permeable to hydrogen cations.
55. An apparatus according to any of clauses 46 to 54, in which the ion-separator comprises one or more, or two or more, flow electrodes in contact with output sides of the one or more ion-exchange membranes.
56. An apparatus according to clause 55, in which the flow electrode(s) comprises a stream of second absorbent solution, so that target anions passing through the one or more ion-exchange membranes are transferred into the stream of second absorbent solution.
57. An apparatus according to any of clauses 46 to 56, in which the apparatus is configured to electrolyse water, and to introduce the resulting hydrogen cations into the second absorbent solution.
58. An apparatus according to any of clauses 46 to 57, in which the apparatus comprises means for transferring first absorbent solution from the gas contactor to the ion-separator, and means for recirculating first absorbent solution from the ion-separator to the gas contactor.
59. An apparatus according to any of clauses 46 to 58, in which the apparatus comprises means for transferring second absorbent solution from the ion-separator to the release vessel, and means for recirculating second absorbent solution from the release vessel to the ion-separator.
60. An apparatus according to any of clauses 46 to 59, in which the ion-separator is a capacitive deionisation (CDI) ion-separator, or a CDI cell, or in which the ion-separator is an electrodialysis ion-separator, or an electrodialysis cell.
61. An apparatus according to any of clauses 46 to 60, in which The apparatus is configured to operate continuously.
62. An apparatus according to any of clauses 46 to 61, in which the ion-separator is a flow electrode capacitive deionisation (FCDI) ion-separator, or a continuous-flow electrodialysis ion-separator.

The invention claimed is:
1. A method of capturing a target species from a gas comprising the steps of:
    contacting a gas containing a target species with a first absorbent solution comprising a capture species;
    dissolving the target species in the first absorbent solution to form a target anion;
    electrochemically separating the target anion from the first absorbent solution by contacting the first absorbent solution with one or more ion-exchange membranes, and transferring the target anion through an ion-exchange membrane into a second absorbent solution; and releasing at least some of the target species from the second absorbent solution, in which the capture species is too large to pass through the pores in the one or more ion-exchange membranes, so the capture species does not pass through the one or more ion-exchange membranes.

2. The method according to claim 1, in which the second absorbent solution does not contain the capture species.

3. The method according to claim 1, in which the capture species binds to the target anion in the first absorbent solution, and in which the target anion is electrochemically dissociated from the capture species before being transferred through the ion-exchange membrane.

4. The method according to claim 1, in which the capture species is a cationic capture species that does not comprise an alkali metal cation.

5. The method according to claim 1, in which the capture species is an ionic capture species.

6. The method according to claim 1, in which the capture species is an ionic polymer.

7. The method according to claim 1, in which the capture species is a choline-derived ionic liquid.

8. The method according to claim 1, in which the capture species is a cationic polymer.

9. The method according to claim 1, in which the capture species is a polymeric amine.

10. The method according to claim 1, in which the capture species comprises polyethyleneimine (PEI).

11. The method according to claim 1, in which the capture species has a molecular weight of greater than or equal to 200 g/mol.

12. The method according to claim 1, in which the one or more ion-exchange membranes are configured to permit passage of the target anion therethrough, and to prevent passage of capture species having a molecular weight of greater than 200 g/mol.

13. The method according to claim 1, in which the capture species is weakly basic.

14. The method according to claim 1, in which the first absorbent solution contains a hydration catalyst for accelerating the conversion of the dissolved target species into the target anion.

15. The method according to claim 1, in which at least one of the ion-exchange membranes is an anion-exchange membrane permeable to the target anion.

16. The method according to claim 1, in which the target species is dissolved in the first absorbent solution to form a target anion and a hydrogen cation ($H^+$), and in which the one or more ion-exchange membranes comprise an anion-exchange membrane permeable to the target anion, and a cation-exchange membrane permeable to the hydrogen cation.

17. The method according to claim 1, in which the target anion is combined with a hydrogen cation to form a target acid in the second absorbent solution.

18. The method according to claim 17, in which the hydrogen cation is produced by electrolyzing $H_2O$.

19. The method according to claim 1, in which the second absorbent solution has a pH which is different from the pH of the first absorbent solution.

20. The method according to claim 1, in which the first absorbent solution is an aqueous solution and the second absorbent solution is a non-aqueous solution.

21. The method according to claim 1, comprising one or more flow electrodes in contact with the one or more ion-exchange membranes.

22. The method according to claim 1, in which the step of electrochemically separating the target anion from the first absorbent solution comprises capacitive deionization (CDI), flow-CDI, or electrodialysis.

23. The method according to claim 17, in which the target species is released from the second absorbent solution as a gas, in order to maintain the chemical equilibrium of the target acid in the second absorbent solution.

24. The method according to claim 1, in which at least some of the target anions in the second absorbent solution are reacted with a mineral or salt to form a precipitated material that is released from the second absorbent solution.

25. The method according to claim 1, in which the target species is selected from the group consisting of $CO_2$, $H_2S$, $SO_2$, NO, $NO_2$, and $N_2O$.

26. The method according to claim 17, in which the target species is $CO_2$, the target anion is bicarbonate, and the target acid is carbonic acid.

27. The method according to claim 1, in which the capture species is a cationic capture species.

* * * * *